(12) United States Patent
Kubota et al.

(10) Patent No.: US 8,526,128 B2
(45) Date of Patent: Sep. 3, 2013

(54) IMAGE-FORMING LENS, AND CAMERA DEVICE AND PORTABLE INFORMATION TERMINAL DEVICE WITH THE IMAGE-FORMING LENS

(75) Inventors: Takashi Kubota, Tokyo (JP); Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 13/162,025

(22) Filed: Jun. 16, 2011

(65) Prior Publication Data
US 2011/0310496 A1 Dec. 22, 2011

(30) Foreign Application Priority Data

Jun. 16, 2010 (JP) .................................. 2010-137482
Jun. 16, 2010 (JP) .................................. 2010-137492
May 26, 2011 (JP) .................................. 2011-118460

(51) Int. Cl.
*G02B 9/06* (2006.01)

(52) U.S. Cl.
USPC .......................................... 359/762; 359/794

(58) Field of Classification Search
CPC .................................... G02B 9/06; G02B 9/08
USPC ............... 359/754, 755, 756, 761, 762, 793, 359/794
See application file for complete search history.

(56) References Cited

U.S. PATENT DOCUMENTS

| | | |
|---|---|---|
| 4,934,797 A | 6/1990 | Hirakawa |
| 5,153,779 A | 10/1992 | Ohashi |
| 5,233,474 A | 8/1993 | Hirakawa |
| 5,321,554 A | 6/1994 | Ishiyama et al. |

(Continued)

FOREIGN PATENT DOCUMENTS

| | | |
|---|---|---|
| EP | 1 734 393 A1 | 12/2006 |
| EP | 2 071 379 A1 | 6/2009 |

(Continued)

OTHER PUBLICATIONS

Partial European Search Report issued on Oct. 4, 2011 in patent application No. 11170014.2.

(Continued)

*Primary Examiner* — David N Spector
(74) *Attorney, Agent, or Firm* — Oblon, Spivak, McClelland, Maier & Neustadt, L.L.P.

(57) ABSTRACT

An image-forming lens includes: from an object side to an image side in order, a first group with a positive refractive power which includes less than or equal to five lens elements of two negative lenses and equal to or more than two positive lenses and in which a first lens element on a most object side is a negative meniscus lens a convex surface of which faces the object side; an aperture; and a second group with a positive refractive power which includes less than or equal to five lens elements including at least one cemented lens of a positive lens and a negative lens; wherein each of the first group and the second group shifts independently to perform focusing to a limited object distance, and an interval between the first lens element and a second lens element close to a surface on the image side of the first lens element: $d1_{1-2}$ and an interval between the second lens element and a third lens element close to a surface on the image side of the second lens element: $d1_{2-3}$ satisfy Conditional Expression A: $0.0<d1_{2-3}/d1_{1-2}<1.0$.

20 Claims, 36 Drawing Sheets

(56) References Cited

U.S. PATENT DOCUMENTS

| | | |
|---|---|---|
| 5,353,163 A | 10/1994 | Shibayama et al. |
| 5,398,135 A | 3/1995 | Ohashi |
| 5,434,713 A | 7/1995 | Sato |
| 5,576,891 A | 11/1996 | Ohashi |
| 5,581,319 A | 12/1996 | Ohashi |
| 5,589,988 A | 12/1996 | Suenaga |
| 5,617,254 A | 4/1997 | Ohashi |
| 5,625,497 A | 4/1997 | Emomoto |
| 5,630,188 A | 5/1997 | Ohashi |
| 5,687,401 A | 11/1997 | Kawamura et al. |
| 5,930,056 A | 7/1999 | Ohashi |
| 6,353,506 B1 | 3/2002 | Ohashi |
| 6,525,885 B2 | 2/2003 | Ohashi |
| 6,771,433 B2 | 8/2004 | Ohashi |
| 6,829,102 B2 | 12/2004 | Ohashi et al. |
| 6,839,183 B2 | 1/2005 | Ohashi |
| 6,839,185 B2 | 1/2005 | Ohashi |
| 6,995,921 B2 | 2/2006 | Ohashi |
| 7,095,564 B2 | 8/2006 | Ohashi |
| 7,151,638 B2 | 12/2006 | Ohashi |
| 7,164,542 B2 | 1/2007 | Ohashi |
| 7,167,320 B2 | 1/2007 | Ohashi |
| 7,304,803 B2 | 12/2007 | Ohashi |
| 7,420,745 B2 | 9/2008 | Ohashi |
| 7,535,650 B2 | 5/2009 | Ohashi |
| 7,535,654 B2 | 5/2009 | Ohashi |
| 7,554,746 B2 | 6/2009 | Ohashi |
| 7,557,839 B2 | 7/2009 | Ohashi |
| 7,589,910 B2 | 9/2009 | Ohashi |
| 7,663,808 B2 | 2/2010 | Ohashi |
| 7,663,816 B2 | 2/2010 | Sato |
| 7,672,066 B2 | 3/2010 | Ohashi |
| 7,855,842 B2 | 12/2010 | Ohashi |
| 8,139,297 B2 | 3/2012 | Sudoh |
| 2009/0153980 A1 | 6/2009 | Yamamoto |
| 2010/0020420 A1 | 1/2010 | Heu |
| 2010/0027136 A1 | 2/2010 | Ohashi et al. |
| 2010/0271710 A1 | 10/2010 | Ohashi |
| 2011/0128637 A1 | 6/2011 | Kubota |

FOREIGN PATENT DOCUMENTS

| | | |
|---|---|---|
| EP | 2397880 A2 * | 12/2011 |
| EP | 2397880 A3 * | 8/2012 |
| JP | 60-121414 A | 6/1985 |
| JP | 5-19166 | 1/1993 |
| JP | 6-180423 | 6/1994 |
| JP | 6-308385 | 11/1994 |
| JP | 6-324264 A | 11/1994 |
| JP | 2942280 | 6/1999 |
| JP | 2991524 | 10/1999 |
| JP | 3392964 | 1/2003 |
| JP | 2006-349920 | 12/2006 |

OTHER PUBLICATIONS

Extended European Search Report issued Aug. 1, 2012 in European Patent Application No. 11170014.2.

* cited by examiner

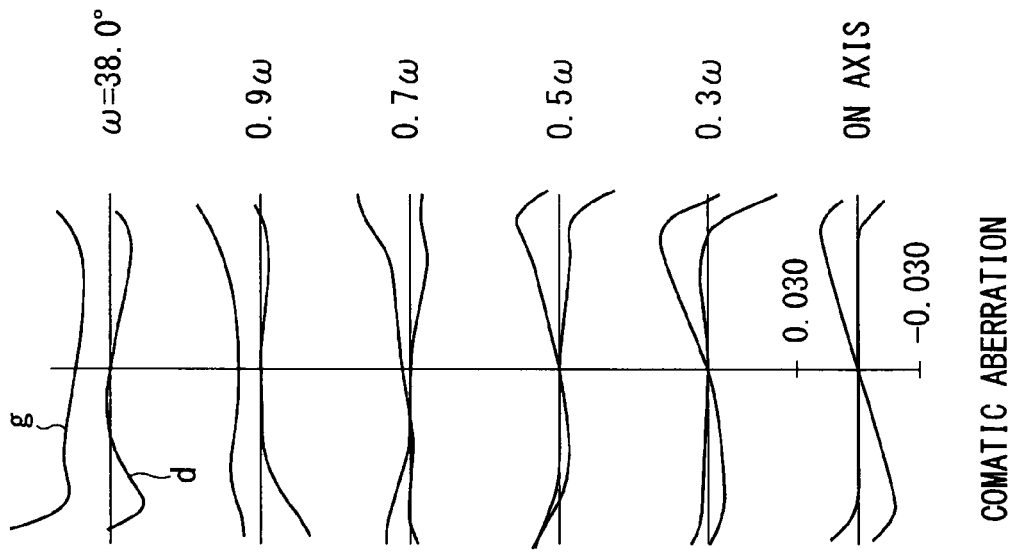
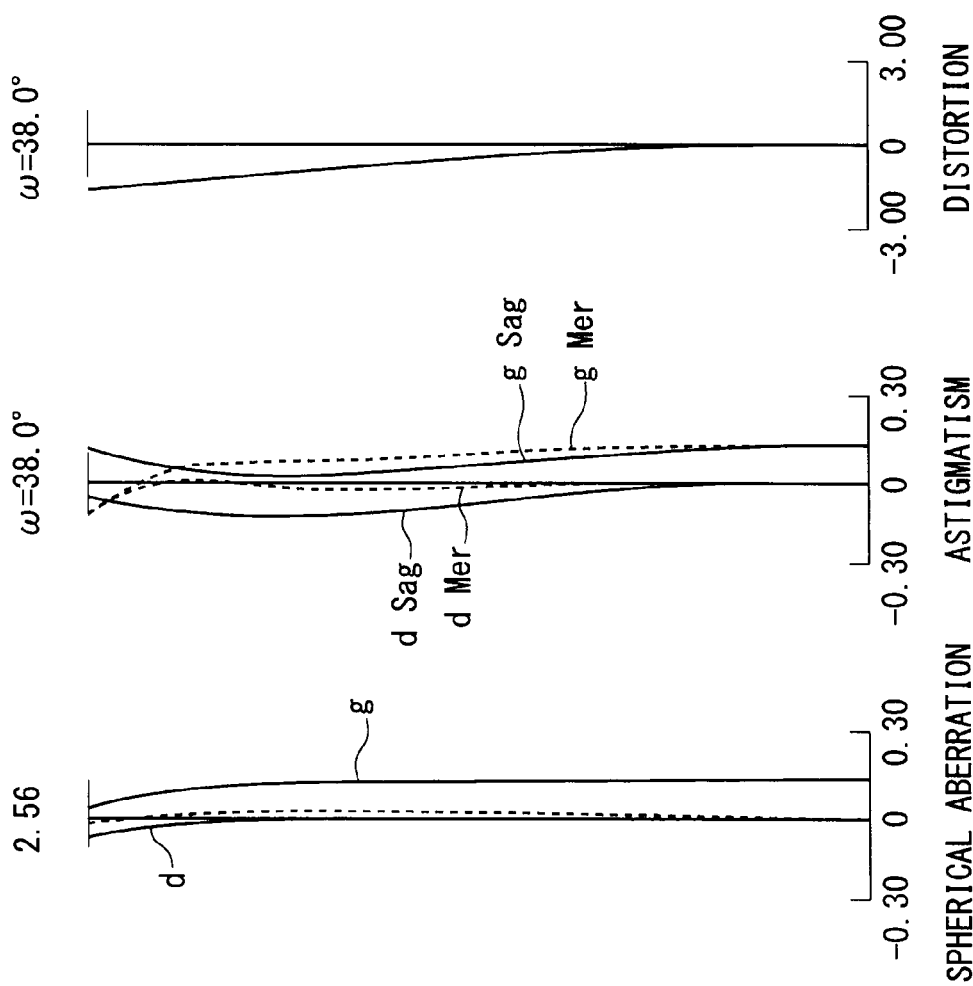
FIG. 8

FIG. 10
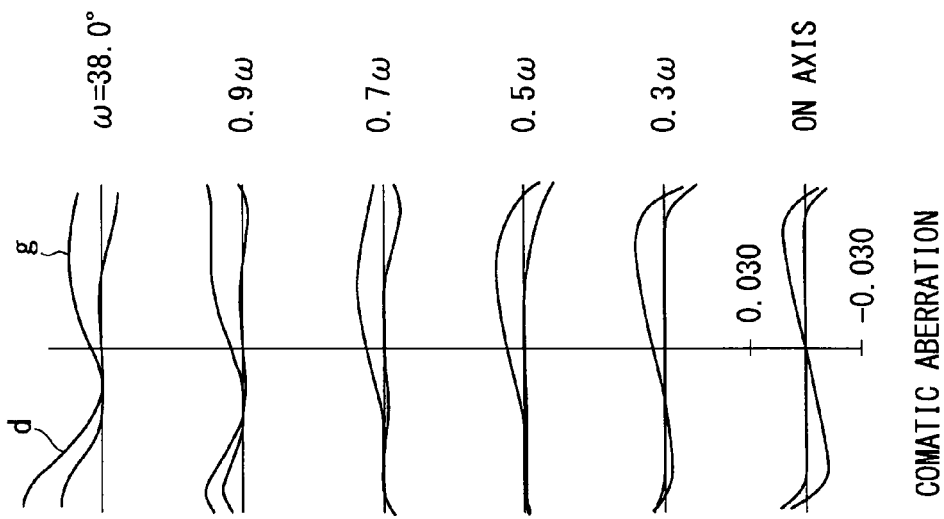
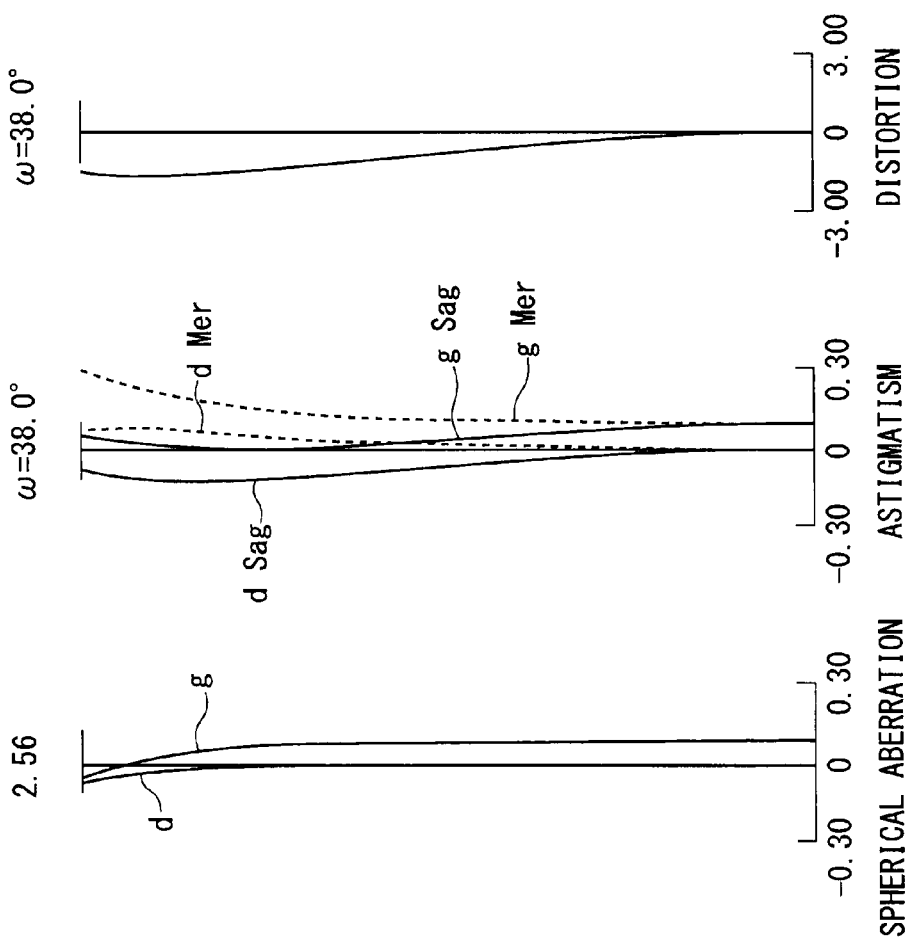

FIG. 12
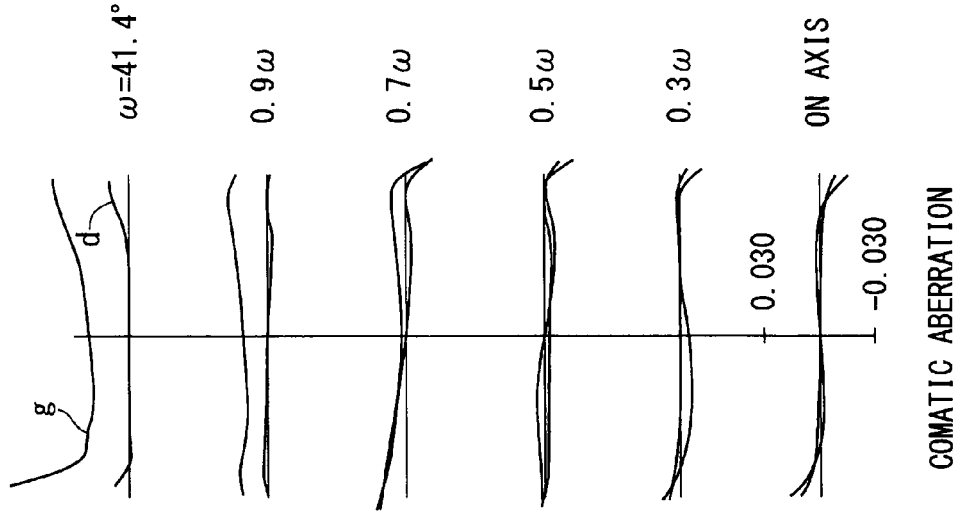
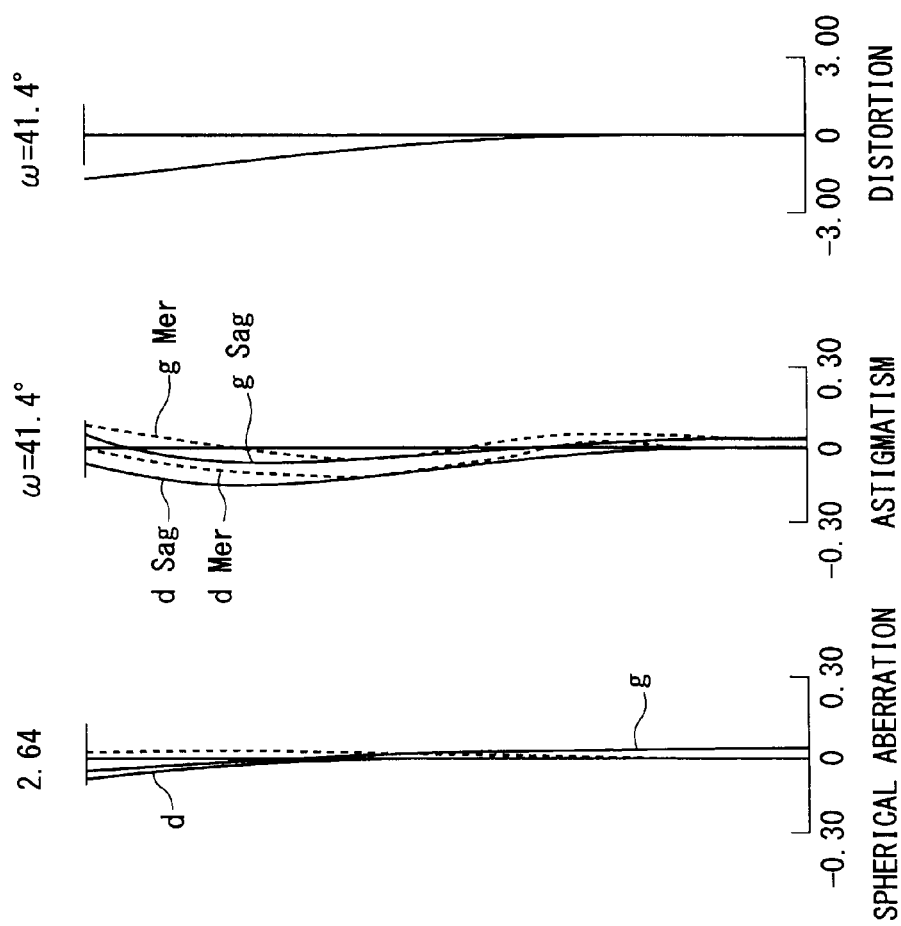

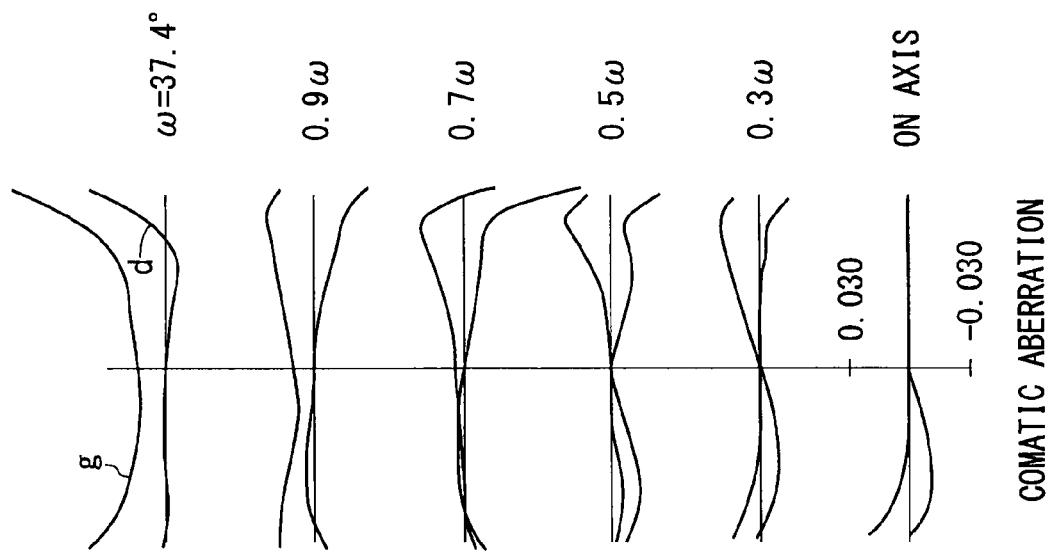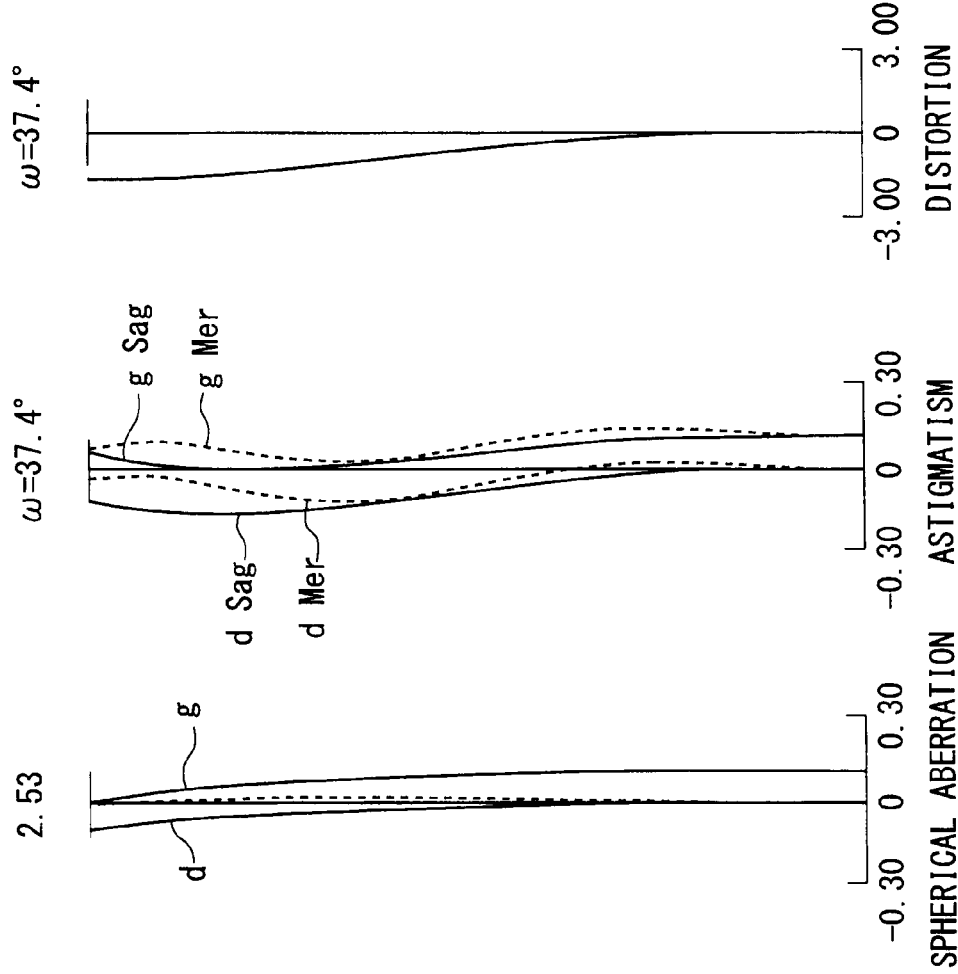
FIG. 20

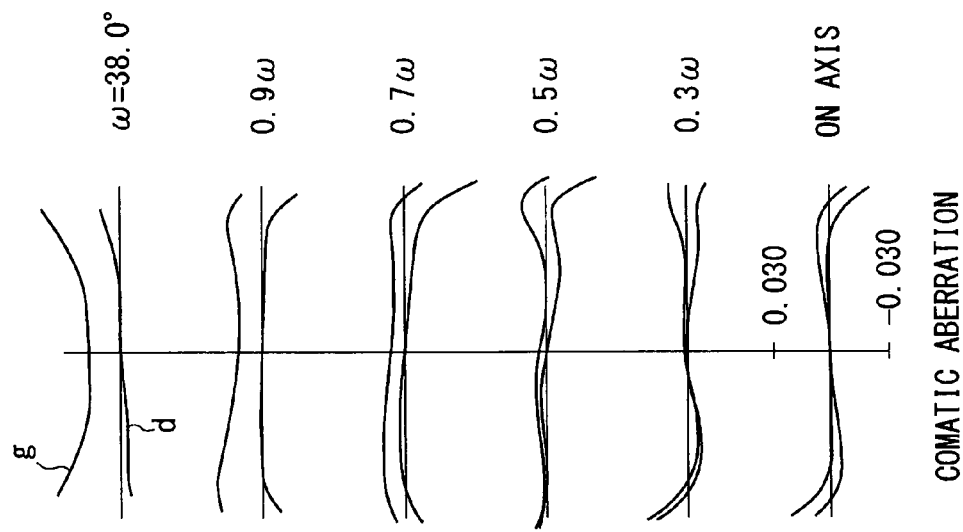
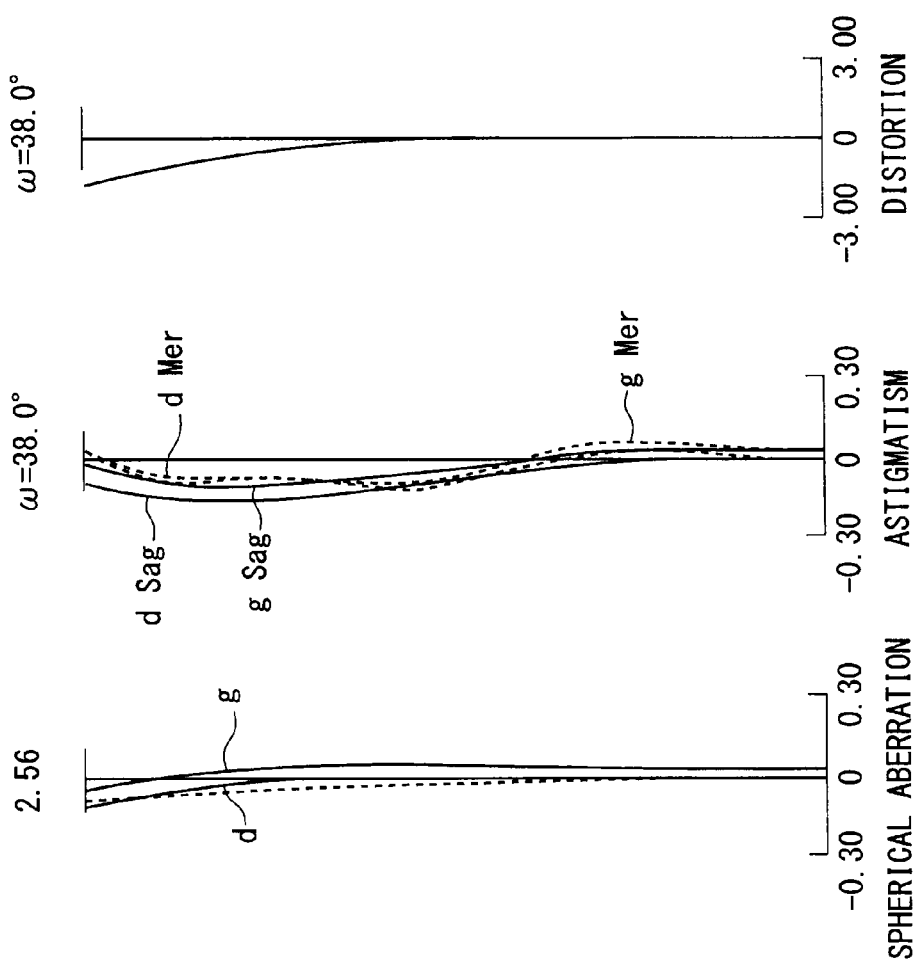
FIG. 26

FIG. 28
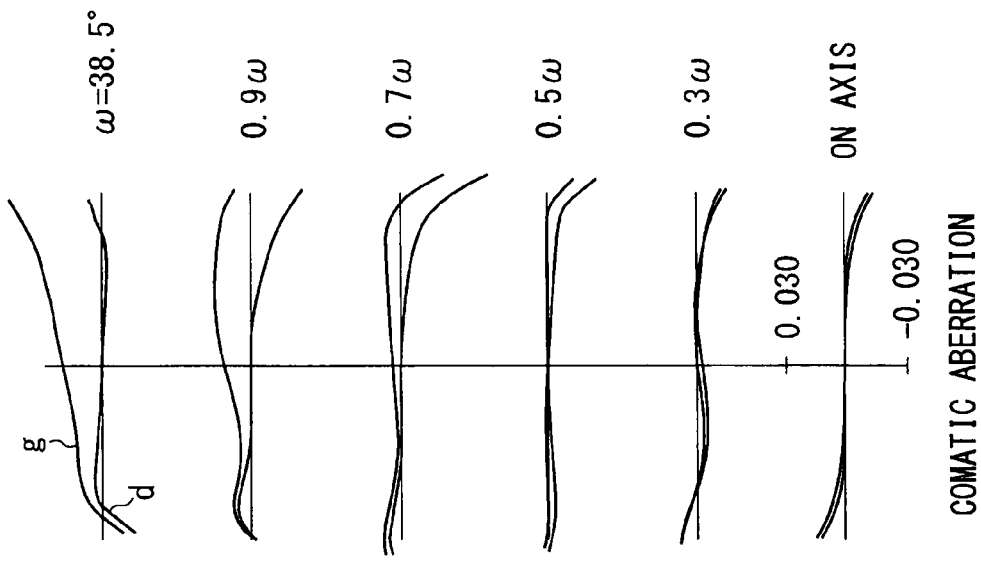
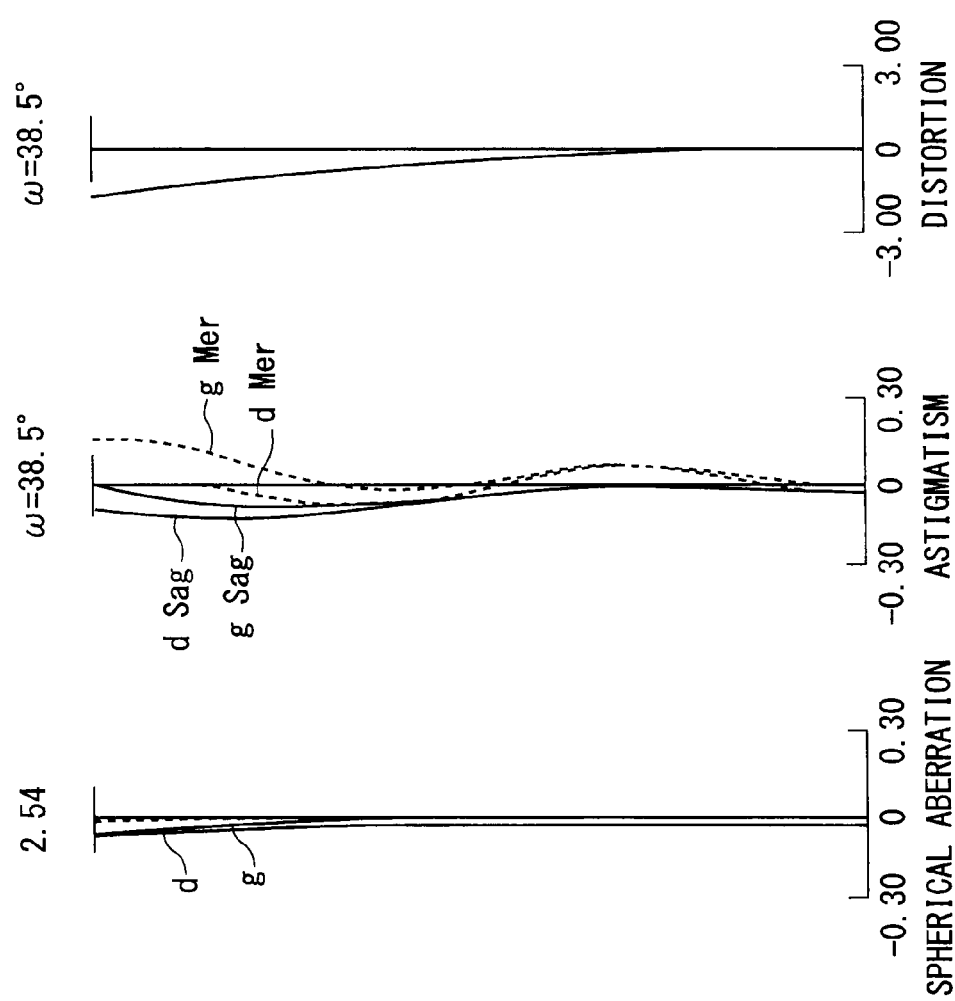

FIG. 32
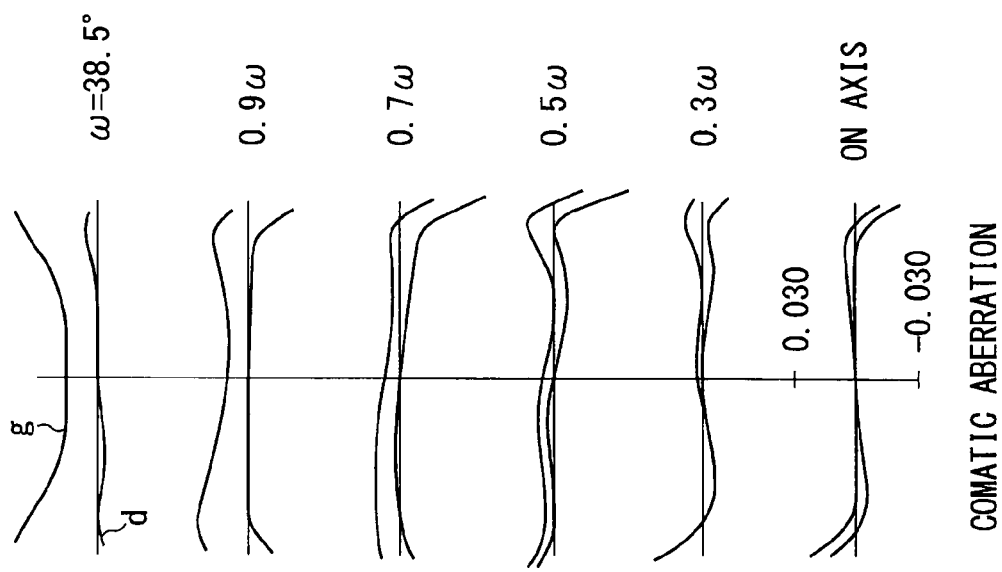
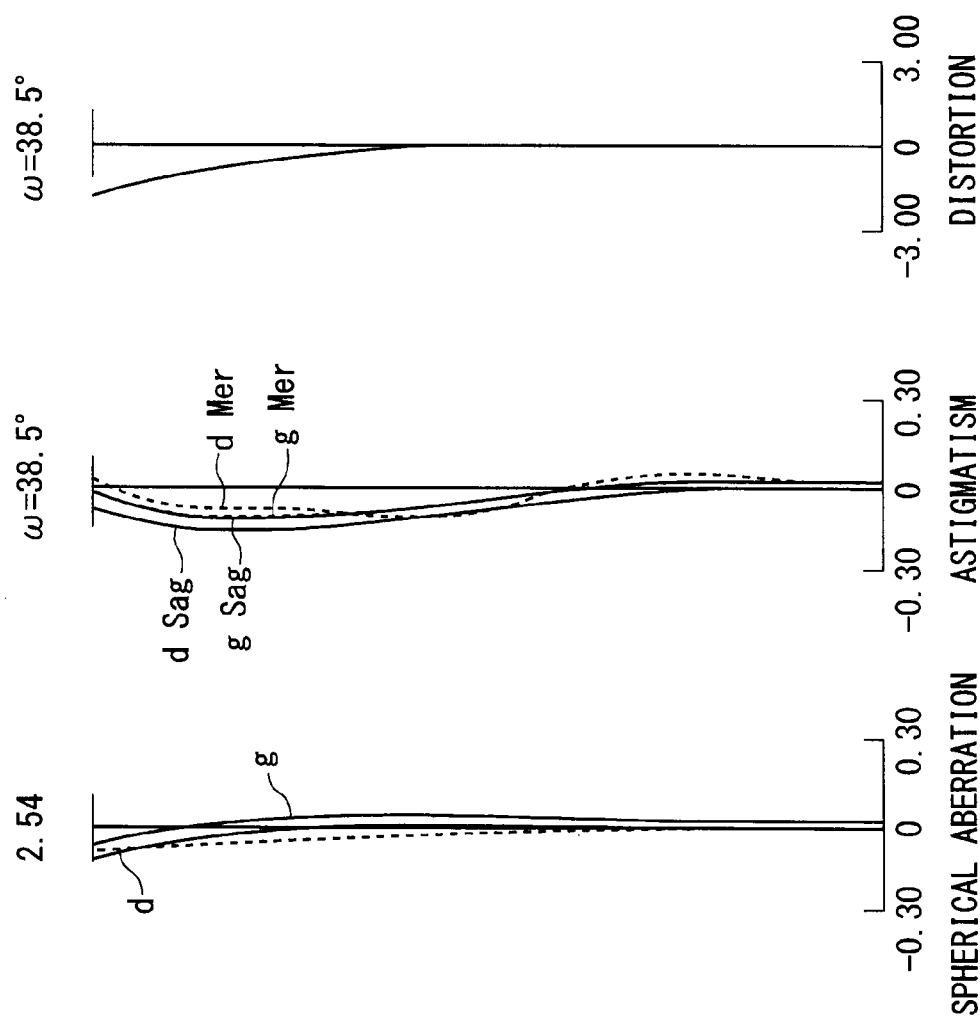

FIG. 34
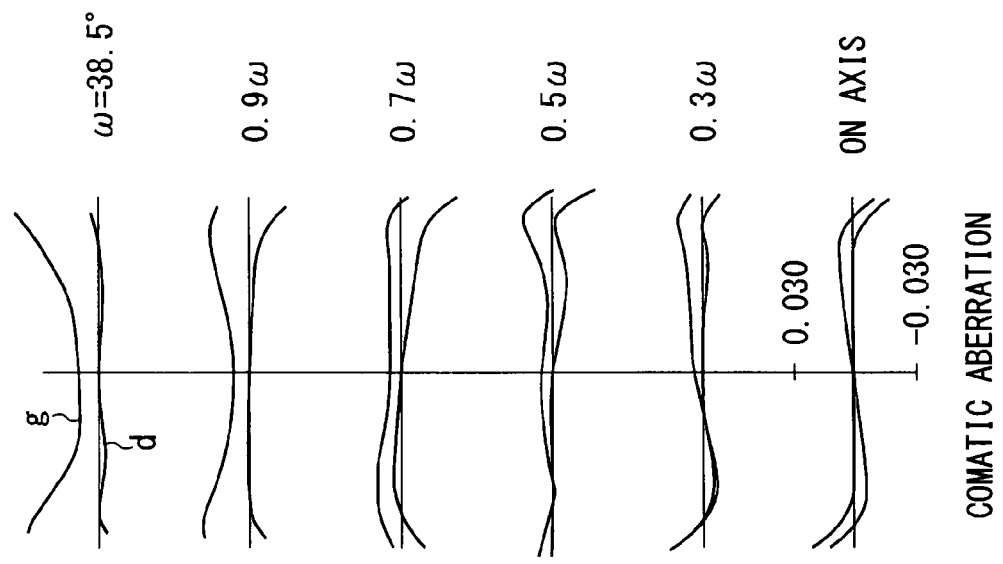
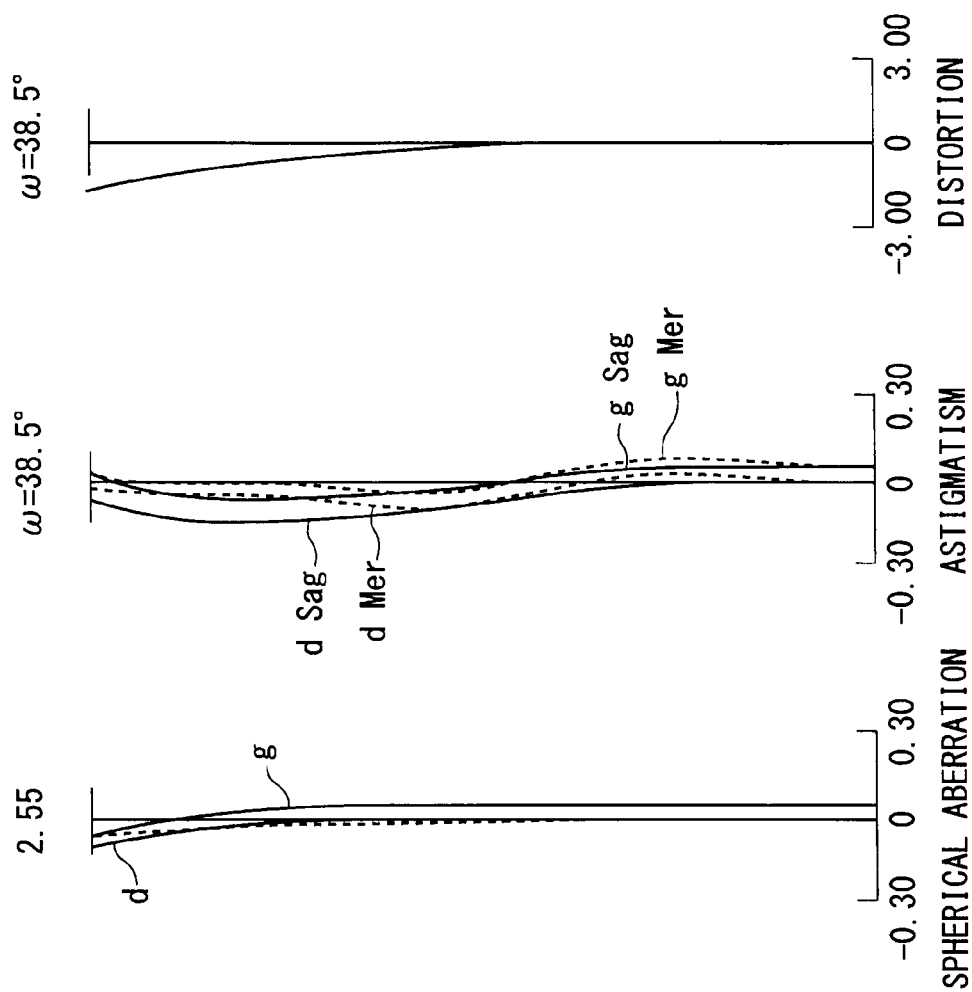

IMAGE-FORMING LENS, AND CAMERA DEVICE AND PORTABLE INFORMATION TERMINAL DEVICE WITH THE IMAGE-FORMING LENS

CROSS REFERENCE RELATED APPLICATIONS

The present application is based on and claims priority from Japanese patent application numbers 2010-137482, filed Jun. 16, 2010, 2010-137492, filed Jun. 16, 2010, and 2011-118460, filed May 26, 2011, the disclosures of which are hereby incorporated by reference herein in their entireties.

BACKGROUND

The present invention relates to an image-forming lens, and to camera devices such as a silver-halide camera, a digital camera, a video camera, a surveillance camera, and the like and a portable information terminal device with the image-forming lens.

In recent years, as an imaging apparatus using an image sensor such as a CCD, a CMOS, and the like, a digital still camera, and a digital video camera have been widely used. In particular, as such an imaging apparatus, the digital still camera has been widely used to replace the silver-halide camera.

In accordance with increasing the number of pixels on an image sensor used in such an imaging apparatus, further higher optical performance of an image-forming lens as an imaging lens is required. In addition, miniaturization in consideration of portability of the imaging apparatus has also advanced, and in the market of imaging apparatuses, imaging apparatuses having high performance and miniaturization have become mainstream. Not only high performance but also miniaturization of the imaging lens is required, too.

Moreover, since speeding up of a shooting speed has also advanced, a brighter lens as the imaging lens is required.

Regarding a field angle of the imaging lens for the digital camera, some degree of wide angle used for easily taking a snapshot is preferred, and a half-field angle: 38 degrees corresponding to a focal length corresponding to 28 mm on a 35 mm photography basis is one of guides of the field angle.

In a known imaging lens of a retrofocus type as a typical example of a wide-angle lens having a single focus, a front lens group has a negative refractive power, and it is possible to distance an exit pupil position from an image plane. However, a principle point is in the rear of the entire lens system, and therefore asymmetry of the refractive power arrangement increases, and corrections of comatic aberration, distortion, and transverse chromatic aberration may be incomplete. Imaging lenses of the retrofocus type are disclosed in Japanese patent numbers 2942280 and 2991524, and various types other than the above are known.

Additionally, an imaging lens in which a front lens group has a positive refractive power and the field angle is wide is disclosed in Japanese patent application publication number 2006-349920, Japanese patent number 3392964, and so on.

An image-forming lens disclosed in Japanese patent number 2942280 is a two lens-group type having negative and positive lens groups, and in the specifically-described embodiment, an entire length of the lens is long, and there is about −3% of distortion. An image-forming lens disclosed in Japanese patent number 2991524 is also a two lens-group type having negative and positive lens groups, and has a small number of lens elements. However, the entire length of the lens is long, and there still is room for improvement in terms of correction of field curvature.

An image-forming lens disclosed in Japanese patent application publication number 2006-349920 is a two lens-group type having a positive-lens group as a front lens group, and small, and in which aberration is suitably corrected. However, a color difference of comatic aberration is not well-considered.

An image-forming lens disclosed in Japanese patent number 3392964 is also a two lens-group type having a positive-lens group as a front lens group, and in the specifically-described embodiment, there is about −10% of distortion, and there still is room for improvement in terms of correction of aberration.

Incidentally, in an imaging apparatus where an image sensor images an image formed by the image-forming lens, the number of pixels on the image sensor has increased in recent years, and the use of the image sensor having a large number of pixels which are equal to or more than 10 million pixels has spread.

When an arrangement pitch of the pixels on this image sensor is enlarged, light sensitivity of the image sensor becomes higher, and the depth of field with regard to an imaged image becomes shallower, and an advantage in a shooting condition is large.

However, in a case where an image sensor is used on which an arrangement pitch of the pixels is large and the size of an imaging plane is large, as an image-forming lens which forms a shot image on an image sensor, generally, an image-forming lens in which an entire optical length (a distance between a lens surface on a most object side of the image-forming lens and the imaging plane) is long and a lens diameter is large is needed, and therefore the size of the imaging apparatus becomes large and portability becomes poor.

On the other hand, in order to make smaller the size of the imaging apparatus, when the image-forming lens is closer to a large-sized imaging plane, a field angle of an incident light flux onto the imaging plane increases, and there is a possibility of becoming difficult to correct aberration.

SUMMARY

An object of the present inventions is to provide an image-forming lens system which is small and provides good performance, and a camera device and a portable information terminal device using the image-forming lens system as an imaging lens.

In order to achieve the above object, an embodiment of the present invention provides: an image-forming lens comprising: from an object side to an image side in order, a first group with a positive refractive power which includes less than or equal to five lens elements of two negative lenses and equal to or more than two positive lenses and in which a first lens element on a most object side is a negative meniscus lens a convex surface of which faces the object side; an aperture; and a second group with a positive refractive power which includes less than or equal to five lens elements including at least one cemented lens of a positive lens and a negative lens; wherein each of the first group and the second group shifts independently to perform focusing to a limited object distance, and an interval between the first lens element and a second lens element placed close to a surface on the image side of the first lens element: $d1_{1-2}$ and an interval between the second lens element and a third lens element placed close to a surface on the image side of the second lens element: $d1_{2-3}$ satisfy Conditional Expression A: $0.0 < d1_{2-3}/d1_{1-2} < 1.0$.

In order to achieve the above object, an embodiment of the present invention provides: an image-forming lens comprising: from an object side to an image side in order, a first group with a positive refractive power which includes less than or equal to four lens elements of equal to or more than two negative lenses and one positive lens and in which a first lens element on a most object side is a negative meniscus lens a convex surface of which faces the object side and a second lens element placed close to a surface on the image side of the first lens element is a negative lens; an aperture; and a second group with a positive refractive power which includes five lens elements including at least one cemented lens of a positive lens and a negative lens; wherein each of the first group and the second group shifts independently to perform focusing to a limited object distance, and an interval between the first lens element and the second lens element: $d1_{1-2}$ and an interval between the second lens element and a third lens element placed close to a surface on the image side of the second lens element: $d1_{2-3}$ satisfy Conditional Expression B: $0.0 < d1_{2-3}/d1_{1-2} < 0.4$.

In order to achieve the above object, an embodiment of the present invention provides: an image-forming lens comprising: from an object side to an image side in order, a first group with a positive refractive power which includes less than or equal to five lens elements of two negative lenses and equal to or more than two positive lenses and in which a first lens element on a most object side is a negative meniscus lens a convex surface of which faces the object side; an aperture; and a second group with a positive refractive power which includes less than or equal to five lens elements including at least one cemented lens of a positive lens and a negative lens, a negative lens and a positive lens; wherein each of the first group and the second group shifts independently to perform focusing to a limited object distance, and an interval between the first lens element and a second lens element placed close to a surface on the image side of the first lens element: $d1_{1-2}$ and an interval between the second lens element and a third lens element placed close to a surface on the image side of the second lens element: $d1_{2-3}$ satisfy Conditional Expression A: $0.0 < d1_{2-3}/d1_{1-2} < 1.0$.

BRIEF DESCRIPTION OF THE DRAWINGS

FIG. 8 is an aberration diagram of the image-forming lens of Example 4.
FIG. 10 is an aberration diagram of the image-forming lens of Example 5.
FIG. 12 is an aberration diagram of the image-forming lens of Example 6.
FIG. 20 is an aberration diagram of the image-forming lens of Example 10.
FIG. 26 is an aberration diagram of the image-forming lens of Example 13.
FIG. 28 is an aberration diagram of the image-forming lens of Example 14.
FIG. 32 is an aberration diagram of the image-forming lens of Example 16.
FIG. 34 is an aberration diagram of the image-forming lens of Example 17.

DETAILED DESCRIPTION OF THE PREFERRED EMBODIMENTS

Figure 1:
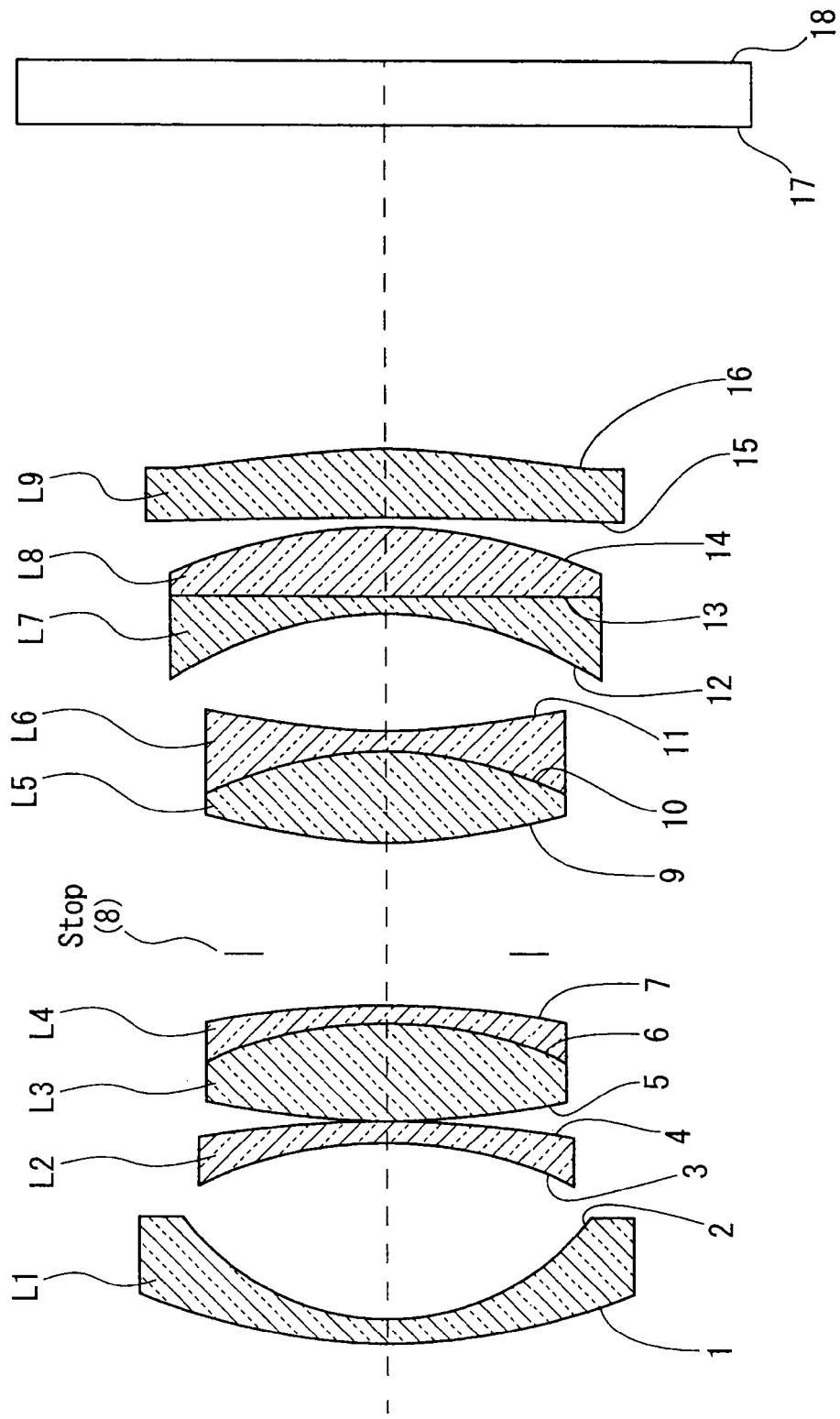
FIG. 1 is a diagram illustrating a lens constitution of an image-forming lens of Example 1.
Figure 2:
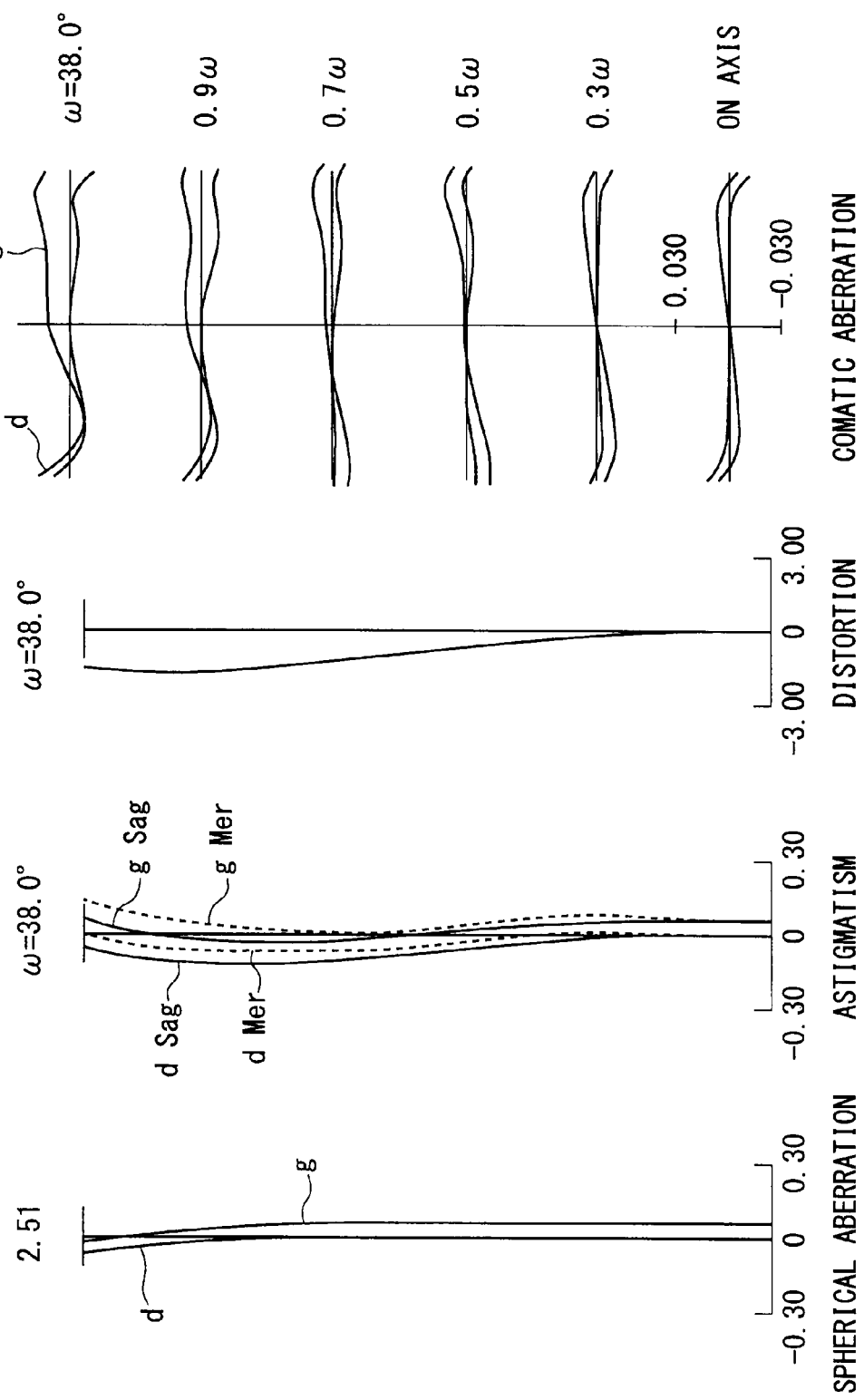
FIG. 2 is an aberration diagram of the image-forming lens of Example 1.

In an image-forming lens according to an example of the present invention, a first group and a second group are shifted independently, and an interval between the first group and the second group is changed by focusing depending on an object distance, in a case of focusing on an object in a limited object distance.

Conditional Expression B: $0.0 < d1_{2-3}/d1_{1-2} < 0.4$ is a conditional expression in which a change of an interval between lens elements in accordance with focusing is considered. In a case where Conditional Expression B is not satisfied, axial chromatic aberration occurring by the change of the interval between the lens elements tends to be corrected excessively, and comatic aberration easily occurs greatly. In Conditional Expression B, $d1_{1-2}$ denotes an interval between a first lens element and a second lens element placed on an image side of the first lens element, and $d1_{2-3}$ denotes an interval between the second lens element and a third lens element placed on an image side of the second lens element.

Conditional Expression C: $1.2<|f1_1/F|<1.8$ is a conditional expression to control a range of magnitude relationship between a focal length $f1_1$ (<0) of a negative meniscus lens (a first lens element) placed on a most object side of the first group and a focal length F (>0) of an entire lens system. The image-forming lens according to an example of the present invention enables a large diameter by placing a negative meniscus lens a convex surface of which faces an object side on the most object of the first group. And in a case where Conditional Expression C is not satisfied, a refractive power of the first lens element (negative meniscus lens) is larger or smaller with respect to a refractive power of the entire lens system, and an incident angle of an incident light flux is greatly affected, and comatic aberration becomes large.

Under the condition of a large diameter, beyond a range of Conditional Expression D: $-0.7<R1_2/R1_3 \leq 0.0$, an incident angle of an incident light flux is greatly affected, and spherical aberration and comatic aberration occur greatly. In Conditional Expression D, $R1_2$ denotes a radius of curvature on the image side of the first lens element, and $R1_3$ denotes a radius of curvature on the object side of the second lens element.

Conditional Expression E: $0.7<f1_{n1}/f1_{n12}<2.3$ is a conditional expression to control a range of magnitude relationship of the ratio between a focal length of the first lens element and a combined focal length of the first lens element and a second lens element next on an image side of the first lens element. In Conditional Expression E, $f1_{n1}$ denotes a focal length of the first lens element, and $f1_{n12}$ denotes a combined focal length of the first lens element and the second lens element.

In a case where Conditional Expression E is not satisfied, refractive power balance between the first lens element and the second lens element collapses, axial chromatic aberration is corrected excessively, and additionally, an angle of an incident light flux is greatly changed, and comatic aberration increases.

Conditional Expression F: $30<Nd3 \cdot vd3-Nd4 \cdot vd4<50$ is a conditional expression to correct axial chromatic aberration favorably. By forming a lens element on the most image side of the first group into a cemented lens of a positive lens and a negative lens, it is possible for the cemented lens to have a function of correcting axial chromatic aberration. However, in a case where Conditional Expression F is not satisfied, axial chromatic aberration is corrected excessively. In Conditional Expression F, Nd3 denotes a refractive index of a d-line of the positive lens, vd3 denotes an Abbe's number of the d-line of the positive lens, Nd4 denotes a refractive index of a d-line of the negative lens, and vd4 denotes an Abbe's number of the d-line of the positive lens.

In later-described examples where the cemented lens of the positive lens and the negative lens is used in the first group, a high-refractive-index and low-dispersion glass of the refractive index of the d-line Nd3=equal to more than 1.8, and Abbe's number of the d-line vd3≈about 40 is used as the positive lens, and a high-refractive-index and high-dispersion glass of the refractive index of the d-line Nd4=equal to more than 1.8, and Abbe's number of the d-line vd4=about 23 is used as the negative lens, and thereby axial chromatic aberration is optimized.

The image-forming lens according to an example of the present invention preferably has a positive lens of the first group that is a biconvex lens, and a lens element on the most image side of the second group that is a biconvex lens. A lens element on the image side of the first group can be a single biconvex lens, and also can be structured by a biconvex lens and a concave lens placed on an image side of the biconvex lens. In a case where the concave lens is placed on the image side of the biconvex lens, the biconvex lens and the concave lens can be a cemented lens.

In addition, in a case where the lens element on the most object side of the second group is a biconvex lens, a negative lens can be cemented on an image side of the biconvex lens.

Conditional Expression G: $0.9<f1_{ep}/f2_{11}<2.2$ is a conditional expression to control magnitude relationship of power of the biconvex lenses, in a case where each of these biconvex lenses is used individually, or in a case where these biconvex lenses are used as cemented lenses. In Conditional Expression G, $f1_{ep}$ denotes a focal length of the positive lens of the first group, and $f2_{11}$ denotes a focal length of the most object side of the second group.

Preferably, in the image-forming lens according to an example of the present invention, the first lens element and the second lens element are negative lenses, positions of a lens element on a most image side of the first group and a lens element on a most object side of the second group are parts where light flux is largest. Magnitude relationship of light flux in these parts is greatly affected on spherical aberration. In a case where Conditional Expression G is not satisfied, balance of spherical aberration collapses, and image-forming performance in the center of the image plane is affected.

Conditional Expression H: $0.5<|R1_1/R2_e|<1.5$ is a conditional expression which relates to a correction of astigmatism, comatic aberration, and spherical aberration. When Condition Expression H exceeds a lower limit, astigmatism increases, and excessive comatic aberration occurs, and the entire optical length becomes long. In Conditional Expression H, $R1_1$ denotes a radius of curvature of a surface on an object side of the first lens element, and $R2_e$ denotes a radius of curvature of a surface on an image side of a lens element on a most image side of the second group.

When Condition Expression H exceeds an upper limit, negative spherical aberration occurs greatly, and astigmatism increases, and image performance is greatly affected.

Conditional Expression I: $1.4<|R1_e/R2_1|<34.0$ is a conditional expression which relates to a correction of distortion and astigmatism. In a case where Conditional Expression I is not satisfied, negative distortion or positive distortion occurs greatly, and astigmatism also increases excessively.

A lens surface on a most image side of the first group and a lens surface on a most object side of the second group have convex shapes, preferably. That is, it is possible to suppress the occurrence of transverse chromatic aberration, astigmatism, and distortion by forming lens surfaces next to each other via the aperture interposed between the first group and the second group into an approximately symmetric shape.

As described in later-described Examples, by satisfying the above-described Conditional Expressions B to I, it is possible to achieve an image-forming lens which is bright, and small, and provides good performance.

An image-forming lens according to an example of the present invention performs focusing to the limited object distance by shifting independently each of the first group and the second group. Conditional Expression J: $-1.0<Log|(D1_\infty-D1_t)/(D2_\infty-D2_t)|<-0.4$ is a conditional expression that relates to focusing to such a limited object distance. In Conditional Expression J, $|(D1_\infty-D1_t)/(D2_\infty-D2_t)|$ expresses a ratio between a shifting amount of the first group and a shifting amount of the second group of a case of focusing to an object in infinity and a case of focusing to a reference closest imaging distance. If $|(D1_\infty-D1_t)/(D2_\infty-D2_t)|$ is "0 $(D1_\infty=D1_t)$", the shift amounts of the first group and the second group are the same, and the image-forming lens integrally shifts to the object side to perform focusing. In Conditional Expression J, $D1_\infty$ denotes an interval between the first group and the second group in a case where an object position is infinity, $D1_t$ denotes an interval between the first group and the second group in a case of focusing to a reference closest imaging distance, $D2_\infty$ denotes an interval between the second group and an image plane in a case where the object position is infinity, and $D2_t$ denotes an interval between the second group and the image plane in a case of focusing to the reference closest imaging distance. And Log is taken as a common logarithm.

When Conditional Expression J exceeds a lower limit, the shift amount of the first group decreases, and an influence of a production error of each group increases. Therefore, a highly accurate assembly operation is required in a case of assembling the lens, and accordingly it is unfavorable in terms of production cost.

In addition, in a case of focusing on an object position more distant than the reference closest imaging distance, it is not easy to shift the first group by a small accurate shift amount.

When Conditional Expression J exceeds an upper limit, shift amounts of the first group and the second group for focusing increase.

When the shift amount for focusing increases, operability and portability of a camera device and a portable information terminal device are easily damaged. Additionally, it is not easy to achieve high-speed focusing which is necessary for high-speed imaging.

As described above, in the image-forming lens according to an example of the present invention, in a case of focusing on an object in the limited object distance, each of the first group and the second group shifts independently, and an interval between the first group and the second group is changed by focusing depending on the object distance.

Conditional Expression A: $0.0<d1_{2-3}/d1_{1-2}<1.0$ is a conditional expression to correct properly axial chromatic aberration by a change of the interval of lens elements in accordance with such focusing and suppress an occurrence of comatic aberration. In a case where Conditional Expression A is not satisfied, the axial chromatic aberration occurring by the change of the interval of the lens groups tends to be corrected excessively, and comatic aberration also occurs greatly. In Conditional Expression A, $d1_{1-2}$ denotes an interval between the first lens element and a second lens element placed on an image side of the first lens element, and $d1_{2-3}$ denotes an interval between the second lens element and a third lens element placed on an image side of the second lens element.

Conditional Expression K: $-0.1<f1_1/f1_2<-1.0$ is a conditional expression relates to correction of spherical aberration, astigmatism, and field curvature. In a case where Conditional Expression K is not satisfied, power balance between a negative meniscus lens (first lens element) on a most object side of the first group a convex surface of which faces the object side and a positive lens (a second lens element) next to a surface on an image side of the negative meniscus lens collapses, and balance between spherical aberration and astigmatism becomes worse, and field curvature occurs greatly. The image-forming lens according to an example of the present invention is capable of being a large diameter by placing the negative meniscus lens the convex surface of which faces the object side on the most object side of the first group. In a case where Conditional Expression K is not satisfied, influence on the incident light flux increases. In Conditional expression K, $f1_1$ denotes a focal length of the first lens element, and $f1_2$ denotes a focal length of the second lens element.

Conditional Expression L: $0.4<|R1_1/R2_e|<2.1$ is a conditional expression that relates to correction of astigmatism, comatic aberration, and spherical aberration. When Conditional Expression L exceeds a lower limit, excessive astigmatism and comatic aberration occur. When Conditional Expression L exceeds an upper limit, negative spherical aberration increases, and excessive astigmatism occurs. In Conditional Expression L, $R1_1$ denotes a radius of curvature of a surface on an object side of the first lens element, and $R2_e$ denotes a radius of curvature of a surface on an image side of a lens element on a most object side of the second group.

Conditional Expression M: $1.2<|R1_e/R2_1|<2.6$ is a conditional expression that relates to correction of distortion, and astigmatism. In a case where Conditional Expression M is not satisfied, positive distortion or negative distortion increases, and astigmatism also becomes excessive. In Conditional Expression M, $R1_e$ denotes a radius of curvature of a surface on an object side of the first lens element, and $R2_1$ denotes a radius of curvature of a surface on an image side of a lens element on a most object side of the second group.

The image-forming lens according to an example of the present invention performs focusing to the limited object distance by shifting independently each of the first group and the second group. Conditional Expression N: $-1.5E+1<Log|(D1_\infty-D1_t)/(D2_\infty-D2_t)|<-5.0E-2$ is a conditional expression that relates to focusing to such a limited object distance. In Conditional Expression N, $(D1_\infty-D1_t)/(D2_\infty-D2_t)$ expresses a ratio between a shift amount (an extension amount) of the first group and a shift amount (an extension amount) of the second group of a case of focusing to an object in infinity and a case of focusing to the reference closest imaging distance. If $|(D1_\infty-D1_t)/(D2_\infty-D2_t)|$ is "0 $(D1_\infty-D1_t)$", the shift amounts of the first group and the second group are the same, and the image-forming lens integrally shifts to the object side to perform focusing. In Conditional Expression N, $D1_\infty$ denotes an interval between the first group and the second group in a case where an object position is infinity, $D1_t$ denotes an interval between the first group and the second group in a case of focusing to a reference closest imaging distance, $D2_\infty$ denotes an interval between the second group and an image plane in a case where the object position is infinity, and $D2_t$ denotes an interval between the second group and the image plane in a case of focusing to the reference closest imaging distance. And Log is taken as a common logarithm.

When Conditional Expression N exceeds a lower limit, the shift amount of the first group decreases, an influence of a production error of each group increases. Therefore, a highly accurate assembly operation is required in a case of assembling the lens, and accordingly it is unfavorable in terms of production cost.

In addition, in a case of focusing on an object position more distant than the reference closest imaging distance, it is not easy to shift the first group by a small accurate shift amount.

When Conditional Expression N exceeds an upper limit, shift amounts of the first group and the second group for focusing increase.

When the shift amount for focusing increases, operability and portability of a camera device and a portable information terminal device are easily damaged. Additionally, it is not easy to achieve high-speed focusing which is necessary for high-speed imaging.

It is possible to correct chromatic aberration by forming each of a lens element on a most image side of the first group and a lens element on a most object side of the second group into a cemented lens of a positive lens and a negative lens. Additionally, using a cemented lens makes assembly of the lens easy in a case of actual assembling of the image-forming lens.

In particular, by using the cemented lens as the lens element on the most object side of the second group, it is possible to correct axial chromatic aberration effectively.

Conditional Expression O: $2.0<f1_e/f2_1<7.9$ is a conditional expression that relates to correction of spherical aberration and astigmatism by controlling each power balance between the cemented lens on the most image side of the first group and the cemented lens on the most object side of the second group. When Conditional Expression O exceeds a lower limit, astigmatism increases by lack of correction of spherical aberration. When Conditional Expression O exceeds an upper limit, astigmatism increases. In Conditional Expression O, $f1_e$ denotes a focal length of the first cemented lens, and $f2_1$ denotes a focal length of the second cemented lens.

Conditional Expression P: $0.7<(Nd4 \cdot vd4 - Nd3 \cdot vd3)/(Nd5 \cdot vd5 - Nd6 \cdot vd6)<1.6$ is a conditional expression to control a combination of materials of a cemented lens in a case of forming a lens element on a most image side of the first group into a cemented lens of a positive lens and a negative lens and forming a lens element on a most object side of the second group into a cemented lens of a positive lens and a negative lens. In a case where Conditional Expression P is satisfied, it is possible to correct favorably axial chromatic aberration and astigmatism in particular. However, in a case where Conditional Expression P is not satisfied, axial chromatic aberration and astigmatism increase. In Conditional Expression P, Nd3 denotes a refractive index of a d-line of the negative lens of the first cemented lens, vd3 denotes an Abbe's number of the d-line of the negative lens of the first cemented lens, Nd4 denotes a refractive index of a d-line of the positive lens of the first cemented lens, vd4 denotes an Abbe's number of the d-line of the positive lens of the first cemented lens, Nd5 denotes a refractive index of a d-line of the positive lens of the second cemented lens, vd5 denotes an Abbe's number of the d-line of the positive lens of the second cemented lens, Nd6 denotes a refractive index of a d-line of the negative lens of the second cemented lens, and vd6 denotes an Abbe's number of the d-line of the negative lens of the second cemented lens.

As described in the examples, by satisfying Conditional Expressions A, K, and L to N, it is possible to achieve a bright and small image-forming lens that provides good performance. In addition, by satisfying Conditional Expressions O and P, it is possible to achieve favorable performance.

An arrangement position of an aperture can be between the first group and the image plane, however from the viewpoint that it is possible to suppress an occurrence of pupil aberration, prevent lens diameters of the first group and the second group from increasing excessively in size by the a front aperture or a rear aperture, miniaturize, and so on, a most favorable arrangement position of the aperture is between the first group and the second group.

As described above, the first group includes less than or equal to five lens elements including two negative lenses and equal to or more than two positive lenses. A lens element (a first lens element) on a most object side is a negative meniscus lens a convex surface of which faces the object side, and a lens element (a second lens element) next to an image side of the negative meniscus lens is a positive lens.

In such a lens constitution, aberrations occurring in the negative lens on the most object side (the negative meniscus lens the convex surface of which faces the object side, the first lens element), spherical aberration and astigmatism in particular, are corrected by the positive lens next to the surface on the image side of the negative lens (the second lens element), and by using other positive lens and negative lens, it is possible to correct axial chromatic aberration.

Preferably, the second group includes less than or equal to five lens elements including at least one cemented lens of a positive lens and a negative lens, a negative lens, and a positive lens. Therefore, in this case, the second group includes four or five lens elements.

Thus, in the second group, other than the at least one cemented lens, equal to or more than two lens elements are used. By constituting the second group as the above, it is possible to effectively correct comatic flare, astigmatism, and field curvature.

In addition, preferably, by forming each of a shape of a lens surface on the most image side of the first group and a shape of a lens surface on the most object side of the second group into a convex shape, respectively, and placing the aperture between the first group and the second group, a shape of the lens surfaces next to each other via the aperture interposed between the first group and the second group becomes approximately symmetric, and therefore it is possible to effectively suppress an occurrence of transverse chromatic aberration, astigmatism, and distortion in particular.

Moreover, preferably, the first group of the image-forming lens according to an example of the present invention includes less than or equal to four lens elements including equal to or more than two negative lenses and one positive lens. In particular, the first group includes three lens elements of two negative lenses and one positive lens, or includes four lens elements of three negative lenses and one positive lens.

Preferably, two lens elements from the most object side of the first group are negative lenses, and a negative lens on the most object side (a first lens element) is a negative meniscus lens a convex surface of which faces the object side. A negative lens (a second lens element) placed on an image side of the negative meniscus lens on the most object side can be a negative meniscus lens, or a plano-concave lens, or biconcave lens, as described in later-described examples.

In a case where two negative meniscus lenses are placed from the most object side of the first group, it is preferable that concave surfaces of these negative meniscus lenses face each other.

In a case where the first group includes three lens elements, a positive lens is placed on the most image side. The positive lens is a biconvex lens, preferably.

In a case where the first group includes four lens elements, it is preferable to place a negative lens and a positive lens in order from the most image side of the first group, and the positive lens and the negative lens can be a cemented lens. In each case, it is preferable that the positive lens be a biconvex lens and the negative lens be a negative meniscus lens.

As described above, in the image-forming lens according to a example of the present invention, two negative lenses are placed from the most object side of the first group. By successively placing two negative lenses in this manner, it is possible to favorably correct transverse chromatic aberration and comatic aberration in particular.

Additionally, it is possible to achieve a large diameter by a negative meniscus lens on the most object side a convex surface of which faces the object side.

In the second group, at least one cemented lens of a positive lens and a negative lens is included. By this cemented lens, it is possible to favorably correct axial chromatic aberration. Since five lens elements constitute the second group, three lens elements other than the cemented lens can be used. By those lens elements, it is possible to effectively correct comatic flare, astigmatism, and field curvature.

In later-described examples, including a purpose of ensuring a back focus, the second group includes a combination of a cemented lens, a negative lens, a positive lens, and a positive lens, from the object side in order. However, other than the above combination, for example, by using three lens elements other than the cemented lens, it is possible to correct various aberrations, and the lens constitution of the second group is not limited thereto.

As described above, the image-forming lens according to an example of the present invention has two positive and positive groups, and the number of lens elements are eight to ten.

Hereinafter, embodiments of the present invention will be explained.

FIGS. 1, 3, 5, 7, 9, 11, 13, 15, 17, 19, 21, 23, 25, 27, 29, 31, and 33 illustrate embodiments of an image-forming lens. The embodiments illustrated in those drawings illustrate an arrangement of lens elements in a case where an object distance of the image-forming lens is infinity.

Each of those embodiments respectively corresponds to Examples 1 to 17 described later in order.

In FIGS. 1, 3, 5, 7, 9, 11, 13, 15, 17, 19, 21, 23, 25, 27, 29, 31, and 33 reference signs are shared. A lens element, which is in the ith from the left in the drawings which is an object side, has a reference sign Li (i=1 to 10), and "Stop" denotes an aperture. A transparent parallel plate arranged on an image plane side of a lens system illustrates a cover glass of an image sensor, various filters, or the like as an optically equivalent transparent parallel plate.

As a digital still camera, in a camera device using a CCD (CMOS) image sensor, between an image-forming lens system and an image sensor, at least one of a back glass, a low-pass filter, an infrared cut glass, a cover glass for protecting a light-receiving surface of a CCD (CMOS) image sensor, and the like is interposed. Such an inserted transparent plate is illustrated as one transparent parallel plate as illustrated above.

Each surface of the lens elements, the aperture "Stop", and the transparent parallel plate has a serial number (1, 2, 3 . . . ) as a surface number.

In an embodiment illustrated in FIG. 1, an image-forming lens includes nine lens elements L1 to L9. Lens elements L1 to L4 arranged on an object side from the aperture "Stop" (the left side from the aperture "Stop" in FIG. 1) constitute a first group, and lens elements L5 to L9 arranged on an image side from the aperture "Stop" (the right side from the aperture "Stop" in FIG. 1) constitute a second group.

The lens element L1 is a negative meniscus lens a convex surface of which faces the object side. The lens element L2 is a negative meniscus lens a convex surface of which faces the image side. The lens element L3 is a biconvex lens. The lens element L4 is a negative meniscus lens a convex surface of which faces the image side. The lens element L3 and the lens element L4 are cemented.

The lens element L5 is a biconvex lens. The lens element L6 is a biconcave lens. The lens element L7 is a negative meniscus lens. The lens element L8 is a positive meniscus lens. The lens element L9 is a positive meniscus lens a convex surface of which faces the image side. The lens element L5 and the lens element L6 are cemented. And the lens element L7 and the lens element L8 are also cemented.

Figure 3:
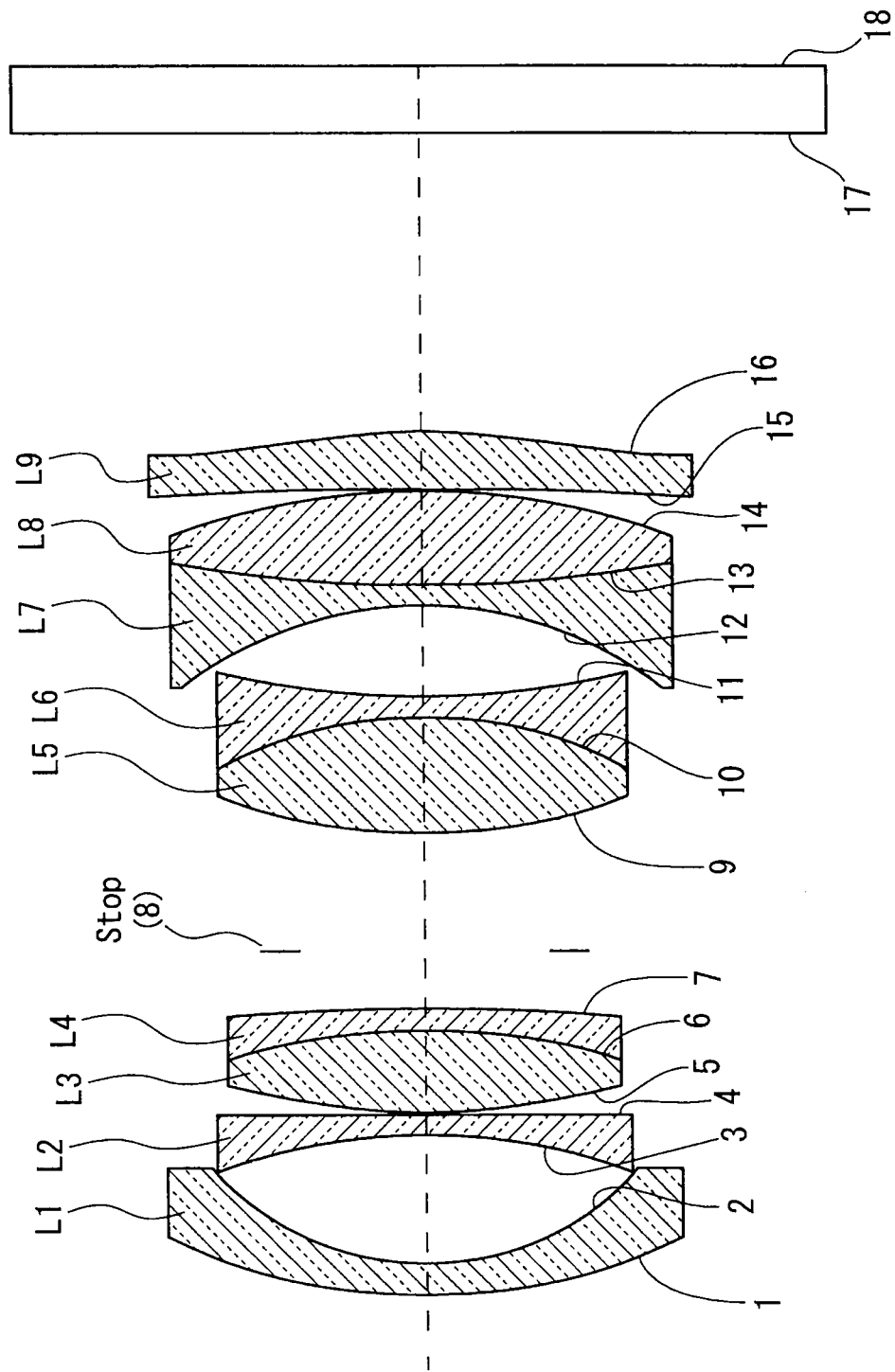
FIG. 3 is a diagram illustrating a lens constitution of an image-forming lens of Example 2.
Figure 4:
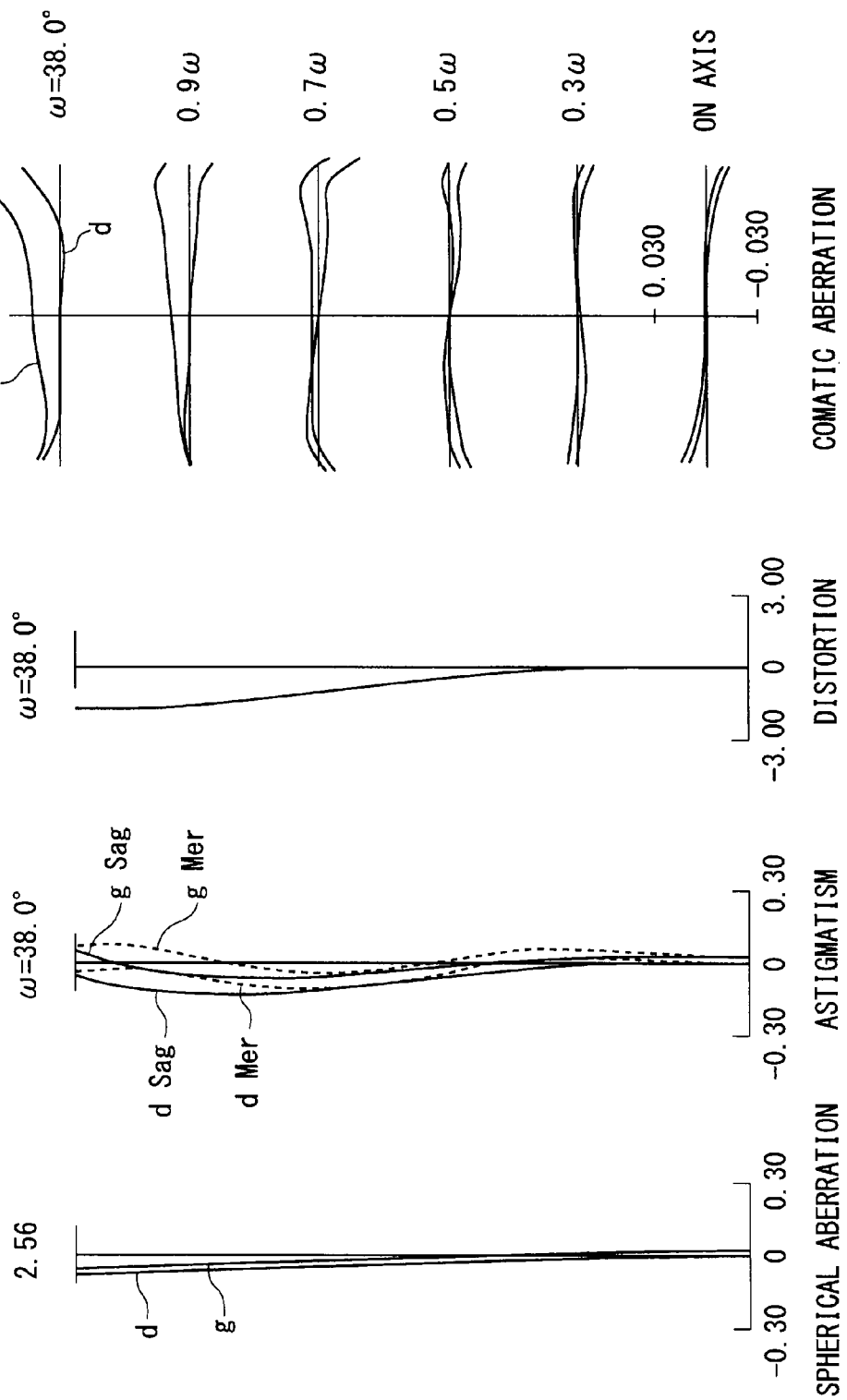
FIG. 4 is an aberration diagram of the image-forming lens of Example 2.

In an embodiment illustrated in FIG. 3, an image-forming lens includes nine lens elements L1 to L9. Lens elements L1 to L4 arranged on an object side from the aperture "Stop" (the left side from the aperture "Stop" in FIG. 3) constitute a first group, and lens elements L5 to L9 arranged on an image side from the aperture "Stop" (the right side from the aperture "Stop" in FIG. 3) constitute a second group.

The lens element L1 is a negative meniscus lens a convex surface of which faces the object side. The lens element L2 is a plano-concave lens a surface on the image side of which is flat. The lens element L3 is a biconvex lens. The lens element L4 is a negative meniscus lens a convex surface of which faces the image side. The lens element L3 and the lens element L4 are cemented.

The lens element L5 is a biconvex lens. The lens element L6 is a biconcave lens. The lens element L7 is a biconcave lens. The lens element L8 is a biconvex lens. The lens element L9 is a positive meniscus lens a convex surface of which faces the image side. The lens element L5 and the lens element L6 are cemented. And the lens element L7 and the lens element L8 are also cemented.

Figure 5:
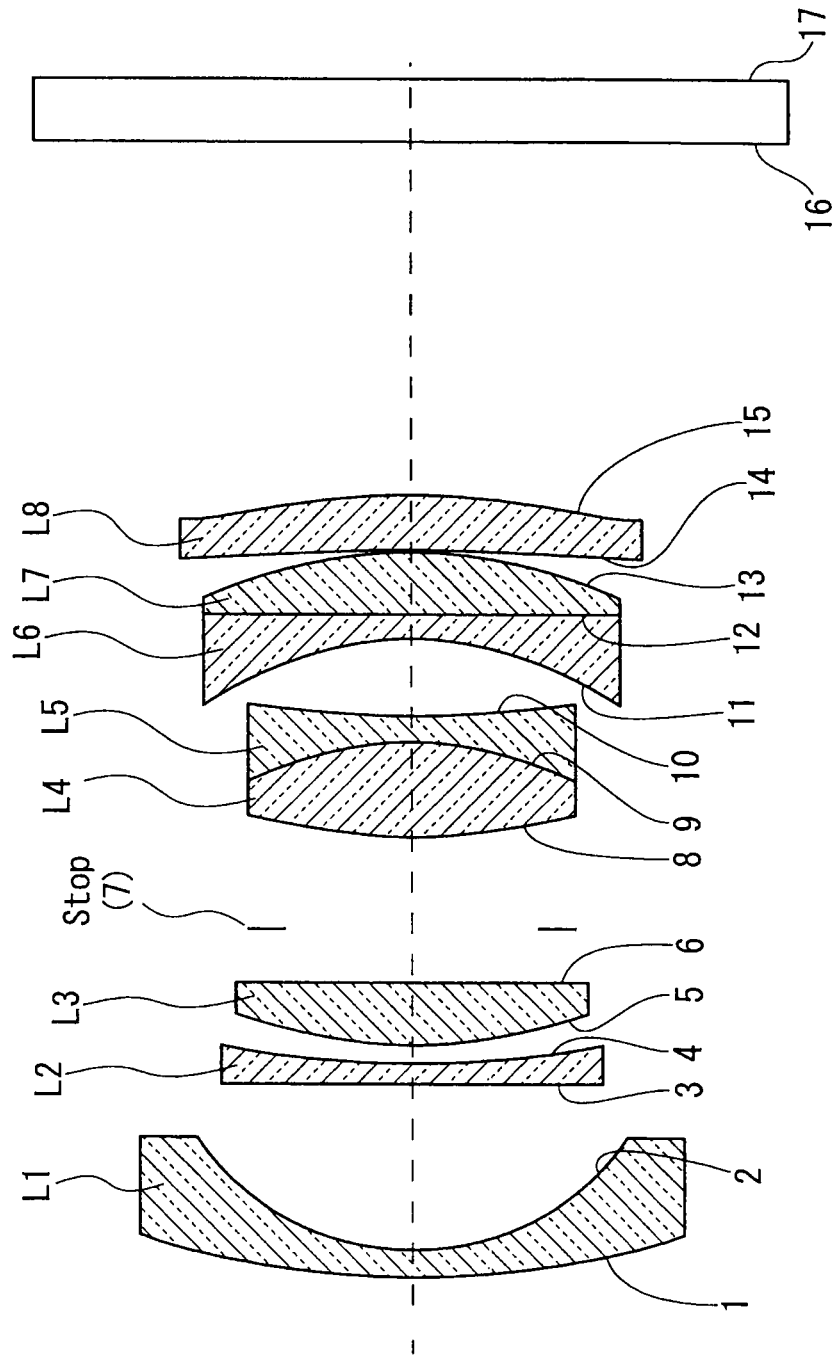
FIG. 5 is a diagram illustrating a lens constitution of an image-forming lens of Example 3.
Figure 6:
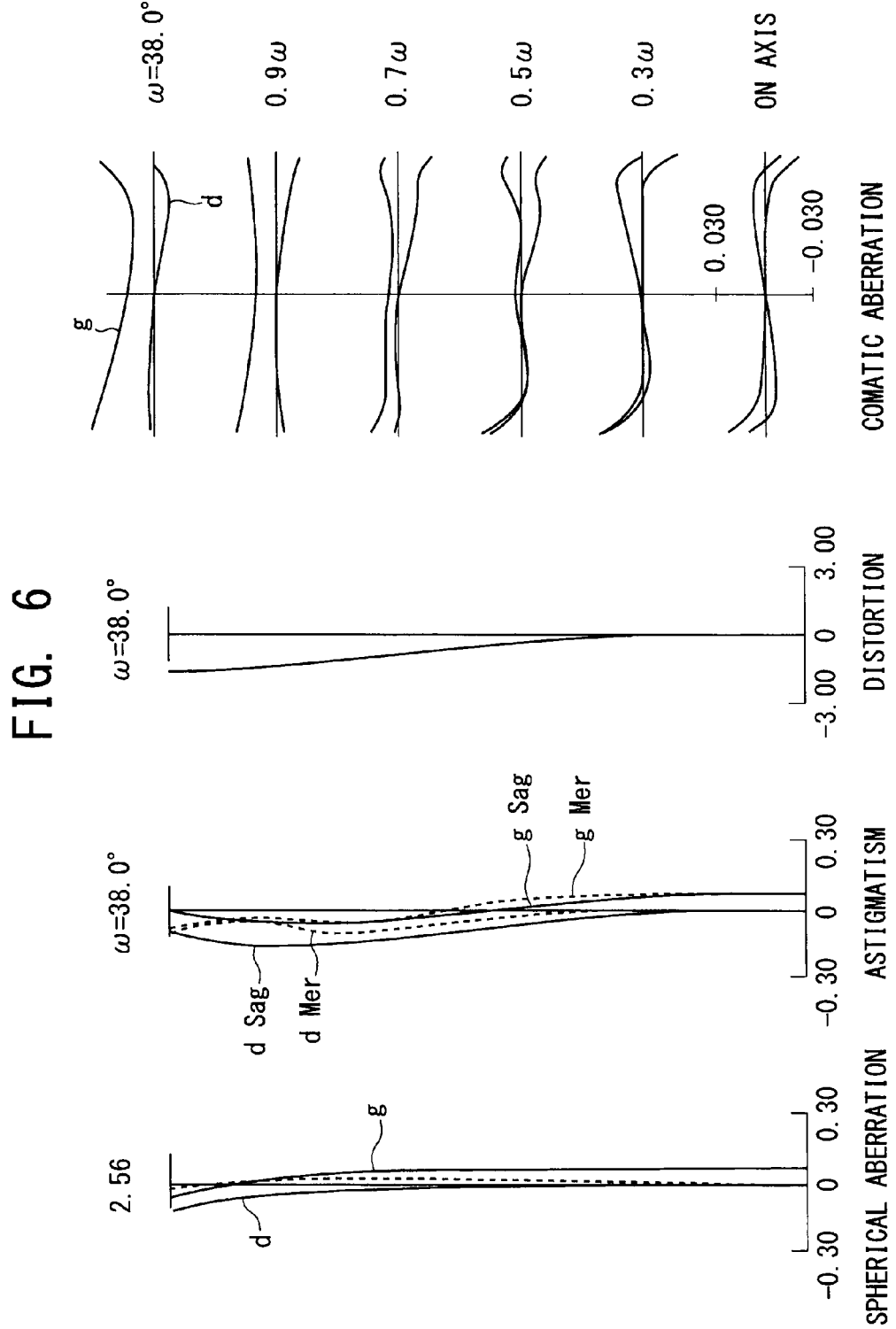
FIG. 6 is an aberration diagram of the image-forming lens of Example 3.

In an embodiment illustrated in FIG. 5, an image-forming lens includes eight lens elements L1 to L8. Lens elements L1 to L3 arranged on an object side from the aperture "Stop" (the left side from the aperture "Stop" in FIG. 5) constitute a first group, and lens elements L4 to L8 arranged on an image side from the aperture "Stop" (the right side from the aperture "Stop" in FIG. 5) constitute a second group.

The lens element L1 is a negative meniscus lens a convex surface of which faces the object side. The lens element L2 is a plano-concave lens a surface on the object side of which is flat. The lens element L3 is a biconvex lens.

The lens element L4 is a biconvex lens. The lens element L5 is a biconcave lens. The lens element L6 is a biconcave lens. The lens element L7 is a biconvex lens. The lens element L8 is a positive meniscus lens a convex surface of which faces the image side.

The lens element L4 and the lens element L5 are cemented, and the lens element L6 and the lens element L7 are also cemented.

Figure 7:
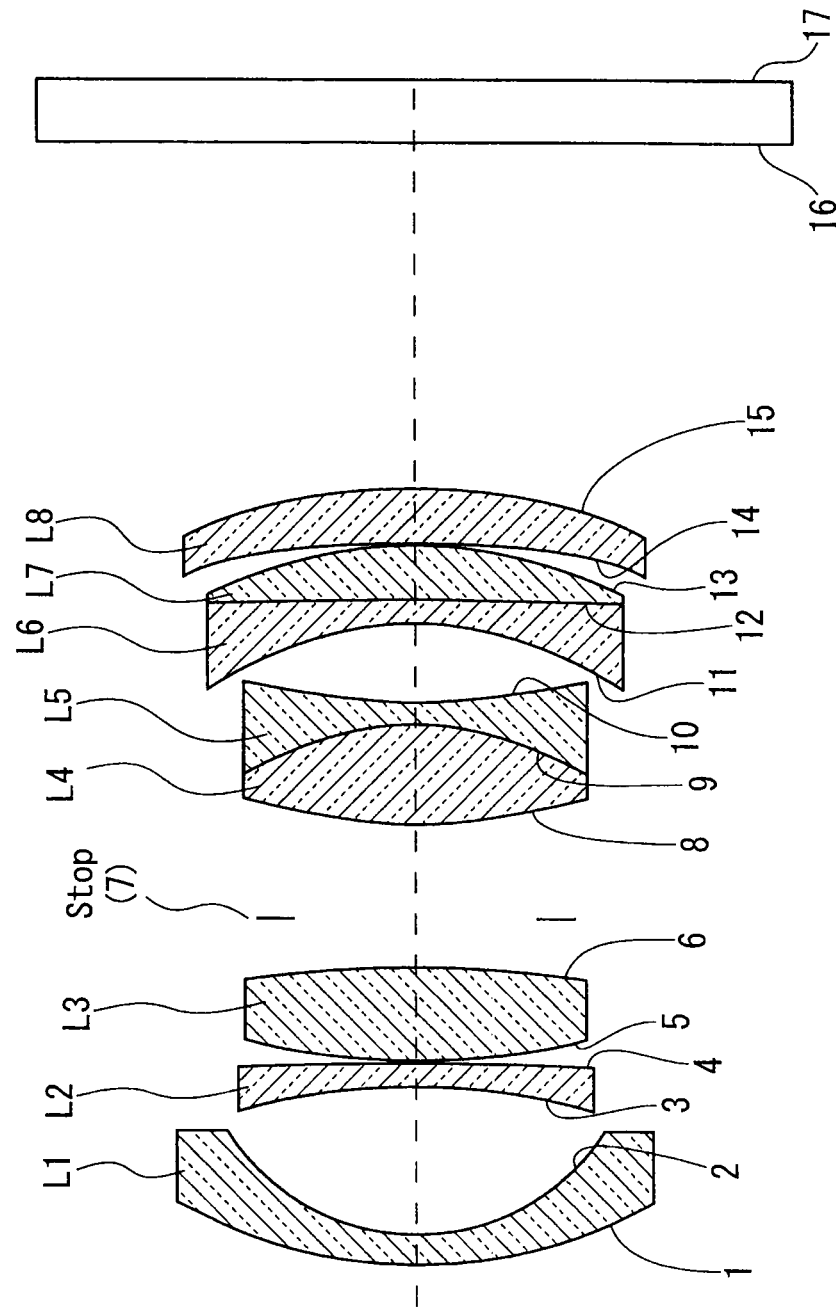
FIG. 7 is a diagram illustrating a lens constitution of an image-forming lens of Example 4.

In an embodiment illustrated in FIG. 7, an image-forming lens includes eight lens elements L1 to L8. Lens elements L1 to L3 arranged on an object side from the aperture "Stop" (the left side from the aperture "Stop" in FIG. 7) constitute a first group, and lens elements L4 to L8 arranged on an image side from the aperture "Stop" (the right side from the aperture "Stop" in FIG. 7) constitute a second group.

The lens element L1 is a negative meniscus lens a convex surface of which faces the object side. The lens element L2 is a negative meniscus lens a convex surface of which faces the image side. The lens element L3 is a biconvex lens.

The lens element L4 is a biconvex lens. The lens element L5 is a biconcave lens. The lens element L6 is a negative meniscus lens a concave surface of which faces the object side. The lens element L7 is a positive meniscus lens a convex surface of which faces the image side. The lens element L8 is a positive meniscus lens a convex surface of which faces the image side.

The lens element L4 and the lens element L5 are cemented, and the lens element L6 and the lens element L7 are also cemented.

Figure 9:
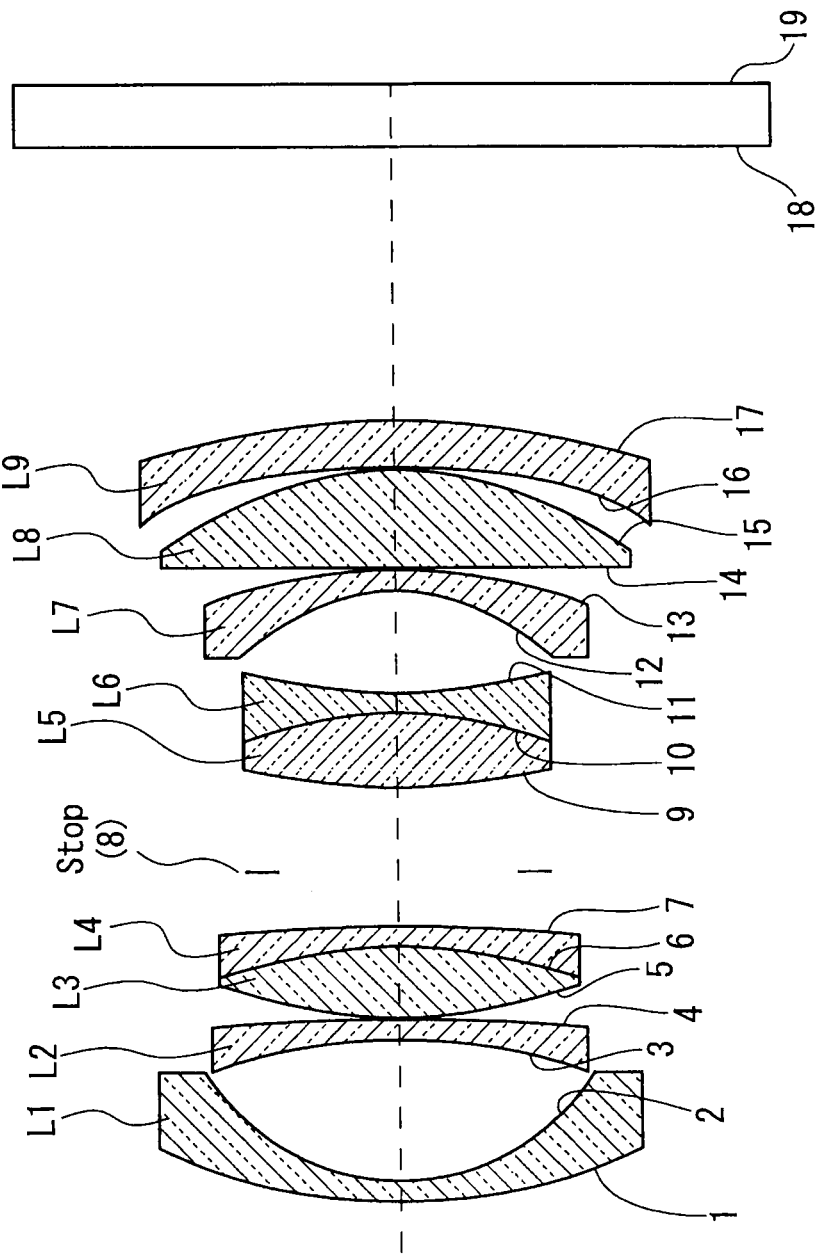
FIG. 9 is a diagram illustrating a lens constitution of an image-forming lens of Example 5.

In an embodiment illustrated in FIG. 9, an image-forming lens includes nine lens elements L1 to L9. Lens elements L1 to L4 arranged on an object side from the aperture "Stop" (the left side from the aperture "Stop" in FIG. 9) constitute a first group, and lens elements L5 to L9 arranged on an image side from the aperture "Stop" (the right side from the aperture "Stop" in FIG. 9) constitute a second group.

The lens element L1 is a negative meniscus lens a convex surface of which faces the object side. The lens element L2 is a negative meniscus lens a convex surface of which faces the image side. The lens element L3 is a biconvex lens. The lens element L4 is a negative meniscus lens a convex surface of which faces the image side.

The lens element L3 and the lens element L4 are cemented.

The lens element L5 is a biconvex lens. The lens element L6 is a biconcave lens. The lens element L7 is a negative meniscus lens a convex surface of which faces the image side. The lens element L8 is a biconvex lens. The lens element L9 is a positive meniscus lens a convex surface of which faces the image side. The lens element L5 and the lens element L6 are cemented.

Figure 11:
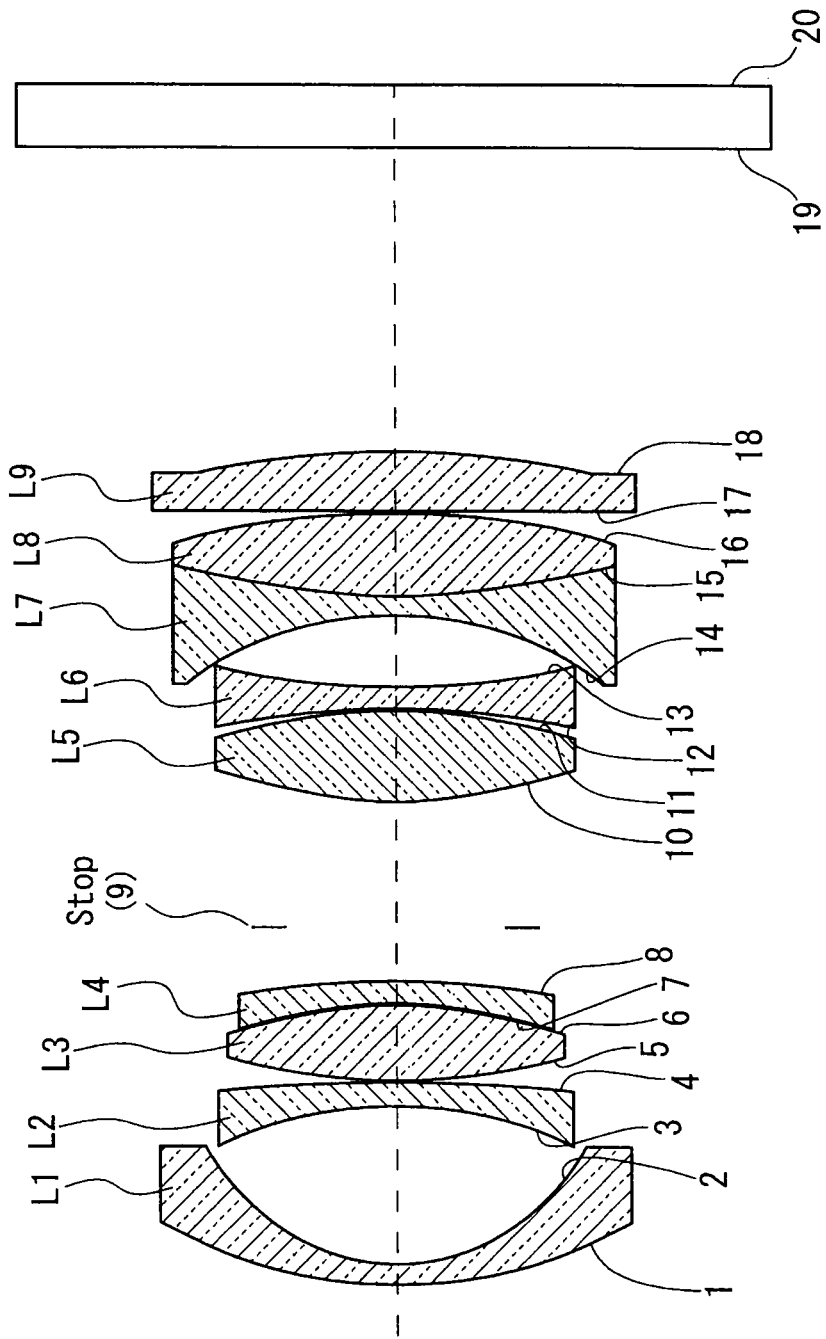
FIG. 11 is a diagram illustrating a lens constitution of an image-forming lens of Example 6.

In an embodiment illustrated in FIG. 11, an image-forming lens includes nine lens elements L1 to L9. Lens elements L1 to L4 arranged on an object side from the aperture "Stop" (the left side from the aperture "Stop" in FIG. 11) constitute a first group, and lens elements L5 to L9 arranged on an image side from the aperture "Stop" (the right side from the aperture "Stop" in FIG. 11) constitute a second group.

The lens element L1 is a negative meniscus lens a convex surface of which faces the object side. The lens element L2 is a negative meniscus lens a convex surface of which faces the image side. The lens element L3 is a biconvex lens. The lens element L4 is a negative meniscus lens a convex surface of which faces the image side. The lens element L4 is close to a surface on the image side of the lens element L3, but is not cemented to the lens element L3.

The lens element L5 is a biconvex lens. The lens element L6 is a biconcave lens. The lens element L7 is a biconcave lens. The lens element L8 is a biconvex lens. The lens element L9 is a positive meniscus lens a convex surface of which faces the image side. The lens element L7 and the lens element L8 are cemented.

Figure 13:
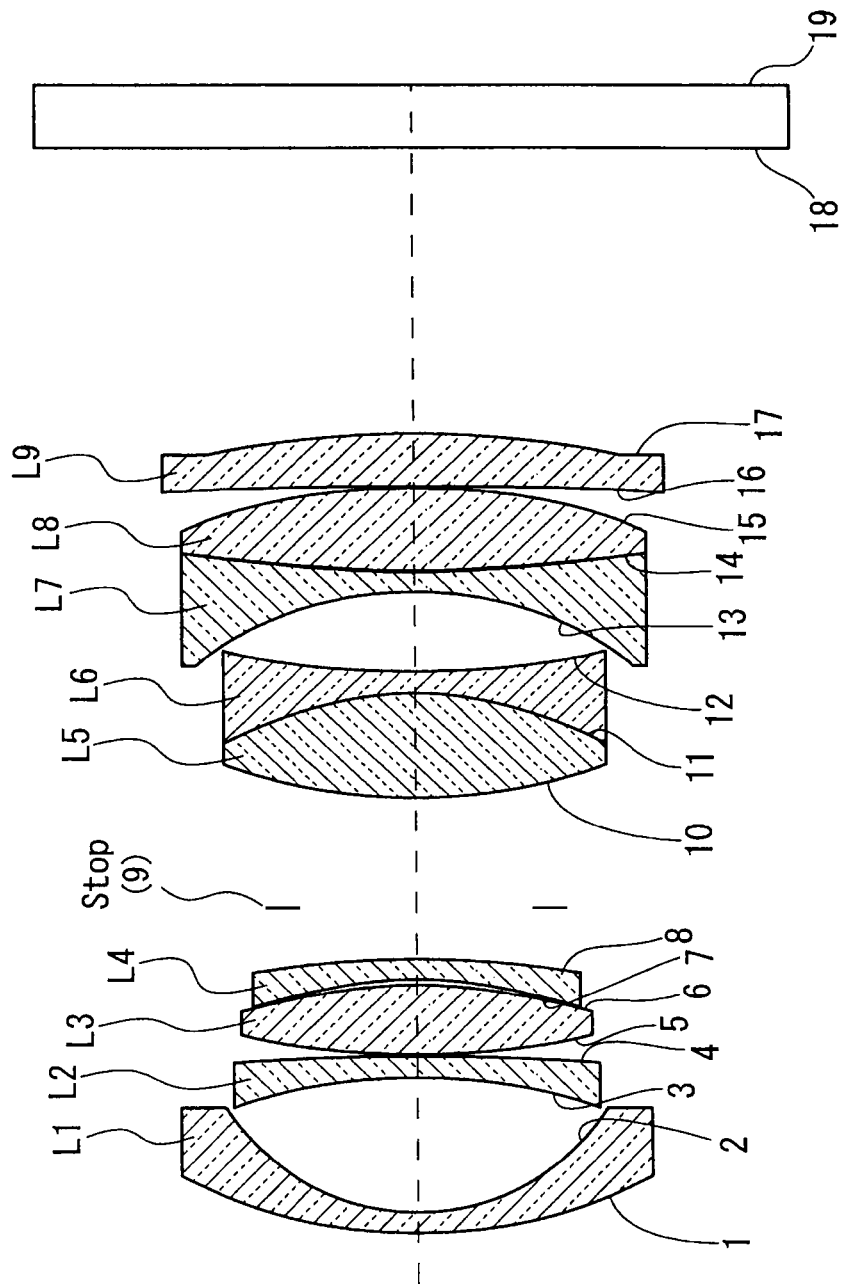
FIG. 13 is a diagram illustrating a lens constitution of an image-forming lens of Example 7.
Figure 14:
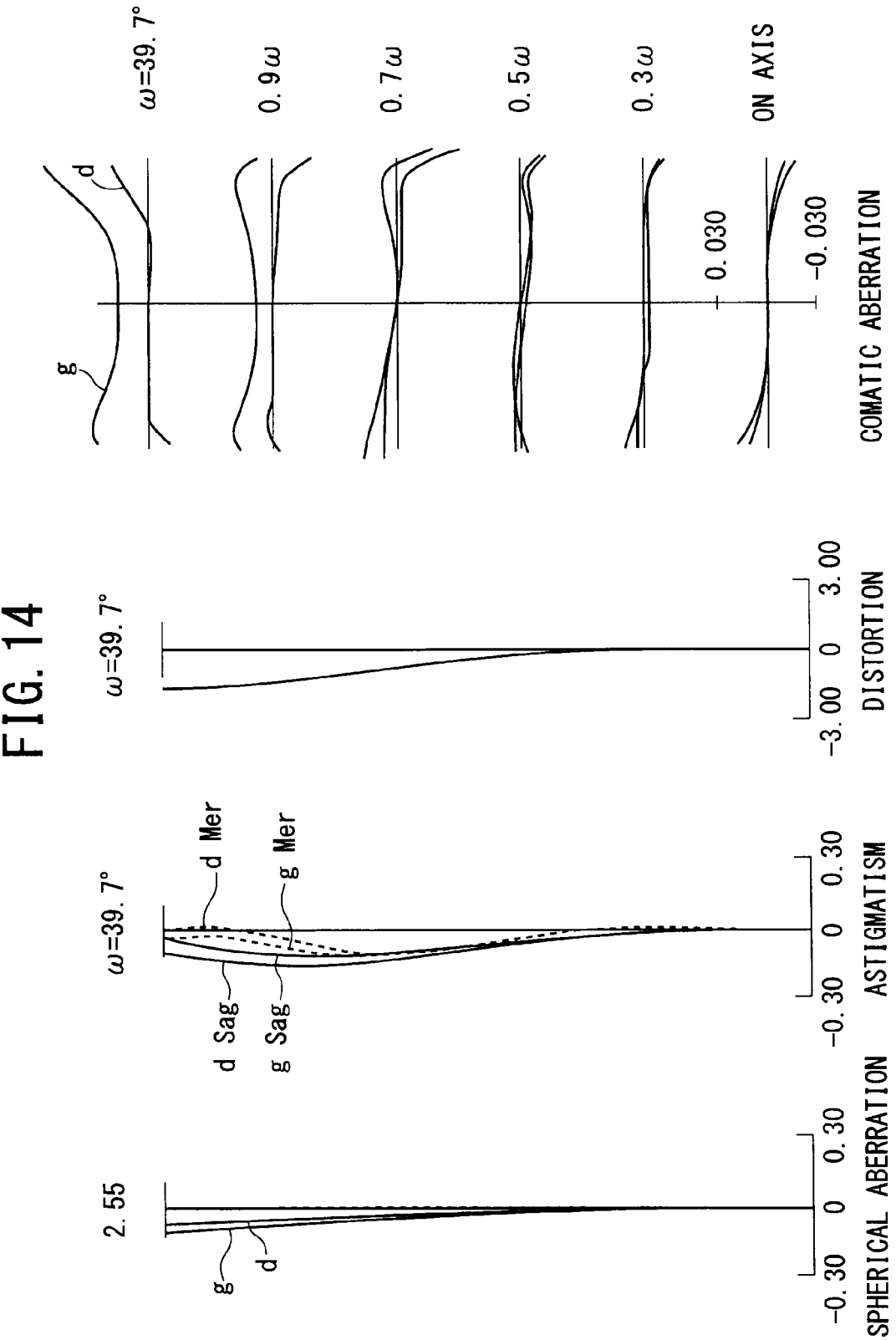
FIG. 14 is an aberration diagram of the image-forming lens of Example 7.

In an embodiment illustrated in FIG. 13, an image-forming lens includes nine lens elements L1 to L9. Lens elements L1 to L4 arranged on an object side from the aperture "Stop" (the left side from the aperture "Stop" in FIG. 13) constitute a first group, and lens elements L5 to L9 arranged on an image side from the aperture "Stop" (the right side from the aperture "Stop" in FIG. 13) constitute a second group.

The lens element L1 is a negative meniscus lens a convex surface of which faces the object side. The lens element L2 is a negative meniscus lens, a convex surface of which faces the image side. The lens element L3 is a biconvex lens. The lens element L4 is a negative meniscus lens a convex surface of which faces the image side. The lens element L4 is close to a surface on the image side of the lens element L3, but is not cemented to the lens element L3.

The lens element L5 is a biconvex lens. The lens element L6 is a biconcave lens. The lens element L7 is a biconcave lens. The lens element L8 is a biconvex lens. The lens element L9 is a positive meniscus lens a convex surface of which faces the image side. The lens element L5 and the lens element L6 are cemented, and the lens element L7 and the lens element L8 are also cemented.

Figure 15:
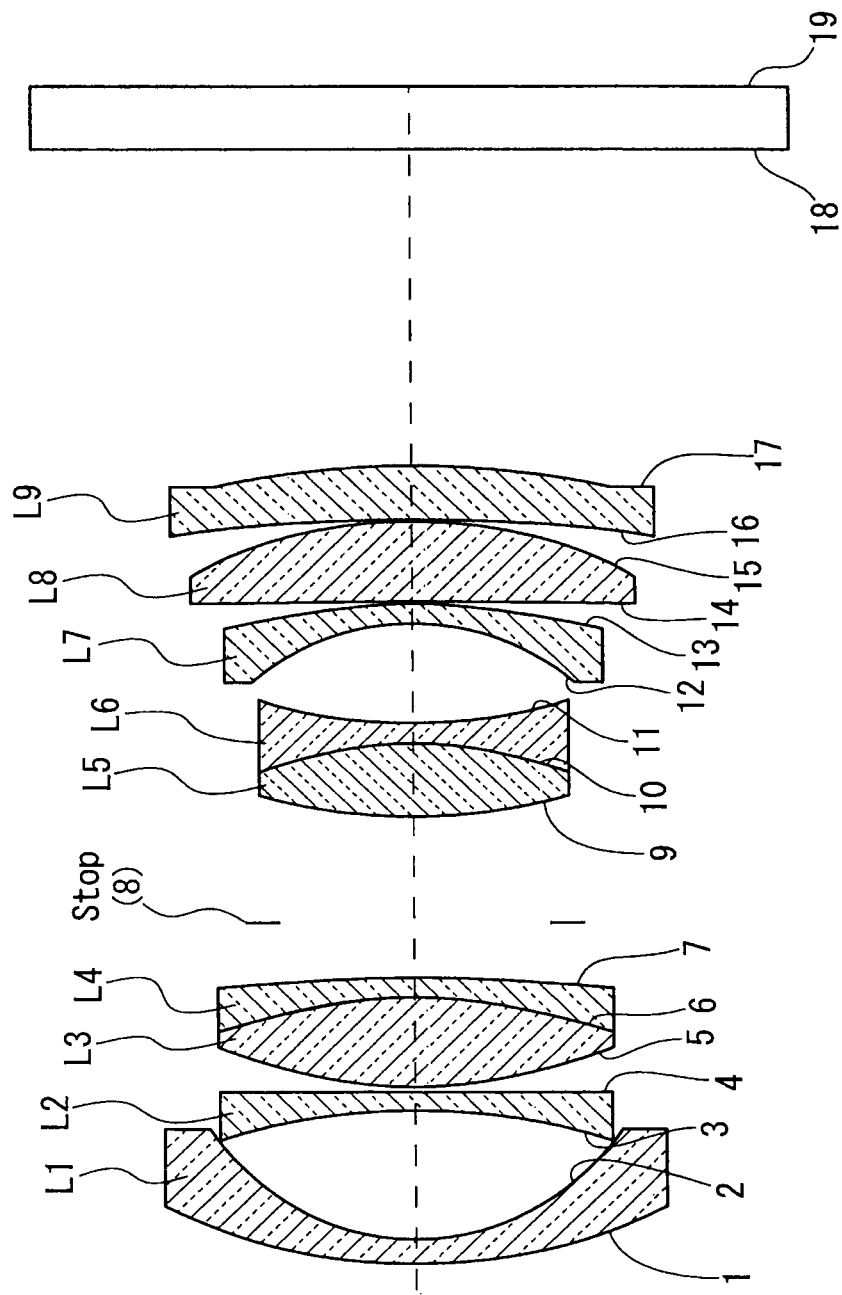
FIG. 15 is a diagram illustrating a lens constitution of an image-forming lens of Example 8.
Figure 16:
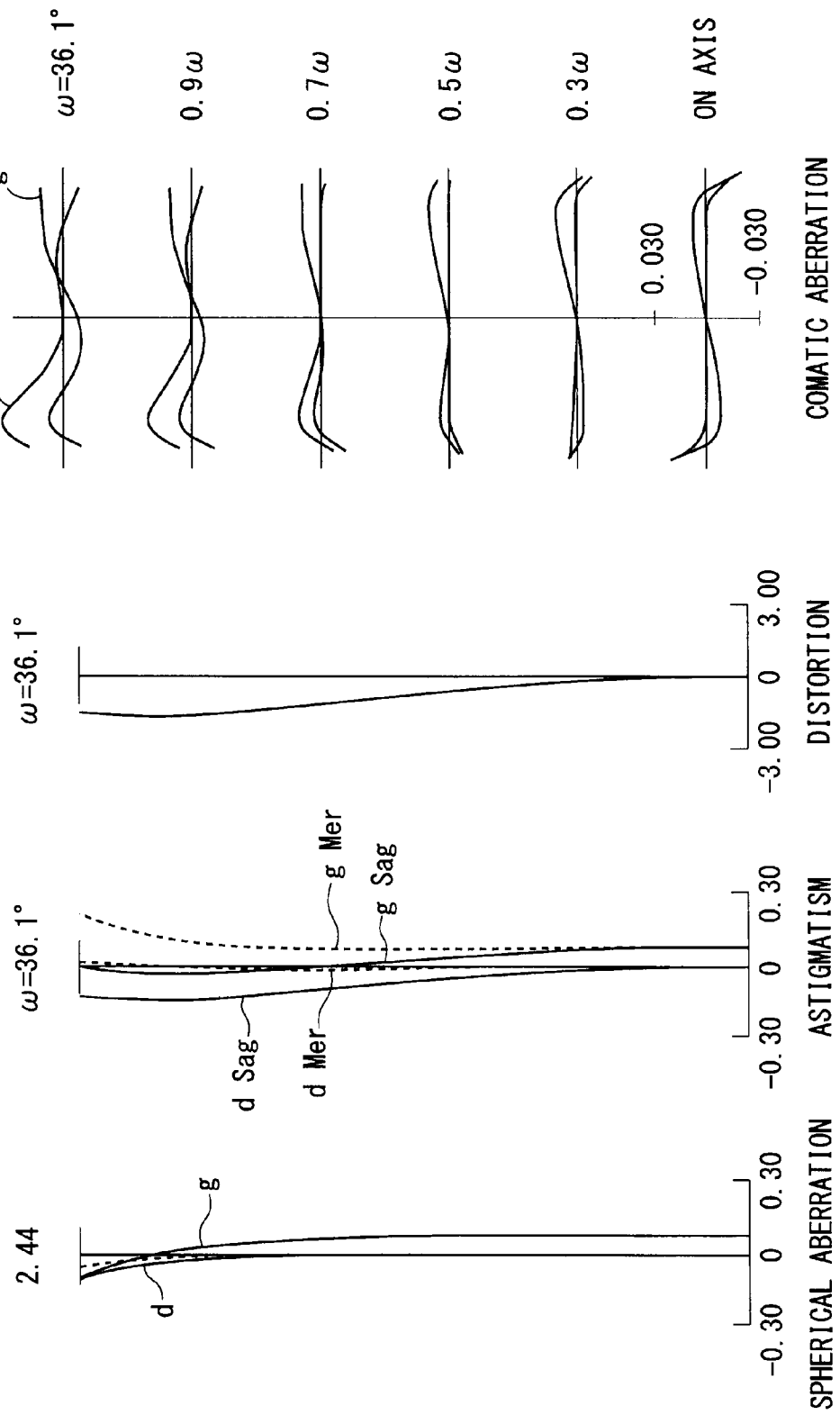
FIG. 16 is an aberration diagram of the image-forming lens of Example 8.

In an embodiment illustrated in FIG. 15, an image-forming lens includes nine lens elements L1 to L9. Lens elements L1 to L4 arranged on an object side from the aperture "Stop" (the left side from the aperture "Stop" in FIG. 15) constitute a first group, and lens elements L5 to L9 arranged on an image side from the aperture "Stop" (the right side from the aperture "Stop" in FIG. 15) constitute a second group.

The lens element L1 is a negative meniscus lens a convex surface of which faces the object side. The lens element L2 is a biconcave lens. The lens element L3 is a biconvex lens. The lens element L4 is a negative meniscus lens a convex surface of which faces the image side. The lens element L3 and the lens element L4 are cemented.

The lens element L5 is a biconvex lens. The lens element L6 is a biconcave lens. The lens element L7 is a negative meniscus lens a convex surface of which faces the image side. The lens element L8 is a positive meniscus lens a convex surface of which faces the image side. The lens element L9 is a positive meniscus lens a convex surface of which faces the image side. The lens element L5 and the lens element L6 are cemented.

Figure 17:
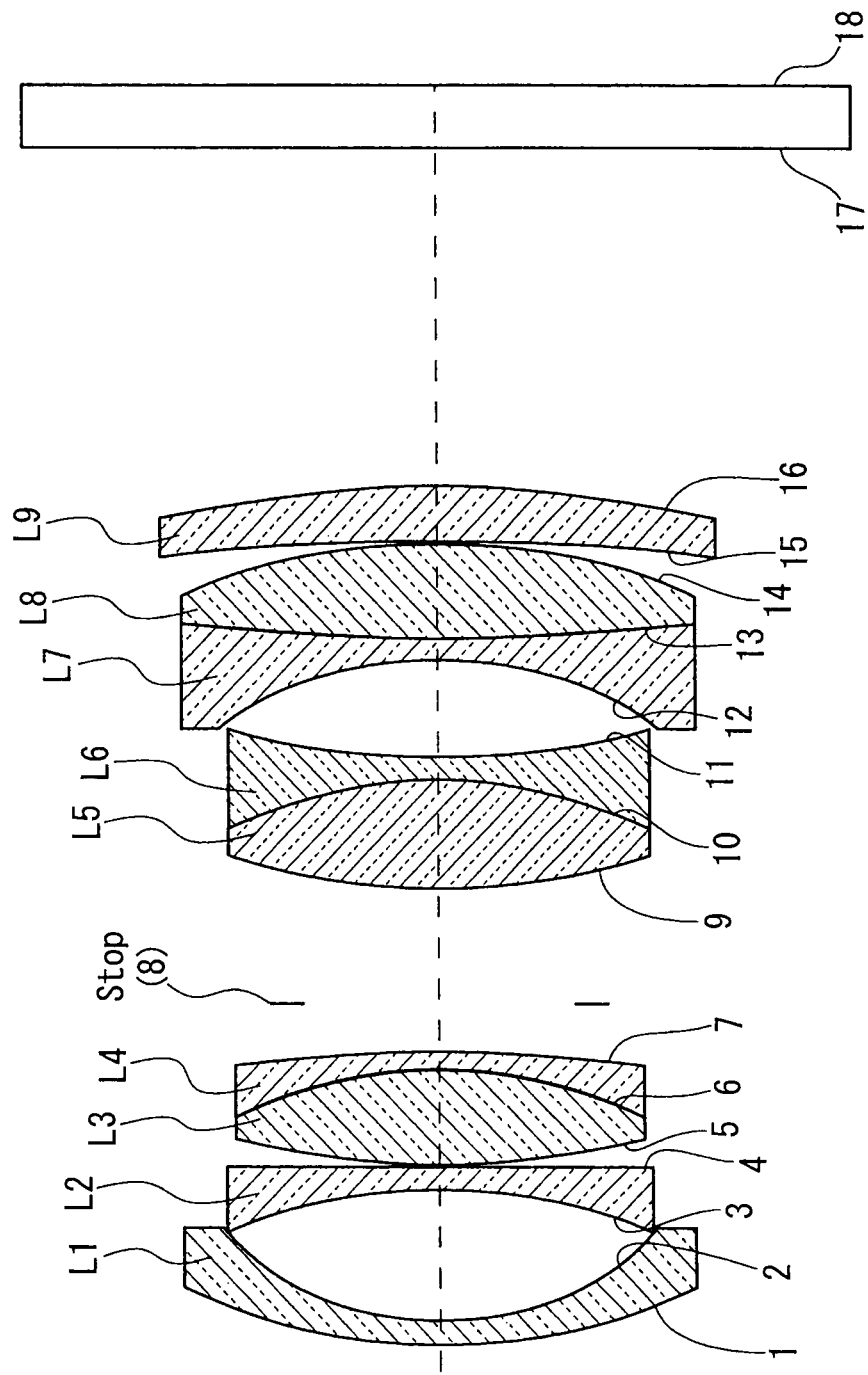
FIG. 17 is a diagram illustrating a lens constitution of an image-forming lens of Example 9.
Figure 18:
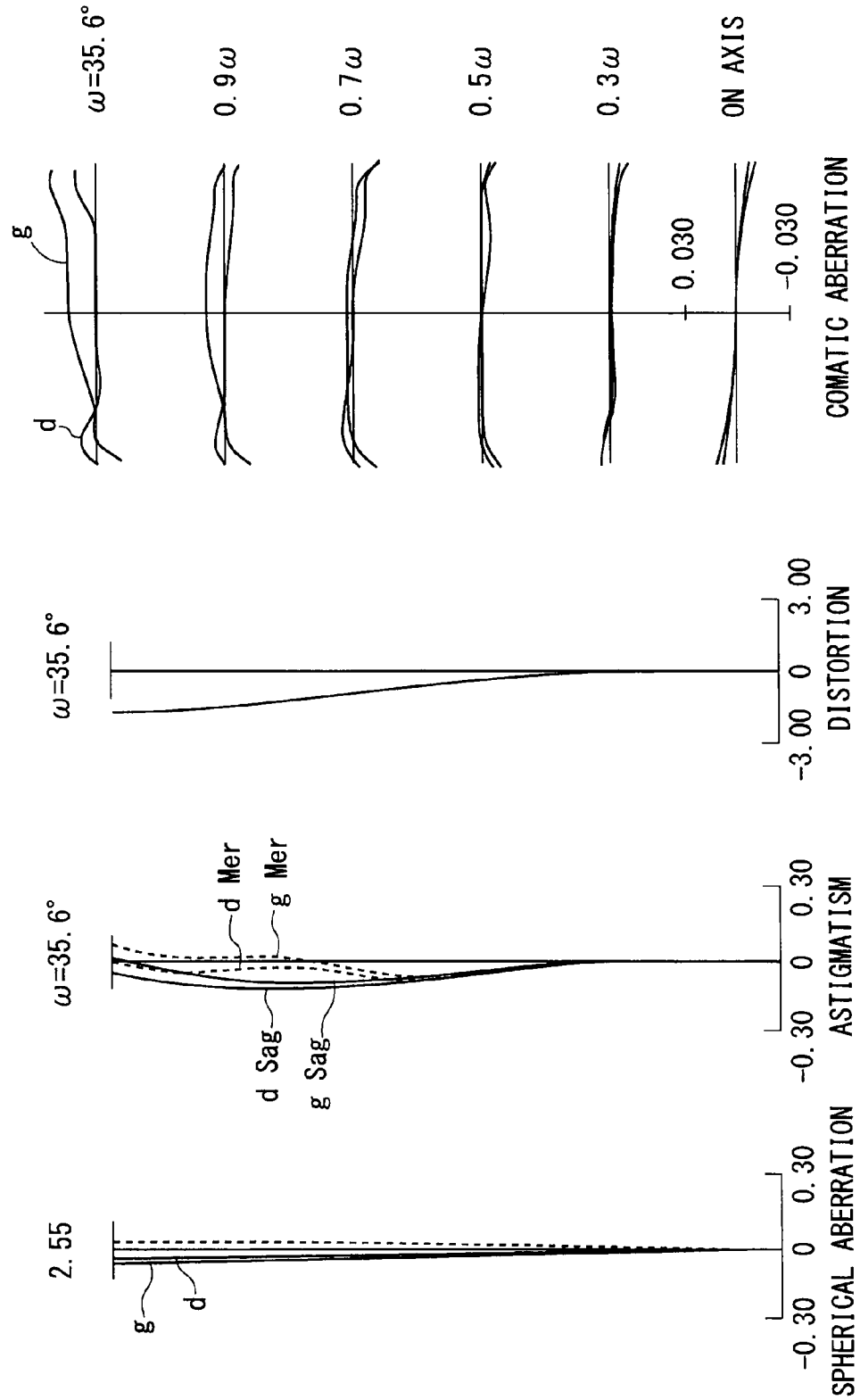
FIG. 18 is an aberration diagram of the image-forming lens of Example 9.

In an embodiment illustrated in FIG. 17, an image-forming lens includes nine lens elements L1 to L9. Lens elements L1 to L4 arranged on an object side from the aperture "Stop" (the left side from the aperture "Stop" in FIG. 17) constitute a first group, and lens elements L5 to L9 arranged on an image side from the aperture "Stop" (the right side from the aperture "Stop" in FIG. 17) constitute a second group.

The lens element L1 is a negative meniscus lens a convex surface of which faces the object side. The lens element L2 is a biconcave lens. The lens element L3 is a biconvex lens. The lens element L4 is a negative meniscus lens a convex surface of which faces the image side. The lens element L3 and the lens element L4 are cemented.

The lens element L5 is a biconvex lens. The lens element L6 is a biconcave lens. The lens element L7 is a biconcave lens. The lens element L8 is a biconvex lens. The lens element L9 is a positive meniscus lens a convex surface of which faces the image side. The lens element L5 and the lens element L6 are cemented, and the lens element L7 and the lens element L8 are cemented.

Figure 19:
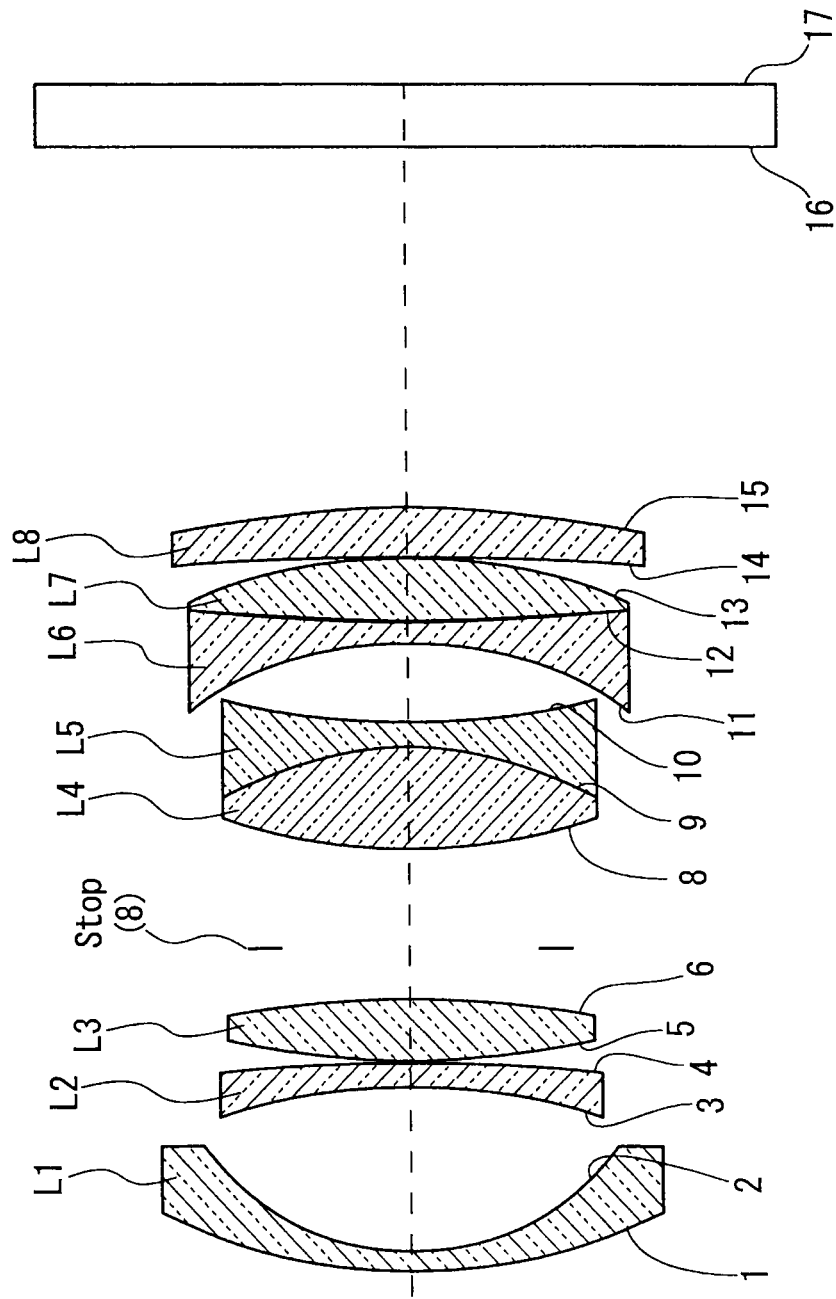
FIG. 19 is a diagram illustrating a lens constitution of an image-forming lens of Example 10.

In an embodiment illustrated in FIG. 19, an image-forming lens includes eight lens elements L1 to L8. Lens elements L1 to L3 arranged on an object side from the aperture "Stop" (the left side from the aperture "Stop" in FIG. 19) constitute a first group, and lens elements L4 to L8 arranged on an image side from the aperture "Stop" (the right side from the aperture "Stop" in FIG. 19) constitute a second group.

The lens element L1 is a negative meniscus lens a convex surface of which faces the object side. The lens element L2 is a negative meniscus lens a convex surface of which faces the image side. The lens element L3 is a biconvex lens.

The lens element L4 is a biconvex lens. The lens element L5 is a biconcave lens. The lens element L6 is a biconcave lens. The lens element L7 is a biconvex lens. The lens element L8 is a positive meniscus lens a convex surface of which faces the image side. The lens element L4 and the lens element L5 are cemented, and the lens element L6 and the lens element L7 are also cemented.

In each of the above-described image-forming lenses, the first group having a positive refractive power, the aperture "Stop", and the second group having a positive refractive power are arranged from the object side (the left side in each drawing) to the image side (the right side in each drawing) in order.

The first group includes less than or equal to four lens elements including equal to or more than two negative lenses and one positive lens. Both of the lens element L1 and the lens element L2 from the most the object side are negative lenses, and the lens element L1 on the most object side is a negative meniscus lens a convex surface of which faces the object side.

The second group includes five lens elements including at least one cemented lens where a positive lens and a negative lens are cemented.

The image-forming lenses of those embodiments perform focusing to a limited object distance by shifting each of the first group and the second group to the object side by a different extension amount, and satisfy Conditional Expressions B to J, as described in Examples 1 to 10 later described.

Figure 21:
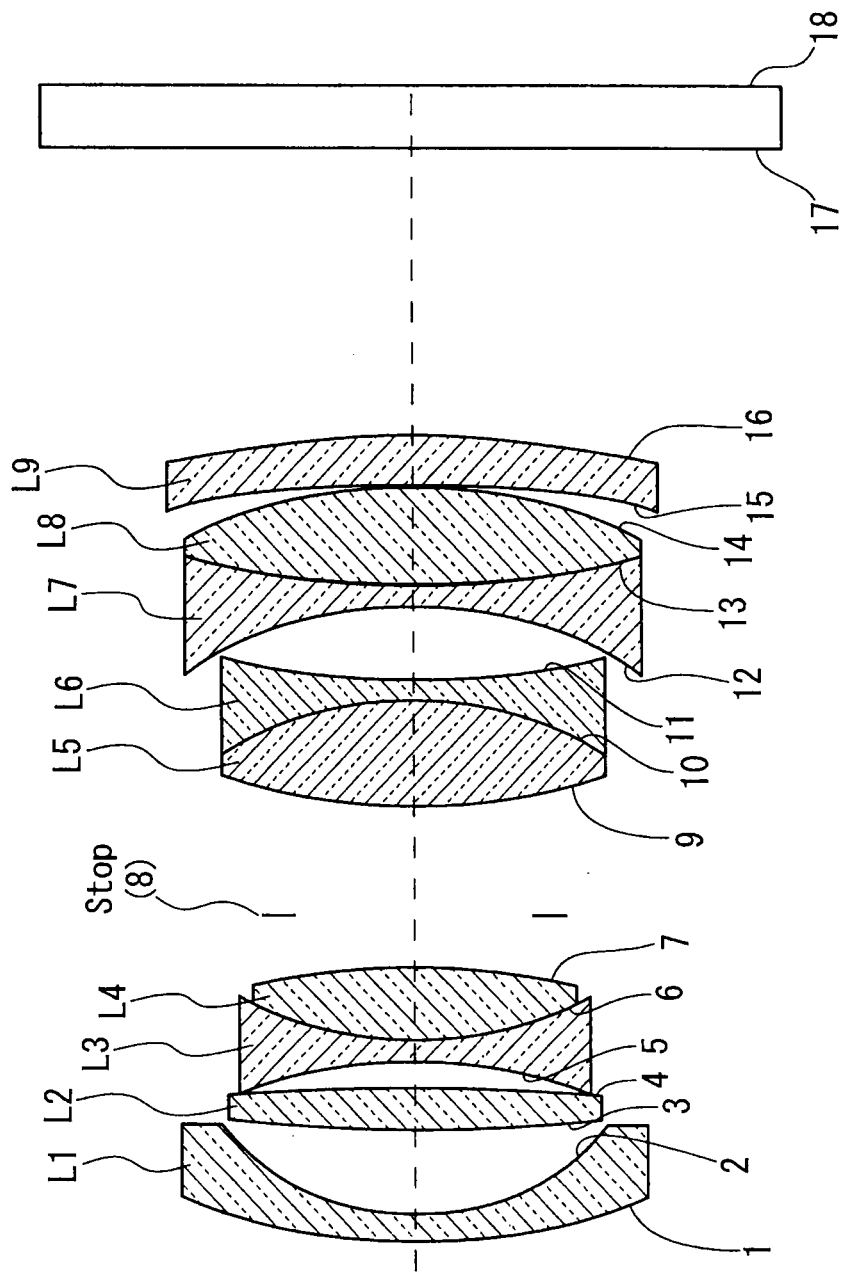
FIG. 21 is a diagram illustrating a lens constitution of an image-forming lens of Example 11.
Figure 22:
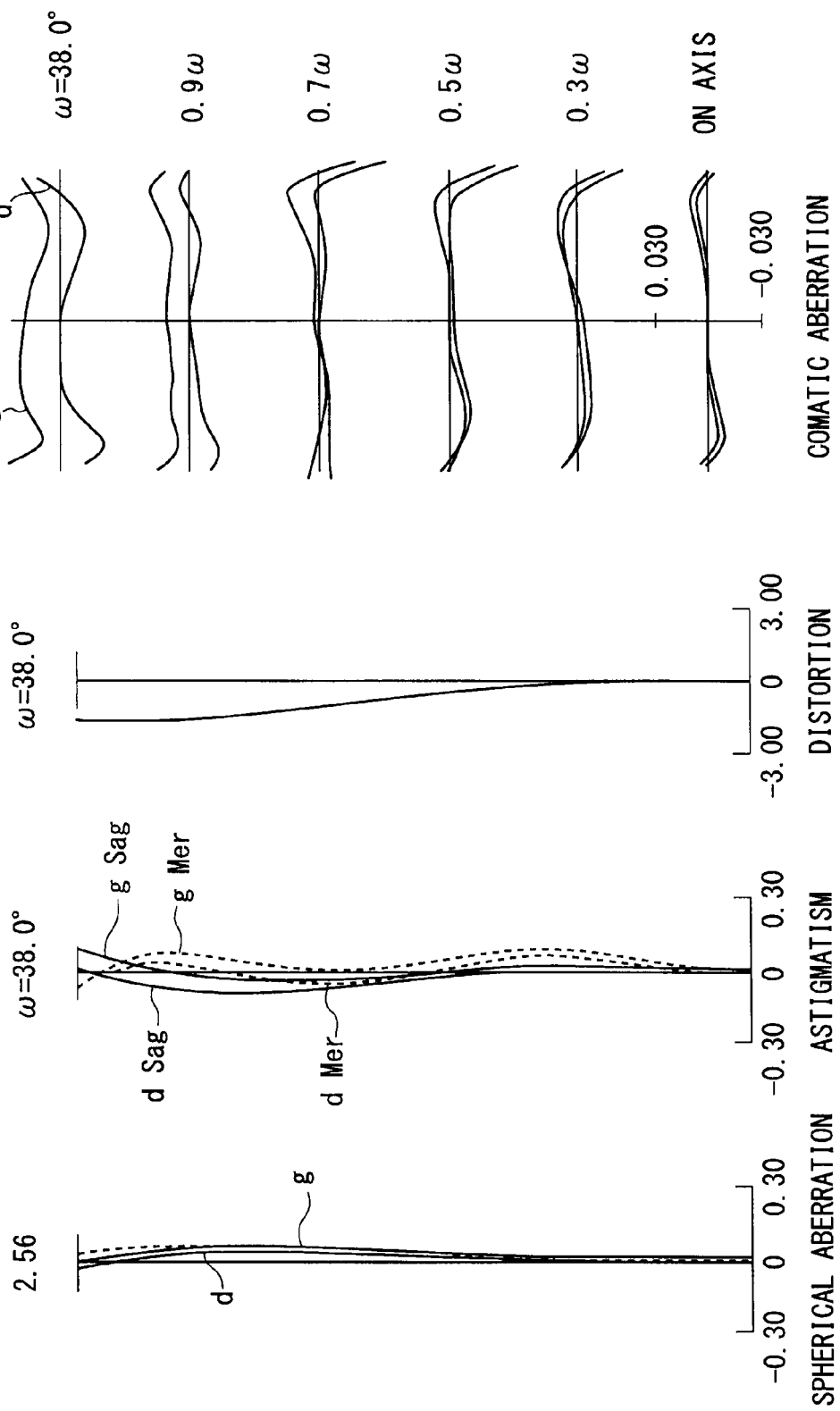
FIG. 22 is an aberration diagram of the image-forming lens of Example 11.

In an embodiment illustrated in FIG. 21, an image-forming lens includes nine lens elements L1 to L9. Lens elements L1 to L4 arranged on an object side from the aperture "Stop" (the left side from the aperture "Stop" in FIG. 21) constitute a first group, and lens elements L5 to L9 arranged on an image side from the aperture "Stop" (the right side from the aperture "Stop" in FIG. 21) constitute a second group.

The lens element L1 is a negative meniscus lens a convex surface of which faces the object side. The lens element L2 is a biconvex lens. The lens element L3 is a biconcave lens (negative lens). The lens element L4 is a biconvex lens (positive lens). The lens element L3 and the lens element L4 are cemented.

The lens element L5 is a biconvex lens (positive lens). The lens element L6 is a biconcave lens (negative lens). The lens element L7 is a biconcave lens (negative lens). The lens element L8 is a biconvex lens (positive lens). The lens element L9 is a positive meniscus lens a convex surface of which faces the image side. The lens element L5 and the lens element L6 are cemented. The lens element L7 and the lens element L8 are cemented.

Focusing is performed by shifting independently each of the first group including the lens elements L1 to L4 and the second lens group including the lens elements L5 to L9 to the object side.

Figure 23:
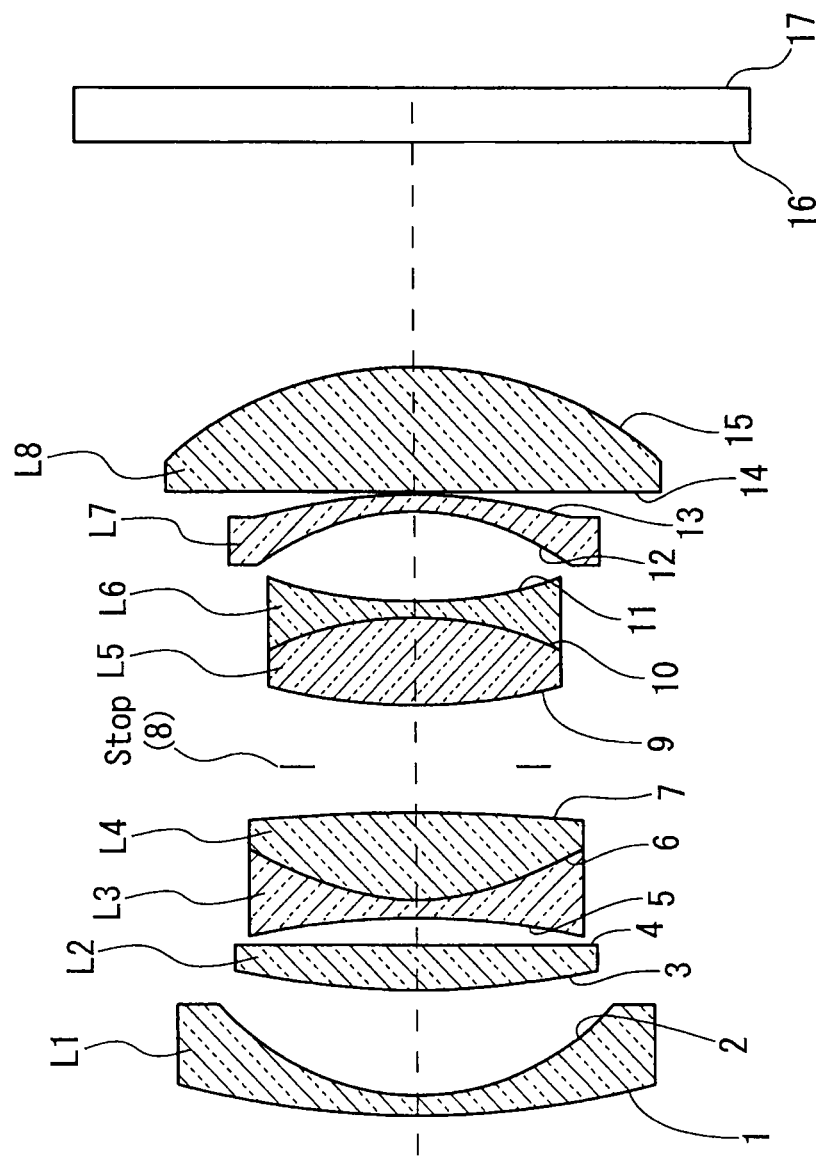
FIG. 23 is a diagram illustrating a lens constitution of an image-forming lens of Example 12.
Figure 24:
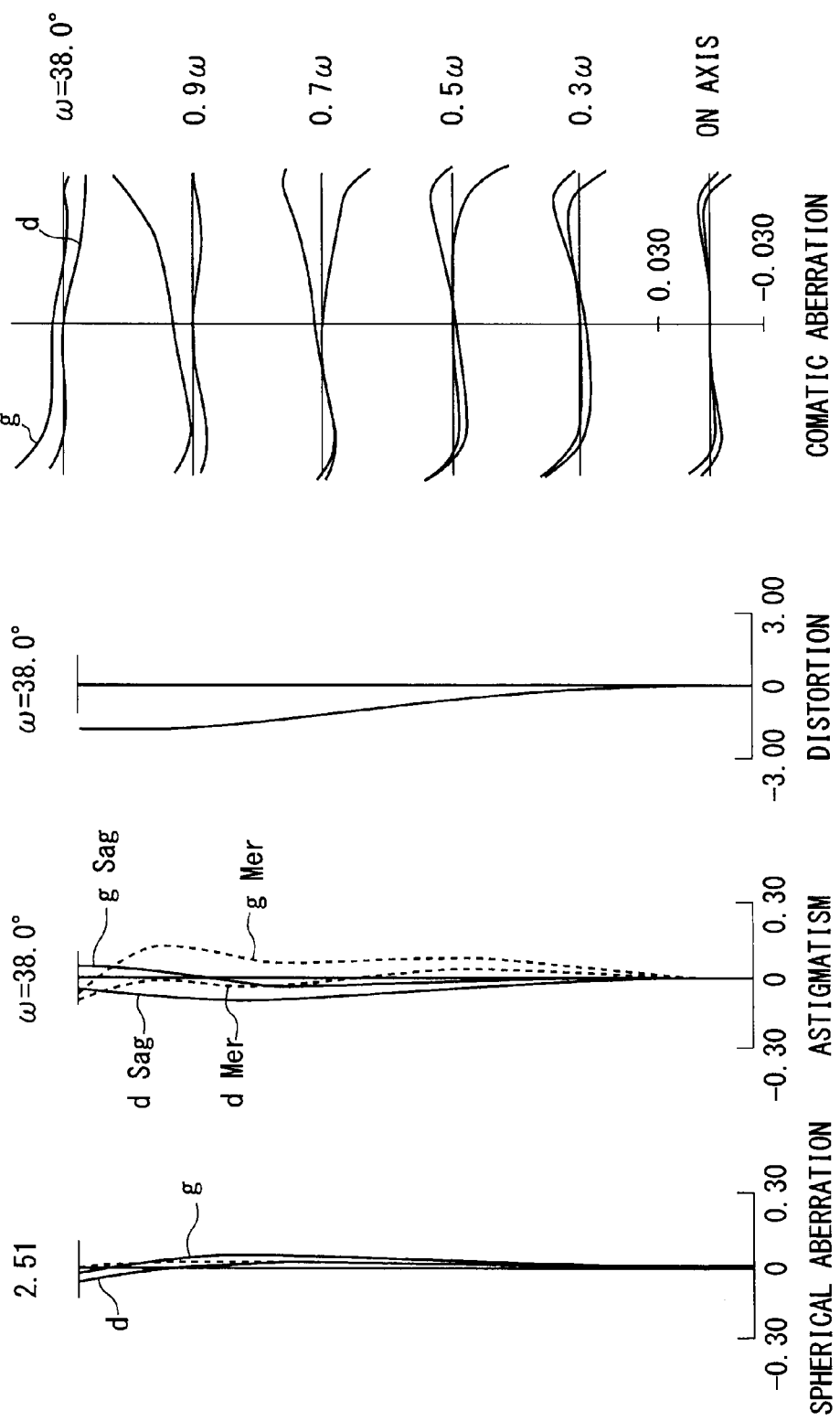
FIG. 24 is an aberration diagram of the image-forming lens of Example 12.

In an embodiment illustrated in FIG. 23, an image-forming lens includes eight lens elements L1 to L8. Lens elements L1 to L4 arranged on an object side from the aperture "Stop" (the left side from the aperture "Stop" in FIG. 23) constitute a first group, and lens elements L5 to L8 arranged on an image side from the aperture "Stop" (the right side from the aperture "Stop" in FIG. 23) constitute a second group.

The lens element L1 is a negative meniscus lens a convex surface of which faces the object side. The lens element L2 is a positive meniscus lens a convex surface of which faces the object side. The lens element L3 is a biconcave lens (negative lens). The lens element L4 is a biconvex lens (positive lens). The lens element L3 and the lens element L4 are cemented.

The lens element L5 is a biconvex lens (positive lens). The lens element L6 is a biconcave lens (negative lens). The lens element L7 is a negative meniscus lens a concave surface of which faces the object side. The lens element L8 is a positive meniscus lens a convex surface of which faces the image side. The lens element L5 and the lens element L6 are cemented.

Focusing is performed by shifting independently each of the first group including the lens elements L1 to L4 and the second lens group including the lens elements L5 to L8 to the object side.

Figure 25:
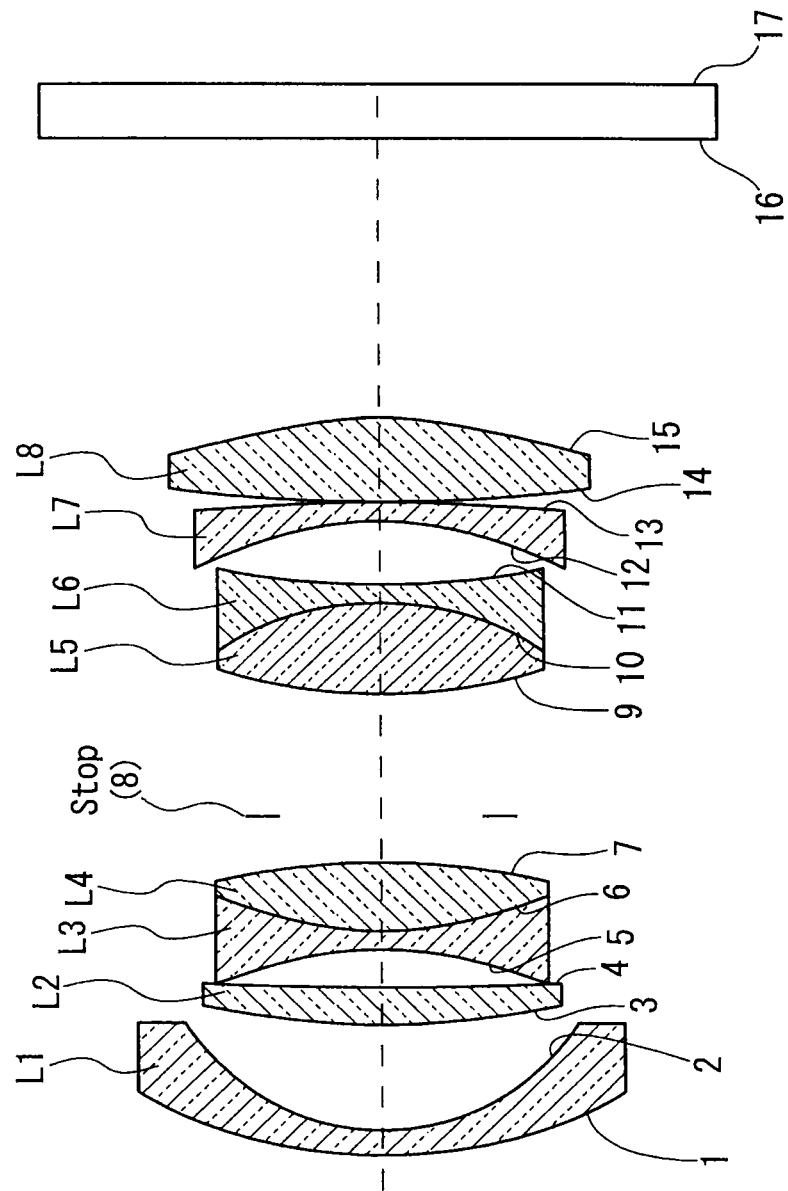
FIG. 25 is a diagram illustrating a lens constitution of an image-forming lens of Example 13.

In an embodiment illustrated in FIG. 25, an image-forming lens includes eight lens elements L1 to L8. Lens elements L1 to L4 arranged on an object side from the aperture "Stop" (the left side from the aperture "Stop" in FIG. 25) constitute a first group, and lens elements L5 to L8 arranged on an image side from the aperture "Stop" (the right side from the aperture "Stop" in FIG. 25) constitute a second group.

The lens element L1 is a negative meniscus lens a convex surface of which faces the object side. The lens element L2 is a positive meniscus lens a convex surface of which faces the object side. The lens element L3 is a biconcave lens (negative lens). The lens element L4 is a biconvex lens (positive lens). The lens element L3 and the lens element L4 are cemented.

The lens element L5 is a biconvex lens (positive lens). The lens element L6 is a biconcave lens (negative lens). The lens element L7 is a negative meniscus lens a concave surface of which faces the object side. The lens element L8 is a positive meniscus lens a convex surface of which faces the image side. The lens element L5 and the lens element L6 are cemented.

Focusing is performed by shifting independently each of the first group including the lens elements L1 to L4 and the second lens group including the lens elements L5 to L8 to the object side.

Figure 27:
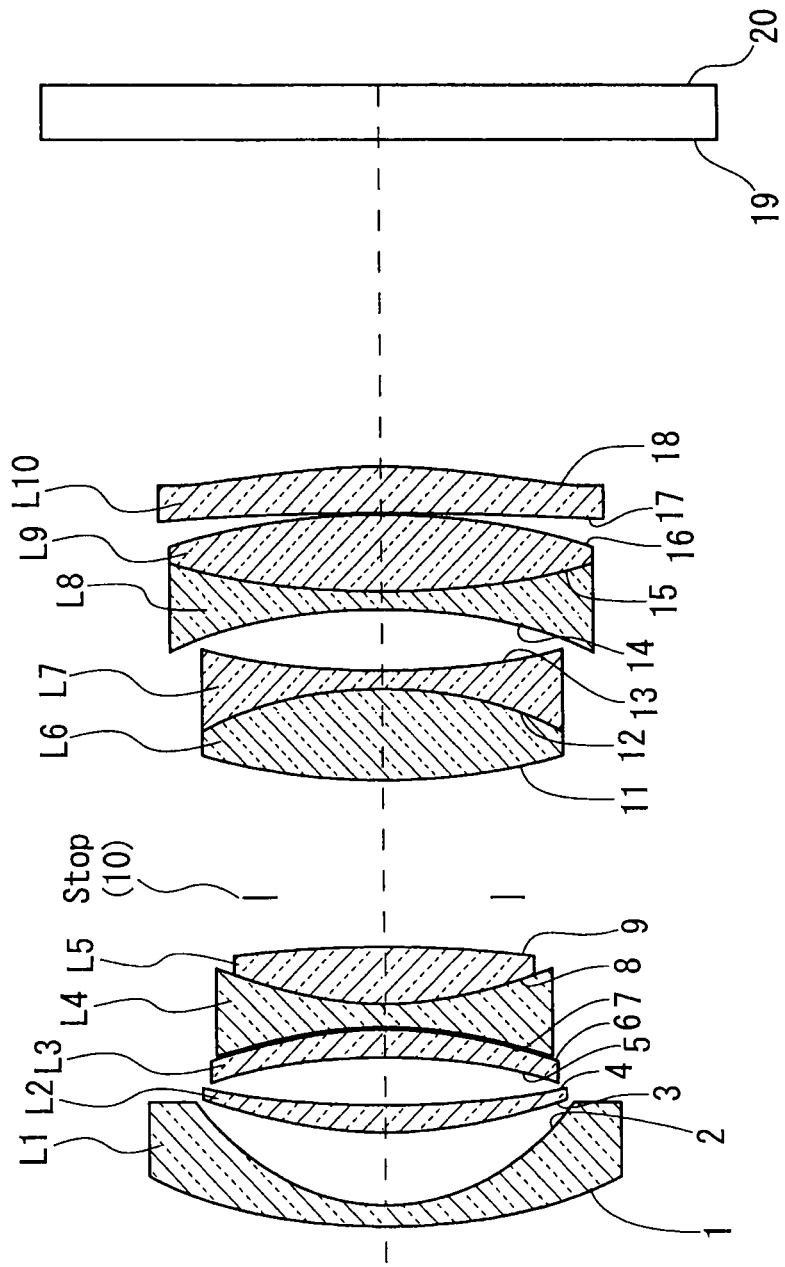
FIG. 27 is a diagram illustrating a lens constitution of an image-forming lens of Example 14.

In an embodiment illustrated in FIG. 27, an image-forming lens includes ten lens elements L1 to L10. Lens elements L1 to L5 arranged on an object side from the aperture "Stop" (the left side from the aperture "Stop" in FIG. 27) constitute a first group, and lens elements L6 to L10 arranged on an image side from the aperture "Stop" (the right side from the aperture "Stop" in FIG. 27) constitute a second group.

The lens element L1 is a negative meniscus lens a convex surface of which faces the object side. The lens element L2 is a positive meniscus lens a convex surface of which faces the object side. The lens element L3 is a positive meniscus lens a convex surface of which faces the image side. The lens element L4 is a biconcave lens (negative lens). The lens element L5 is a biconvex lens (positive lens). The lens element L4 and the lens element L5 are cemented.

The lens element L6 is a biconvex lens (positive lens). The lens element L7 is a biconcave lens (negative lens). The lens element L8 is a biconcave lens (negative lens). The lens element L9 is a biconvex lens (positive lens). The lens element L10 is a positive meniscus lens, a convex surface of which faces the image side. The lens element L6 and the lens element L7 are cemented. The lens element L8 and the lens element L9 are cemented.

Focusing is performed by shifting independently each of the first group including the lens elements L1 to L5 and the second lens group including the lens elements L5 to L10 to the object side.

Figure 29:
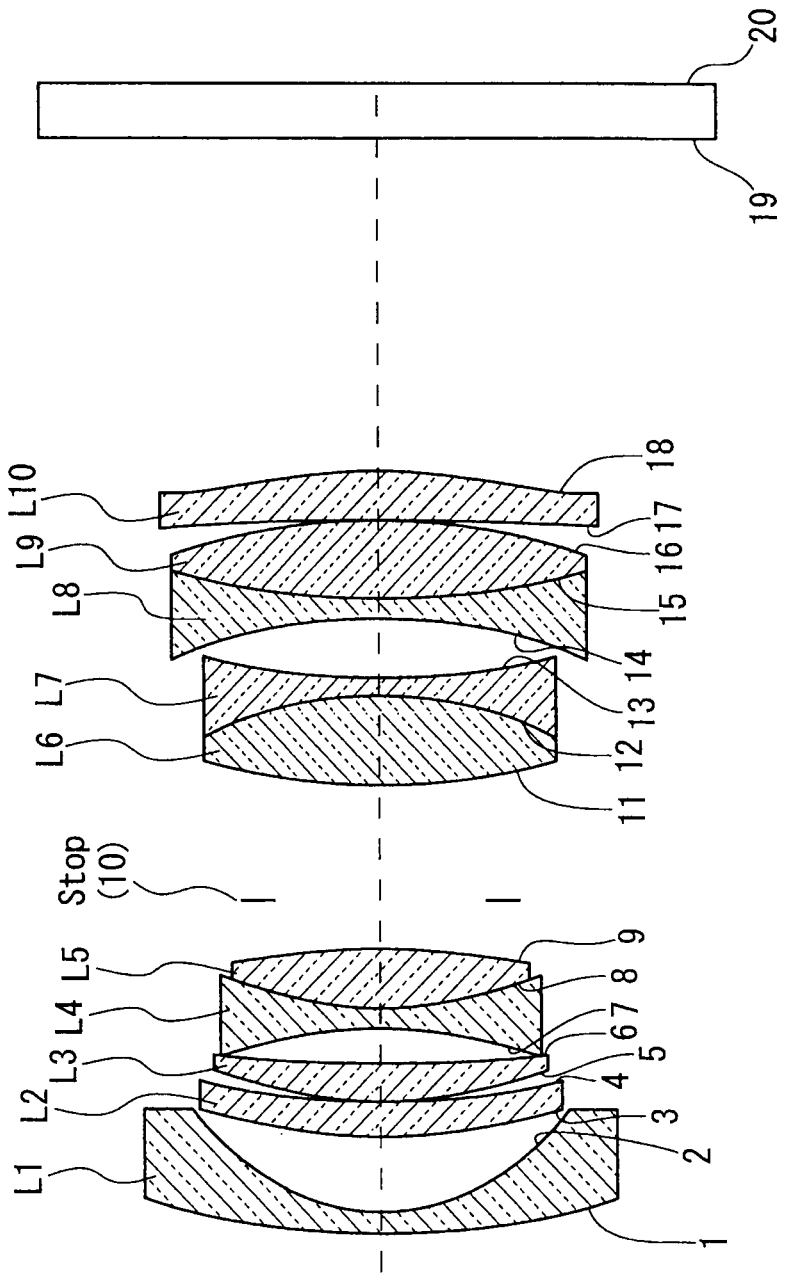
FIG. 29 is a diagram illustrating a lens constitution of an image-forming lens of Example 15.
Figure 30:
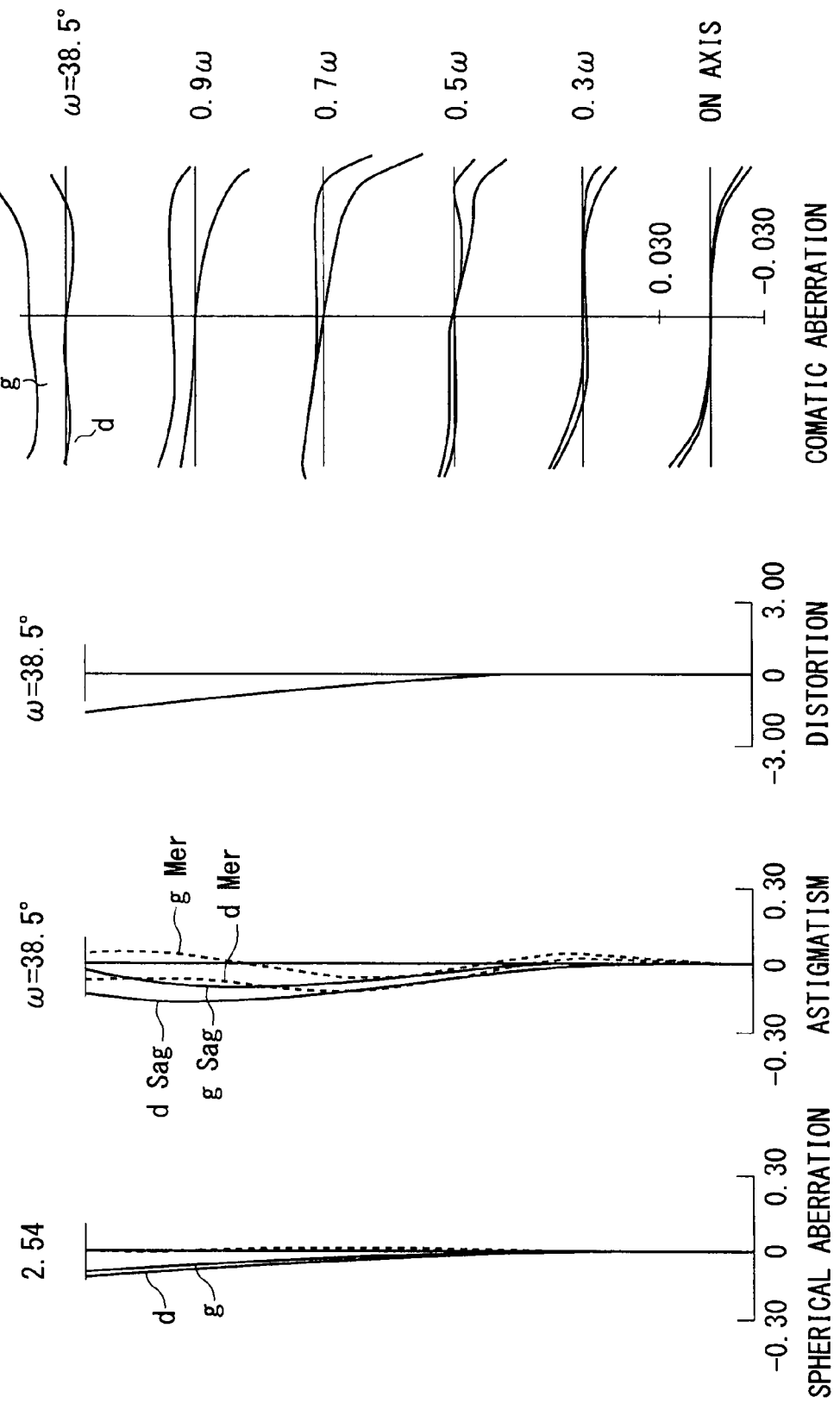
FIG. 30 is an aberration diagram of the image-forming lens of Example 15.

In an embodiment illustrated in FIG. 29, an image-forming lens includes ten lens elements L1 to L10. Lens elements L1 to L5 arranged on an object side from the aperture "Stop" (the left side from the aperture "Stop" in FIG. 29) constitute a first group, and lens elements L6 to L10 arranged on an image side from the aperture "Stop" (the right side from the aperture "Stop" in FIG. 29) constitute a second group.

The lens element L1 is a negative meniscus lens a convex surface of which faces the object side. The lens element L2 is a positive meniscus lens a convex surface of which faces the object side. The lens element L3 is a positive meniscus lens a convex surface of which faces the object side. The lens element L4 is a biconcave lens (negative lens). The lens element L4 is a biconvex lens (positive lens). The lens element L4 and the lens element L5 are cemented.

The lens element L6 is a biconvex lens (positive lens). The lens element L7 is a biconcave lens (negative lens). The lens element L8 is a biconcave lens (negative lens). The lens element L9 is a biconvex lens (positive lens). The lens element L10 is a positive meniscus lens a convex surface of which faces the image side. The lens element L6 and the lens element L7 are cemented. The lens element L8 and the lens element L9 are cemented.

Focusing is performed by shifting independently each of the first group including the lens elements L1 to L5 and the second lens group including the lens elements L5 to L10 to the object side.

Figure 31:
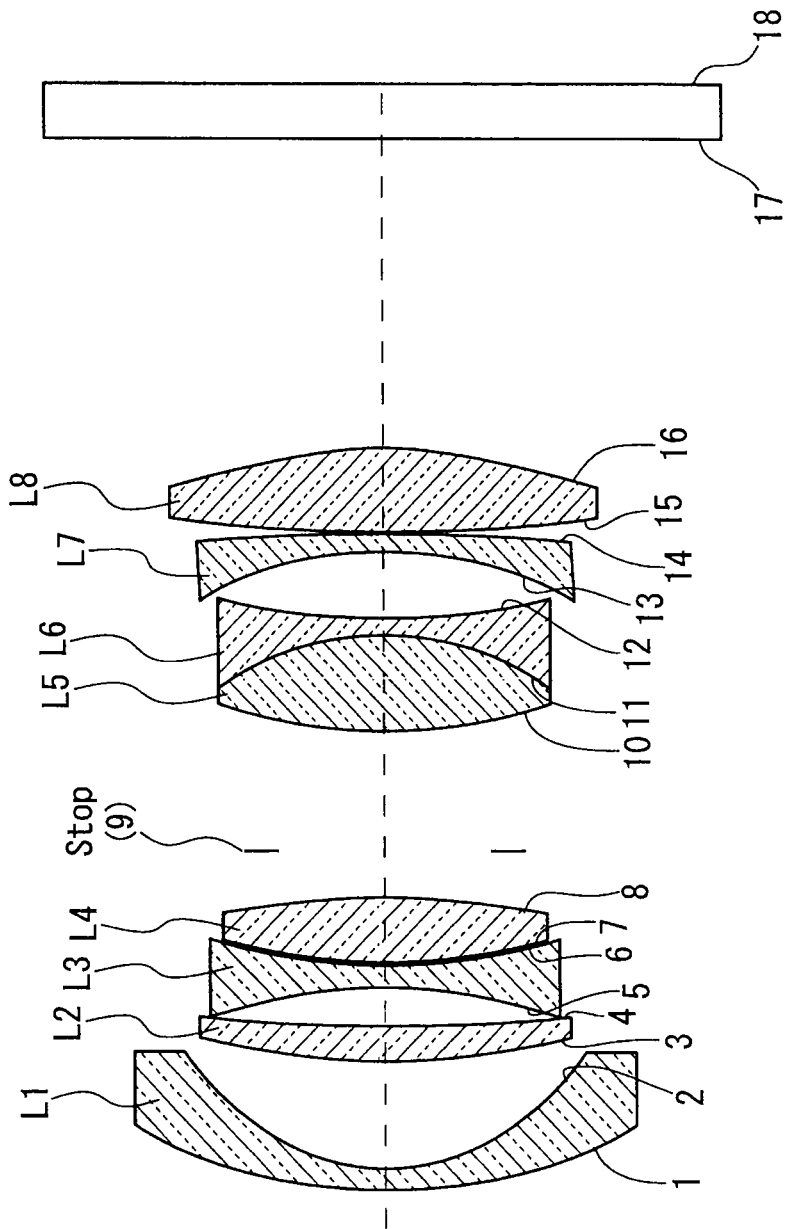
FIG. 31 is a diagram illustrating a lens constitution of an image-forming lens of Example 16.

In an embodiment illustrated in FIG. 31, an image-forming lens includes eight lens elements L1 to L8. Lens elements L1 to L4 arranged on an object side from the aperture "Stop" (the left side from the aperture "Stop" in FIG. 31) constitute a first group, and lens elements L5 to L8 arranged on an image side from the aperture "Stop" (the right side from the aperture "Stop" in FIG. 31) constitute a second group.

The lens element L1 is a negative meniscus lens a convex surface of which faces the object side. The lens element L2 is a positive meniscus lens a convex surface of which faces the object side. The lens element L3 is a biconcave lens. The lens element L4 is a biconvex lens.

The lens element L5 is a biconvex lens (positive lens). The lens element L6 is a biconcave lens (negative lens). The lens element L7 is a negative meniscus lens a concave surface of which faces the object side. The lens element L8 is a biconvex lens. The lens element L5 and the lens element L6 are cemented.

Focusing is performed by shifting independently each of the first group including the lens elements L1 to L4 and the second lens group including the lens elements L5 to L8 to the object side.

Figure 33:
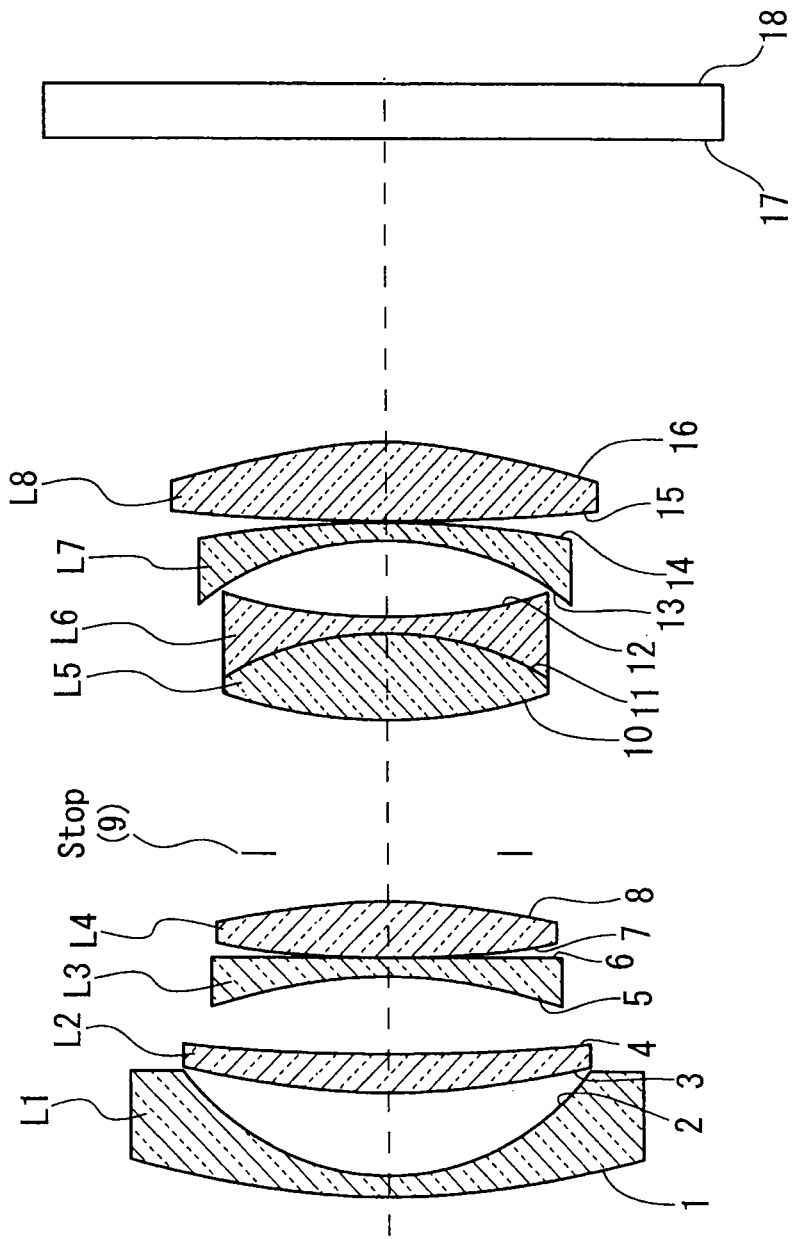
FIG. 33 is a diagram illustrating a lens constitution of an image forming lens of Example 17.

In an embodiment illustrated in FIG. 33, an image-forming lens includes eight lens elements L1 to L8. Lens elements L1 to L4 arranged on an object side from the aperture "Stop" (the left side from the aperture "Stop" in FIG. 33) constitute a first group, and lens elements L5 to L8 arranged on an image side from the aperture "Stop" (the right side from the aperture "Stop" in FIG. 33) constitute a second group.

The lens element L1 is a negative meniscus lens a convex surface of which faces the object side. The lens element L2 is a positive meniscus lens a convex surface of which faces the object side. The lens element L3 is a biconcave lens. The lens element L4 is a biconvex lens.

The lens element L5 is a biconvex lens (positive lens). The lens element L6 is a biconcave lens (negative lens). The lens element L7 is a negative meniscus lens a concave surface of which faces the object side. The lens element L8 is a biconvex lens. The lens element L5 and the lens element L6 are cemented.

Focusing is performed by shifting independently each of the first group including the lens elements L1 to L4 and the second lens group including the lens elements L5 to L8 to the object side.

In each of the above-described image-forming lenses, the first group having a positive refractive power, the aperture "Stop", and the second group having a positive refractive power are arranged from the object side (the left side in each drawing) to the image side (the right side in each drawing) in order.

The first group includes less than or equal to five lens elements including two negative lenses and equal to or more than two positive lenses. The lens element L1 on the most object side is a negative meniscus lens a convex surface of which faces the object side. The second group includes less than or equal to five lens elements including at least one cemented lens where a positive lens and a negative lens are cemented, a negative lens, and a positive lens.

The image-forming lenses of those embodiments perform focusing to a limited object distance by shifting each of the first group and the second group to the object side by a different extension amount, and satisfy Conditional Expressions A, K, and L to N, as described in Examples 11 to 17 later described. And in Example 11 to 15, the image-forming lens satisfies conditional Expressions A, K, O, P, L, M, and N.

Figure 35A:
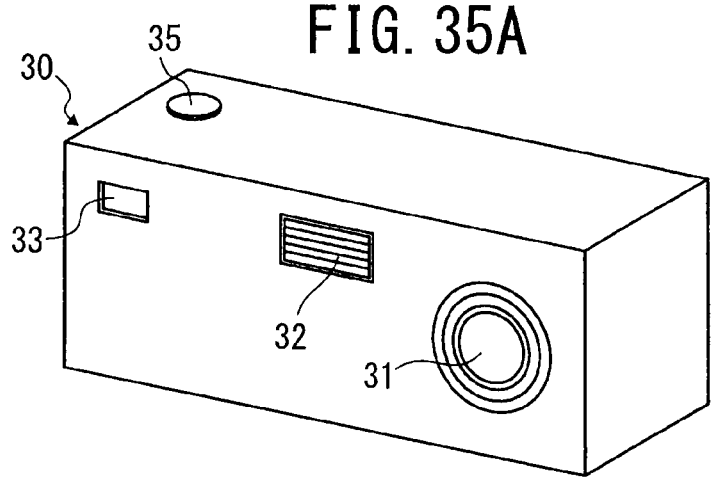
FIG. 35A to 35C are diagrams illustrating an example of an embodiment of a portable information terminal device.
Figure 35B:
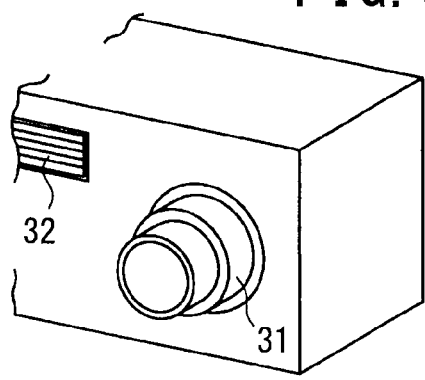
Figure 35C:
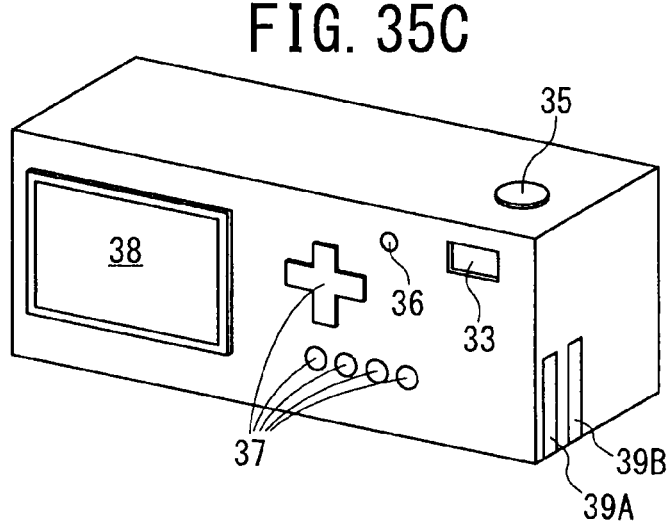
Figure 36:
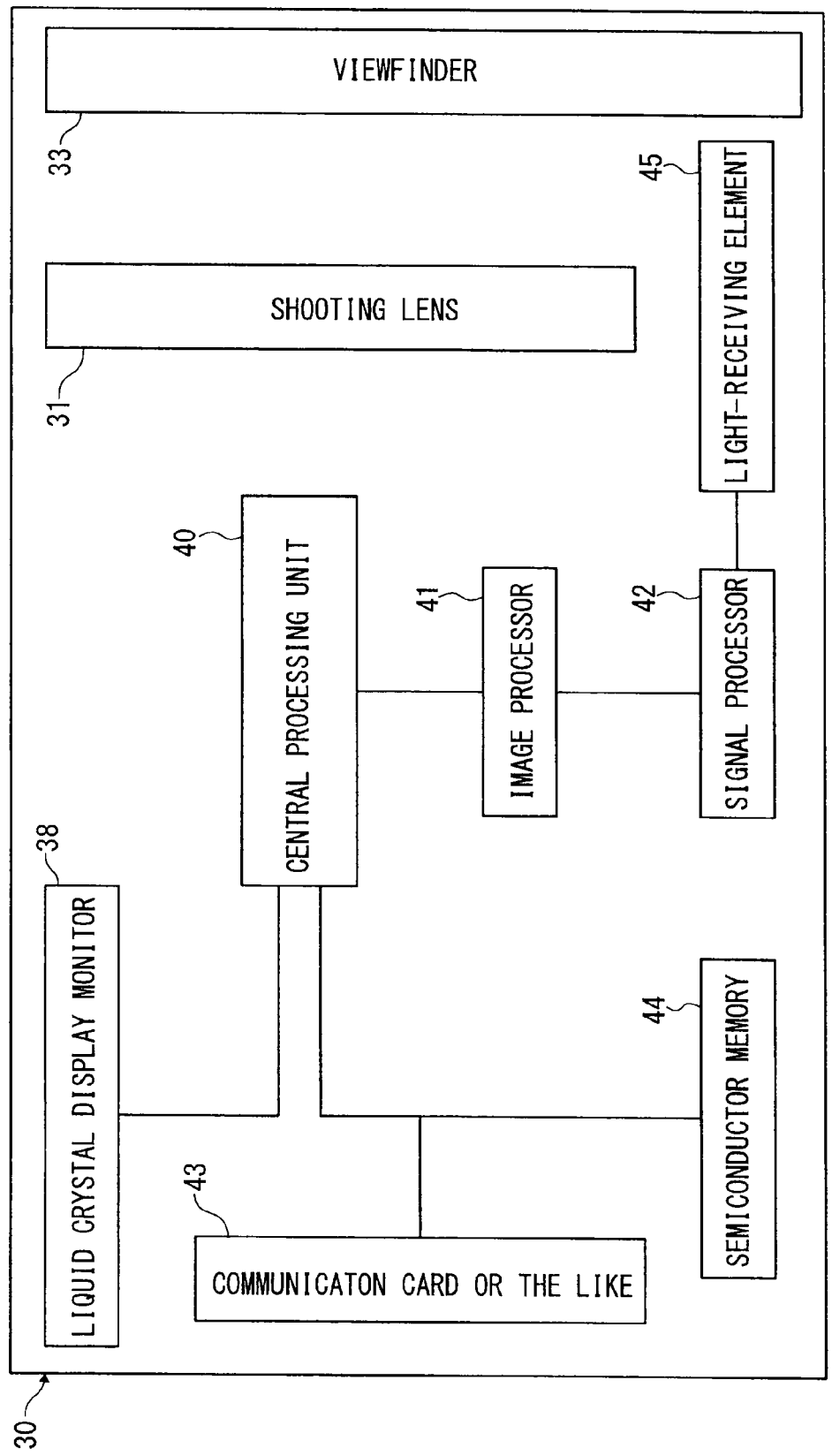
FIG. 36 is a system diagram of the portable information terminal device.

With reference to FIGS. 35A to 35C and 36, an embodiment of a portable information terminal device will be explained. FIGS. 35A to 35C illustrate external views of a camera device (a camera function part of the portable information terminal device), and FIG. 36 illustrates a system constitution of the portable information terminal device. As illustrated in FIG. 36, a portable information terminal device 30 has a shooting lens 31 and a light-receiving element (an electronic image sensor on which 10 million to 15 million pixels are two-dimensionally arranged) 45, and an image of a photographic subject formed by the shooting lens 31 is received by the light-receiving element 45.

As the shooting lens 31, in particular, image-forming lenses of Examples 1 to 17 described later are used.

An output from the light-receiving element 45 is converted to a digital image by a signal processor 42 controlled by a central processing unit 40. After a predetermined image processing is performed on this image in an image processor 41 controlled by the central processing unit 40, the image is recorded on a semiconductor memory 44.

On a liquid crystal display monitor 38, a shooting image on which the image processing is performed in the image processor 41 can be displayed, and an image recorded on the semiconductor memory 44 can be displayed. Additionally, the image recorded on the semiconductor memory 44 can be sent to an external device by use of a communication card or the like 43.

The image processor 41 also has a function of performing an electrical correction of shading, trimming of an image, and the like.

The shooting lens 31 is in a collapsed state when carrying, as illustrated in FIG. 35A, and when a user operates a power switch 36 and the power is on, a lens barrel is extended as illustrated in FIG. 35B.

At this time, in the lens barrel, each group of a zoom lens is arranged in such a manner that an object distance is infinity. And focusing to a limited object distance is performed by half-pressing of a shutter button 35.

Focusing is performed by shifting the first group and the second group by a different extension amount.

In a case where the image recorded on the semiconductor memory 44 is displayed on the liquid crystal display monitor 38, and is sent to the external device by use of the communication card 43, or the like, operation is performed by an operation button 37 illustrated in FIG. 35C. Each of the semiconductor memory 44, the communication card 43, and the like is inserted in slots 39A or 39B which is exclusive or general-purpose, and used. In FIGS. 35A to 35C, reference signs 32 and 33 denote a flash and a viewfinder, respectively.

In a case where the shooting lens 31 is collapsed, each lens group is not always necessary to be aligned on an optical axis. For example, the first group or the second group is displaced from the optical axis, and is stored in parallel with other lens group, and thereby it is possible to further make the portable information terminal device thinner.

In the portable information terminal device having a camera device as a shooting function part as described above, image-forming lenses of Examples 1 to 17 described later are used. Therefore, for example, it is possible to achieve a portable information terminal device having a small and high-picture-quality camera function using the light-receiving element 45 on which more than 10 million pixels are arranged.

Hereinafter, ten specific examples of image-forming lenses will be explained.

The meaning of reference signs in each example is as follows.

F: focal length of entire optical system

Fno: aperture value (f-number)

R: radius of curvature

D: surface interval

Nd: refractive index (d-line)

vd: Abbe's number

An aspheric surface is expressed by a known expression (Expression 1) by use of a height from an optical axis: H, a shift in the optical axis direction in the position of H: X, a constant of the cone: k, aspheric coefficients: C4, C6, C8, C10, . . . , and a paraxial radius of curvature: R.

$$X = (H^2/R)/[1 + \{1 - k(H/r)^2\}^{1/2}] + C4H^4 + C6H^6 + C8H^8 + C10H^{10} + \ldots \quad \text{[Expression 1]}$$

Example 1

A lens constitution of Example 1 is illustrated in FIG. 1. In Example 1, F=18.3 mm, and Fno=2.51.
Data of Example 1 is described in Table 1.

TABLE 1

| SURFACE NUMBER | R | D | Nd | νd |
|---|---|---|---|---|
| 1 | 24.64 | 1.0 | 1.6180 | 63.3 |
| 2 | 10.09 | 6.9 | | |
| 3 | −17.14 | 0.8 | 1.4970 | 81.5 |
| 4 | −50.86 | 0.1 | | |
| 5 | 34.34 | 3.9 | 1.8830 | 40.8 |
| 6 | −17.25 | 0.7 | 1.9229 | 20.9 |
| 7 | −37.26 | 2.1 | | |
| 8 | INF | D1 | | |
| 9 | 21.98 | 3.6 | 1.8830 | 40.8 |
| 10 | −16.24 | 0.8 | 1.5814 | 40.9 |
| 11 | 29.01 | 4.7 | | |
| 12 | −13.81 | 0.7 | 1.9229 | 20.9 |
| 13 | −812.55 | 2.7 | 1.8830 | 40.8 |
| 14 | −20.84 | 0.4 | | |
| 15 | −259.69 | 2.7 | 1.8640 | 40.6 |
| 16* | −31.30 | D2 | | |
| 17 | INF | 2.5 | 1.5168 | 64.2 |
| 18 | INF | — | | |

In Table 1, "INF" denotes "∞ (infinity)", and "surface number with * (asterisk)" denotes "an aspheric surface". And each of "D1" and "D2" denotes each of extension amounts of the first group and the second group in accordance with focusing, respectively. Those are the same as in the following Examples.

"Aspheric Surface"
Aspheric surface data of the 16th surface is as follows.

$k = -2.67$ $C4 = -8.187E-05$ $C6 = -7.333E-08$ $C8 = -8.469E-09$ $C10 = -7.192E-11$ $C12 = -1.399E-13$ $C14 = 3.892E-15$ $C16 = 2.779E-17$ $C18 = -3.235E-19$

In the above, for example, "−3.235E−19" denotes "$-3.235 \times 10^{-19}$". This is the same as in the following.

"Extension Amount"
Extension amounts of each of the first group and the second group in accordance with focusing: D1 and D2 are described in Table 2. A unit of the extension amounts is "mm". Those are the same as in the following Examples.

TABLE 2

| OBJECT DISTANCE | INFINITY | 200 mm |
|---|---|---|
| D1 | 4.4 | 3.9 |
| D2 | 12.9 | 14.5 |

"Parameter Value of Conditional Expression"

$d1_{2-3}/d1_{1-2} = 0.02$ $|f1_1/F| = 1.6$ $R1_2/R1_3 = -0.6$ $f1_{n1}/f1_{n12} = 1.9$ $f1_{ep}/f2_{11} = 1.2$ $Nd3 \cdot \nu d3 - Nd4 \cdot \nu d4 = 36.7$ $|R1_1/R2_e| = 0.8$ $|R1_e/R2_1| = 1.6$ $\text{Log}|(D1_\infty - D1_t)/(D2_\infty - D2_t)| = -0.51$

Example 2

A lens constitution of Example 2 is illustrated in FIG. 3. In Example 2, F=18.3 mm, and Fno=2.51.
Data of Example 2 is described in Table 3.

TABLE 3

| SURFACE NUMBER | R | D | Nd | νd |
|---|---|---|---|---|
| 1 | 19.90 | 1.2 | 1.5891 | 61.2 |
| 2* | 9.52 | 4.8 | | |
| 3 | −20.20 | 0.8 | 1.4970 | 81.5 |
| 4 | INF | 0.1 | | |
| 5 | 24.32 | 3.2 | 1.8830 | 40.8 |
| 6 | −19.09 | 0.8 | 1.8081 | 22.8 |
| 7 | −76.21 | 2.2 | | |
| 8 | INF | D1 | | |
| 9 | 20.39 | 4.3 | 1.8830 | 40.8 |
| 10 | −14.29 | 0.8 | 1.5955 | 39.2 |
| 11 | 29.00 | 3.4 | | |
| 12 | −13.24 | 0.8 | 1.8081 | 22.8 |
| 13 | 46.53 | 3.6 | 1.8830 | 40.8 |
| 14 | −23.60 | 0.1 | | |
| 15 | −144.22 | 2.1 | 1.8540 | 40.4 |
| 16* | −26.90 | D2 | | |
| 17 | INF | 2.5 | 1.5168 | 64.2 |
| 18 | INF | — | | |

"Aspheric Surface"
Aspheric surface data of the second surface is as follows.

$k = -0.583$ $C4 = -7.816E-05$ $C6 = 7.063E-07$ $C8 = 1.411E-08$ $C10 = -2.787E-10$ $C12 = 4.589E-12$

Aspheric surface data of the 16th surface is as follows.

$k = 0.000$ $C4 = 8.436E-05$ $C6=-1.864E-07$ $C8=1.048E-08$ $C10=-9.852E-11$ $C12=3.891E-13$

"Extension Amount"

Extension amounts of each of the first group and the second group in accordance with focusing: D1 and D2 are described in Table 4.

TABLE 4

| OBJECT DISTANCE | INFINITY | 200 mm |
|---|---|---|
| D1 | 4.4 | 3.98 |
| D2 | 12.8 | 15.2 |

"Parameter Value of Conditional Expression"

$d1_{2-3}/d1_{1-2}=0.02$ $|f1_1/F|=1.8$ $R1_2/R1_3=-0.5$ $f1_{n1}/f1_{n12}=1.9$ $Nd3 \cdot vd3 - Nd4 \cdot vd4 = 35.6$ $f1_{ep}/f2_{11}=1.2$ $|R1_1/R2_e|=0.7$ $|R1_e/R2_1|=3.7$ $\text{Log}|(D1_\infty-D1_t)/(D2_\infty-D2_t)|=-0.76$ Example 3

A lens constitution of Example 3 is illustrated in FIG. 5. In Example 3, F=18.3 mm, and Fno=2.56.
Data of Example 3 is described in Table 5.

TABLE 5

| SURFACE NUMBER | R | D | Nd | vd |
|---|---|---|---|---|
| 1* | 30.65 | 1.2 | 1.5163 | 64.1 |
| 2* | 9.52 | 6.7 | | |
| 3 | INF | 1.0 | 1.7400 | 28.3 |
| 4 | 41.99 | 0.7 | | |
| 5 | 18.53 | 2.5 | 1.8348 | 42.7 |
| 6 | −721.82 | 2.2 | | |
| 7 | INF | D1 | | |
| 8 | 22.29 | 3.9 | 1.8348 | 42.7 |
| 9 | −12.82 | 1.0 | 1.6034 | 38.0 |
| 10 | 31.75 | 3.3 | | |
| 11 | −11.50 | 0.9 | 1.8081 | 22.8 |
| 12 | 1396.54 | 2.5 | 1.8348 | 42.7 |
| 13 | −17.07 | 0.1 | | |
| 14 | −120.59 | 2.2 | 1.8014 | 45.4 |
| 15* | −25.01 | D2 | | |
| 16 | INF | 2.5 | 1.5168 | 64.2 |
| 17 | INF | — | | |

"Aspheric Surface"
Aspheric surface data of the first surface is as follows.

$k=0.00$ $C4=6.848E-05$ $C6=-1.392E-06$ $C8=1.123E-08$ $C10=-4.372E-11$ $C12=6.571E-14$

Aspheric surface data of the second surface is as follows.

$k=-0.118$ $C4=7.334E-05$ $C6=5.982E-08$ $C8=-3.967E-08$ $C10=5.909E-10$ $C12=-3.021E-12$

Aspheric surface data of the 15th surface is as follows.

$k=0.00$ $C4=8.333E-05$ $C6=-3.402E-07$ $C8=1.633E-08$ $C10=-1.820E-10$ $C12=8.154E-13$

"Extension Amount"

Extension amounts of each of the first group and the second group in accordance with focusing: D1 and D2 are described in Table 6.

TABLE 6

| OBJECT DISTANCE | INFINITY | 200 mm |
|---|---|---|
| D1 | 3.81 | 3.41 |
| D2 | 15.9 | 17.6 |

"Parameter Value of Conditional Expression"

$d1_{2-3}/d1_{1-2}=0.1$ $|f1_1/F|=1.5$ $R1_2/R1_3=0.0$ $f1_{n1}/f1_{n12}=0.9$ $f1_{ep}/f2_{11}=2.1$ $|R1_1/R2_e|=1.2$ $|R1_e/R2_1|=33.4$ $\text{Log}|(D1_\infty-D1_t)/(D2_\infty-D2_t)|=-0.63$ Example 4

A lens constitution of Example 4 is illustrated in FIG. 7. In Example 4, F=18.3 mm, and Fno=2.56.
Data of Example 4 is described in Table 7.

TABLE 7

| SURFACE NUMBER | R | D | Nd | vd |
|---|---|---|---|---|
| 1* | 22.74 | 1.2 | 1.5891 | 61.2 |
| 2* | 9.52 | 6.0 | | |
| 3 | −23.31 | 1.0 | 1.7380 | 32.3 |
| 4 | −240.38 | 0.1 | | |
| 5 | 25.75 | 3.9 | 1.8348 | 42.7 |
| 6 | −36.68 | 2.1 | | |
| 7 | INF | D1 | | |
| 8 | 21.88 | 4.0 | 1.8348 | 42.7 |
| 9 | −12.24 | 1.0 | 1.5927 | 35.3 |
| 10 | 25.79 | 3.2 | | |
| 11 | −12.03 | 0.9 | 1.8081 | 22.8 |
| 12 | −226.3 | 2.3 | 1.8348 | 42.7 |
| 13 | −16.65 | 0.1 | | |
| 14* | −61.77 | 2.2 | 1.8014 | 45.4 |
| 15 | −22.31 | D2 | | |
| 16 | INF | 2.5 | 1.5168 | 64.2 |
| 17 | INF | — | | |

"Aspheric Surface"

Aspheric surface data of the first surface is as follows.

$k=3.782$ $C4=2.119E-4$ $C6=-3.985E-06$ $C8=3.189E-08$ $C10=-1.666E-10$

Aspheric surface data of the second surface is as follows.

$k=0.235$ $C4=2.716E-04$ $C6=-2.065E-06$ $C8=-3.073E-08$ $C10=8.787E-10$ $C12=-9.428E-12$

Aspheric surface data of the 14th surface is as follows.

$k=0.00$ $C4=-9.174E-05$ $C6=9.423E-08$ $C8=-1.110E-08$ $C10=1.830E-10$ $C12=-3.459E-12$ $C14=3.667E-14$ $C16=-1.729E-16$

"Extension Amount"

Extension amounts of each of the first group and the second group in accordance with focusing: D1 and D2 are described in Table 8.

TABLE 8

| OBJECT DISTANCE | INFINITY | 200 mm |
|---|---|---|
| D1 | 3.93 | 3.41 |
| D2 | 13.9 | 17.6 |

"Parameter value of conditional expression"

$d1_{2-3}/d1_{1-2}=0.02$ $|f1_1/F|=1.6$ $R1_2/R1_3=-0.4$ $f1_{n1}/f1_{n12}=2.0$ $f1_{ep}/f2_{11}=1.9$ $|R1_1/R2_e|=1.0$ $|R1_e/R2_1|=1.7$ $\text{Log}|(D1_\infty-D1_t)/(D2_\infty-D2_t)|=-0.85$ Example 5

A lens constitution of Example 5 is illustrated in FIG. 9.
In Example 5, F=18.3 mm, and Fno=2.53.
Data of Example 5 is described in Table 9.

TABLE 9

| SURFACE NUMBER | R | D | Nd | vd |
|---|---|---|---|---|
| 1 | 19.77 | 0.9 | 1.6180 | 63.3 |
| 2 | 8.60 | 5.6 | | |
| 3 | −20.41 | 0.8 | 1.4970 | 81.5 |
| 4 | −150.02 | 0.1 | | |
| 5 | 17.79 | 2.9 | 1.8830 | 40.8 |
| 6 | −19.19 | 0.8 | 1.9229 | 20.9 |
| 7 | −58.99 | 2.1 | | |
| 8 | INF | D1 | | |
| 9 | 21.71 | 3.0 | 1.8830 | 40.8 |
| 10 | −13.58 | 0.8 | 1.5814 | 40.9 |
| 11 | 19.03 | 4.1 | | |
| 12 | −8.05 | 0.8 | 1.9229 | 20.9 |
| 13 | −22.78 | 0.1 | | |
| 14 | 247.87 | 4.0 | 1.8160 | 46.6 |
| 15 | −13.61 | 0.1 | | |
| 16* | −43.62 | 1.9 | 1.8513 | 40.1 |
| 17 | −29.20 | D2 | | |
| 18 | INF | 2.5 | 1.5168 | 64.2 |
| 19 | INF | — | | |

"Aspheric Surface"

Aspheric surface data of the 16th surface is as follows.

$k=0.00$ $C4=-9.824E-05$ $C6=-2.028E-07$ $C8=-1.981E-09$ $C10=2.483E-12$ $C12=-1.441E-13$

"Extension Amount"

Extension amounts of each of the first group and the second group in accordance with focusing: D1 and D2 are described in Table 10.

TABLE 10

| OBJECT DISTANCE | INFINITY | 200 mm |
|---|---|---|
| D1 | 3.44 | 3.14 |
| D2 | 12.38 | 14.04 |

"Parameter Value of Conditional Expression"

$d1_{2-3}/d1_{1-2}=0.02$ $|f1_1/F|=1.4$ $R1_2/R1_3=-0.4$ $f1_{n1}/f1_{n12}=1.6$ $Nd3 \cdot vd - Nd4 \cdot vd4 = 36.7$ $f1_{ep}/f2_{11}=1.1$ $|R1_1/R2_e|=0.7$ $|R1_e/R2_1|=2.7$ $\text{Log}|(D1_\infty - D1_t)/(D2_\infty - D2_t)| = -0.74$ Example 6

A lens constitution of Example 6 is illustrated in FIG. 11.
In Example 6, F=16.5 mm, and Fno=2.64.
Data of Example 6 is described in Table 11.

TABLE 11

| SURFACE NUMBER | R | D | Nd | vd |
|---|---|---|---|---|
| 1 | 16.37 | 0.9 | 1.4875 | 70.2 |
| 2* | 7.38 | 6.19 | | |
| 3 | −17.41 | 1.09 | 1.7200 | 43.7 |
| 4 | −71.59 | 0.10 | | |
| 5 | 27.50 | 2.82 | 1.8830 | 40.8 |
| 6 | −18.41 | 0.16 | | |
| 7 | −16.65 | 0.80 | 1.8467 | 23.8 |
| 8 | −30.89 | 2.15 | | |
| 9 | INF | D1 | | |
| 10 | 19.96 | 3.54 | 1.8830 | 40.8 |
| 11 | −22.52 | 0.10 | | |
| 12 | −36.72 | 0.80 | 1.5927 | 35.3 |
| 13 | 25.84 | 2.88 | | |
| 14 | −13.25 | 0.80 | 1.8467 | 23.8 |
| 15 | 33.34 | 3.30 | 1.8830 | 40.8 |
| 16 | −28.69 | 0.10 | | |
| 17 | −856.38 | 2.32 | 1.8640 | 40.6 |
| 18* | −25.13 | D2 | | |
| 19 | INF | 2.5 | 1.5168 | 64.2 |
| 20 | INF | — | | |

"Aspheric Surface"
Aspheric surface data of the second surface is as follows.

$k=-0.562$ $C4=9.683E-05$ $C6=1.527E-06$ $C8=9.114E-09$ $C10=2.182E-11$ $C12=4.684E-12$

Aspheric surface data of the 18th surface is as follows.

$k=1.983$ $C4=1.140E-04$ $C6=-2.788E-07$ $C8=1.672E-08$ $C10=-2.084E-10$ $C12=9.983E-13$ $C14=4.464E-15$ $C16=-6.342E-17$ $C18=1.700E-19$

"Extension Amount"
Extension amounts of each of the first group and the second group in accordance with focusing: D1 and D2 are described in Table 12.

TABLE 12

| OBJECT DISTANCE | INFINITY | 200 mm |
|---|---|---|
| D1 | 4.99 | 4.64 |
| D2 | 13.3 | 14.4 |

"Parameter Value of Conditional Expression"

$d1_{2-3}/d1_{1-2}=0.02$ $|f1_1/F|=1.7$ $R1_2/R1_3=-0.4$ $f1_{n1}/f1_{n12}=2.1$ $f1_{ep}/f2_{11}=1.0$ $|R1_1/R2_e|=0.7$ $|R1_e/R2_1|=1.6$ $\text{Log}|(D1_\infty - D1_t)/(D2_\infty - D2_t)| = -0.50$ Example 7

A lens constitution of Example 7 is illustrated in FIG. 13.
In Example 7, F=17.5 mm, and Fno=2.55.
Data of Example 7 is described in Table 13.

TABLE 13

| SURFACE NUMBER | R | D | Nd | vd |
|---|---|---|---|---|
| 1 | 17.74 | 0.9 | 1.4875 | 70.2 |
| 2* | 8.08 | 5.4 | | |
| 3 | −18.54 | 0.8 | 1.7200 | 43.7 |
| 4 | −121.68 | 0.1 | | |
| 5 | 25.25 | 3.0 | 1.8830 | 40.8 |
| 6 | −19.77 | 0.2 | | |
| 7 | −17.74 | 0.8 | 1.8467 | 23.8 |
| 8 | −32.72 | 2.2 | | |
| 9 | INF | D1 | | |
| 10 | 20.50 | 4.3 | 1.8830 | 40.8 |
| 11 | −13.27 | 0.8 | 1.6129 | 37.0 |
| 12 | 32.41 | 3.2 | | |
| 13 | −12.68 | 0.8 | 1.8467 | 23.8 |
| 14 | 48.44 | 3.4 | 1.8830 | 40.8 |
| 15 | −22.19 | 0.1 | | |

TABLE 13-continued

| SURFACE NUMBER | R | D | Nd | vd |
|---|---|---|---|---|
| 16 | −166.28 | 2.1 | 1.8540 | 40.4 |
| 17* | −26.30 | D2 | | |
| 18 | INF | 2.5 | 1.5168 | 64.2 |
| 19 | INF | — | | |

"Aspheric Surface"

Aspheric surface data of the second surface is as follows.

$k=-0.347$ $C4=4.050E-05$ $C6=8.163E-07$ $C8=-6.620E-10$ $C10=2.008E-10$

Aspheric surface data of the 17th surface is as follows.

$k=0.00$ $C4=8.836E-05$ $C6=-1.803E-07$ $C8=1.093E-08$ $C10=-1.094E-10$ $C12=4.348E-13$

"Extension Amount"

Extension amounts of each of the first group and the second group in accordance with focusing: D1 and D2 are described in Table 14.

TABLE 14

| OBJECT DISTANCE | INFINITY | 200 mm |
|---|---|---|
| D1 | 4.44 | 4.06 |
| D2 | 13.07 | 14.29 |

"Parameter Value of Conditional Expression"

$d1_{2-3}/d1_{1-2}=0.02$ $|f1_1/F|=1.8$ $R1_2/R1_3=-0.4$ $f1_{n1}/f1_{n12}=2.2$ $f1_{ep}/f2_{11}=1.3$ $|R1_1/R2_e|=0.7$ $|R1_e/R2_1|=1.8$ $\text{Log}|(D1_\infty-D1_t)/(D2_\infty-D2_t)|=-0.51$ Example 8

A lens constitution of Example 8 is illustrated in FIG. 15. In Example 8, F=19.0 mm, and Fno=2.54.
Data of Example 8 is described in Table 15.

TABLE 15

| SURFACE NUMBER | R | D | Nd | vd |
|---|---|---|---|---|
| 1 | 20.47 | 0.9 | 1.6180 | 63.3 |
| 2 | 9.06 | 5.2 | | |
| 3 | −23.31 | 0.8 | 1.4970 | 81.5 |
| 4 | 519.78 | 0.2 | | |
| 5 | 18.55 | 3.7 | 1.8830 | 40.8 |
| 6 | −20.43 | 0.8 | 1.9229 | 20.9 |
| 7 | −70.46 | 2.1 | | |
| 8 | INF | D1 | | |
| 9 | 20.74 | 3.0 | 1.8830 | 40.8 |
| 10 | −14.66 | 0.8 | 1.5814 | 40.9 |
| 11 | 19.75 | 4.1 | | |
| 12 | −9.23 | 0.8 | 1.9229 | 20.9 |
| 13 | −23.60 | 0.1 | | |
| 14 | −379.22 | 3.3 | 1.8160 | 46.6 |
| 15 | −16.67 | 0.1 | | |
| 16 | −51.28 | 2.1 | 1.8513 | 40.1 |
| 17* | −28.81 | D2 | | |
| 18 | INF | 2.5 | 1.5168 | 64.2 |
| 19 | INF | — | | |

"Aspheric Surface"

Aspheric surface data of the 17th surface is as follows.

$k=0.00$ $C4=6.978E-05$ $C6=1.618E-07$ $C8=4.033E-10$ $C10=-1.563E-12$ $C12=9.243E-15$

"Extension Amount"

Extension amounts of each of the first group and the second group in accordance with focusing: D1 and D2 are described in Table 16.

TABLE 16

| OBJECT DISTANCE | INFINITY | 200 mm |
|---|---|---|
| D1 | 4.3 | 3.9 |
| D2 | 14.17 | 16.12 |

"Parameter Value of Conditional Expression"

$d1_{2-3}/d1_{1-2}=0.04$ $|f1_1/F|=1.4$ $R1_2/R1_3=-0.4$ $f1_{n1}/f1_{n12}=1.7$ $f1_{ep}/f2_{11}=1.1$ $Nd3 \cdot vd3 - Nd4 \cdot vd4=36.7$ $|R1_1/R2_e|=0.7$ $|R1_e/R2_1|=3.4$ $\text{Log}|(D1_\infty-D1_t)/(D2_\infty-D2_t)|=-0.69$

Example 9

A lens constitution of Example 9 is illustrated in FIG. 17.
In Example 9, F=20.3 mm, and Fno=2.55.
Data of Example 9 is described in Table 17.

TABLE 17

| SURFACE NUMBER | R | D | Nd | vd |
|---|---|---|---|---|
| 1 | 19.42 | 0.9 | 1.6188 | 63.9 |
| 2* | 10.31 | 4.8 | | |
| 3 | −19.37 | 0.8 | 1.4970 | 81.5 |
| 4 | 1198.3 | 0.1 | | |
| 5 | 25.45 | 3.5 | 1.8830 | 40.8 |
| 6 | −15.48 | 0.8 | 1.8467 | 23.8 |
| 7 | −50.44 | 1.8 | | |
| 8 | INF | D1 | | |
| 9 | 21.94 | 4.1 | 1.8830 | 40.8 |
| 10 | −15.09 | 0.8 | 1.5814 | 40.7 |
| 11 | 24.97 | 3.6 | | |
| 12 | −12.79 | 0.8 | 1.8467 | 23.8 |
| 13 | 62.89 | 3.5 | 1.8830 | 40.8 |
| 14 | −21.04 | 0.1 | | |
| 15 | −95.87 | 2.1 | 1.8540 | 40.4 |
| 16* | −26.38 | D2 | | |
| 17 | INF | 2.5 | 1.5168 | 64.2 |
| 18 | INF | — | | |

"Aspheric Surface"
Aspheric surface data of the second surface is as follows.

$k=0.395$ $C4=-4.702E-05$ $C6=7.378E-07$ $C8=-4.847E-08$ $C10=8.724E-10$ $C12=-7.929E-12$

Aspheric surface data of the 16th surface is as follows.

$k=0.00$ $C4=7.896E-05$ $C6=-1.450E-06$ $C8=7.390E-08$ $C10=-1.951E-09$ $C12=3.221E-11$ $14=-3.238E-13$ $C16=1.815E-15$ $C18=-4.343E-18$

"Extension Amount"
Extension amounts of each of the first group and the second group in accordance with focusing: D1 and D2 are described in Table 18.

TABLE 18

| OBJECT DISTANCE | INFINITY | 200 mm |
|---|---|---|
| D1 | 4.39 | 3.99 |
| D2 | 13.94 | 15.6 |

"Parameter Value of Conditional Expression"

$d1_{2-3}/d1_{1-2}=0.02$ $|f1_1/F|=1.8$ $R1_2/R1_3=-0.5$ $f1_{n1}/f1_{n12}=2.0$ $f1_{ep}/f2_{11}=1.1$ $Nd3 \cdot vd3 - Nd4 \cdot vd4 = 32.9$ $|R1_1/R2_e|=0.7$ $|R1_e/R2_1|=2.3$ $\mathrm{Log}|(D1_\infty-D1_t)/(D2_\infty-D2_t)|=-0.62$

Example 10

A lens constitution of Example 10 is illustrated in FIG. 19.
In Example 10, F=19.0 mm, and Fno=2.53.
Data of Example 10 is described in Table 19.

TABLE 19

| SURFACE NUMBER | R | D | Nd | vd |
|---|---|---|---|---|
| 1 | 20.04 | 0.8 | 1.6188 | 63.9 |
| 2* | 9.52 | 6.8 | | |
| 3 | −21.04 | 1.0 | 1.6727 | 32.1 |
| 4 | −64.44 | 0.1 | | |
| 5 | 30.67 | 2.5 | 1.8160 | 46.6 |
| 6 | −40.21 | 2.1 | | |
| 7 | INF | D1 | | |
| 8 | 22.42 | 4.1 | 1.8830 | 40.8 |
| 9 | −13.96 | 1.0 | 1.6259 | 35.7 |
| 10 | 26.17 | 3.3 | | |
| 11 | −13.72 | 0.9 | 1.8081 | 22.8 |
| 12 | 93.61 | 2.6 | 1.8348 | 42.7 |
| 13 | −19.29 | 0.1 | | |
| 14 | −83.67 | 2.0 | 1.8061 | 40.9 |
| 15* | −26.05 | D2 | | |
| 16 | INF | 2.5 | 1.5168 | 64.2 |
| 17 | INF | — | | |

"Aspheric Surface"
Aspheric surface data of the second surface is as follows.

$k=0.586$ $C4=7.104E-05$ $C6=8.861E-07$ $C8=2.716E-09$ $C10=-7.117E-11$ $C12=2.029E-12$

Aspheric surface data of the 15th surface is as follows.

$k=0.00$ $C4=7.987E-05$ $C6=-3.354E-07$ $C8=1.750E-08$ $C10=-2.011E-10$ $C12=9.573E-13$

"Extension Amount"

Extension amounts of each of the first group and the second group in accordance with focusing: D1 and D2 are described in Table 20.

TABLE 20

| OBJECT DISTANCE | INFINITY | 200 mm |
|---|---|---|
| D1 | 4.18 | 3.66 |
| D2 | 16.3 | 18.1 |

"Parameter value of conditional expression"

$d1_{2\text{-}3}/d1_{1\text{-}2}=0.02$ $|f1_1/F|=1.5$ $R1_2/R1_3=-0.5$ $f1_{n1}/f1_{n12}=1.8$ $f1_{ep}/f2_{11}=2.1$ $|R1_1/R2_e|=0.8$ $|R1_e/R2_1|=1.8$ $\text{Log}|(D1_\infty-D1_t)/(D2_\infty-D2_t)|=-0.54$ FIGS. 2, 4, 6, 8, 10, 12, 14, 16, 18, and 20 are aberration diagrams regarding Examples 1 to 10. In the above diagrams, "d" denotes a d-line, "g" denotes a g-line. In an astigmatism diagram, a solid line "Sag" denotes astigmatism in a sagittal plane, and a dashed line "Mer" denotes astigmatism in a meridional plane. In a spherical aberration diagram, a dashed line denotes "a sine condition".

As is clear from those aberration diagrams, in each example, the lens has excellent performance. In each Example, aberration of the lens is corrected at high level. That is, spherical aberration, astigmatism, field curvature, and transverse chromatic aberration are sufficiently corrected, and an absolute value of distortion becomes less than or equal to 2.0%. In addition, it is possible to be a wide field angle in which a half-field angle is equal to or more than 38 degrees (Examples 1 to 7). Moreover, the lens is bright, in which the f-number is 2.51 to 2.64, and has a large diameter, and ensures suitable imaging performance.

The image-forming lens of each Example is a bright lens as described above, and preferably satisfies Conditional Expression J, and therefore it is possible to perform focusing in a short time. Accordingly, it is possible to perform high-speed shooting.

Each of the image-forming lenses of Examples 1 to 10 is an image-forming lens that has suitable performance, in which a reference closest imaging distance is set to 200 mm and enables to perform near-distance shooting with respect to a photographic subject.

Hereinafter, seven another specific examples of image-forming lenses will be explained.

Example 11

A lens constitution of Example 11 is illustrated in FIG. 21. In Example 11, F=18.3 mm, and Fno=2.56.
Data of Example 11 is described in Table 21.

TABLE 21

| SURFACE NUMBER | R | D | Nd | vd |
|---|---|---|---|---|
| 1 | 23.72 | 1.1 | 1.6516 | 58.6 |
| 2 | 9.52 | 3.4 | | |
| 3* | 59.04 | 1.7 | 1.8061 | 40.4 |
| 4 | −90.61 | 1.1 | | |
| 5 | −18.02 | 0.9 | 1.6129 | 37.0 |
| 6 | 13.37 | 3.0 | 1.8348 | 42.7 |
| 7 | −29.58 | 2.2 | | |
| 8 | INF | D1 | | |
| 9 | 21.55 | 4.3 | 1.8348 | 42.7 |
| 10 | −13.34 | 0.8 | 1.5750 | 41.5 |
| 11 | 31.58 | 2.9 | | |
| 12 | −16.16 | 0.8 | 1.8467 | 23.8 |
| 13 | 31.25 | 3.9 | 1.8348 | 42.7 |
| 14 | −19.67 | 0.1 | | |
| 15* | −181.46 | 2 | 1.8540 | 40.4 |
| 16 | −41.88 | D2 | | |
| 17 | INF | 2.5 | 1.5168 | 64.2 |
| 18 | INF | — | | |

"Aspheric Surface"

Aspheric surface data of the third surface is as follows.

$k=16.511$ $C4=1.057E-05$ $C6=-8.295E-07$ $C8=3.194E-08$ $C10=-4.098E-10$ $C12=-1.550E-12$ $C14=7.232E-14$ $C16=-6.999E-16$ $C18=-5.662E-18$

Aspheric surface data of the 15th surface is as follows.

$k=0.000$ $C4=-9.157E-05$ $C6=1.096E-06$ $C8=-5.305E-08$ $C10=1.237E-09$ $C12=-1.839E-11$ $C14=1.517E-13$ $C16=-5.705E-16$ $C18=3.284E-19$

"Extension Amount"

Extension amounts of each of the first group and the second group in accordance with focusing: D1 and D2 are described in Table 22.

TABLE 22

| OBJECT DISTANCE | INFINITY | 200 mm |
|---|---|---|
| D1 | 4.46 | 3.85 |
| D2 | 14.10 | 15.78 |

"Parameter Value of Conditional Expression"

$d1_{2-3}/d1_{1-2}=0.32$ $f1_1/f1_2=-0.57$ $f1_e/f2_1=3.24$ $(Nd4 \cdot vd4 - Nd3 \cdot vd3)/(Nd5 \cdot vd5 - Nd6 \cdot vd6) = 1.44$ $|R1_1/R2_e|=0.57$ $|R1_e/R2_1|=1.37$ $\text{Log}|(D1_\infty - D1_t)/(D2_\infty - D2_t)| = -4.4E-1$

Example 12

A lens constitution of Example 12 is illustrated in FIG. 23. In Example 12, F=18.3 mm, and Fno=2.51.
Data of Example 12 is described in Table 23.

TABLE 23

| SURFACE NUMBER | R | D | Nd | vd |
|---|---|---|---|---|
| 1 | 32.70 | 1.0 | 1.6030 | 65.4 |
| 2 | 10.37 | 4.7 | | |
| 3 | 32.38 | 2.0 | 1.8830 | 40.8 |
| 4 | 433.33 | 1.3 | | |
| 5 | −30.73 | 0.8 | 1.5927 | 35.3 |
| 6 | 11.06 | 4.0 | 1.8830 | 40.8 |
| 7 | −50.78 | 2.1 | | |
| 8 | INF | D1 | | |
| 9 | 21.19 | 4.0 | 1.8830 | 40.8 |
| 10 | −13.84 | 0.8 | 1.7174 | 29.5 |
| 11 | 18.12 | 4.0 | | |
| 12* | −9.92 | 0.8 | 1.9068 | 21.2 |
| 13* | −17.66 | 0.1 | | |
| 14 | −1601.33 | 5.5 | 1.8830 | 40.8 |
| 15 | −15.00 | D2 | | |
| 16 | INF | 2.5 | 1.5168 | 64.2 |
| 17 | INF | — | | |

"Aspheric Surface"
Aspheric surface data of the 12th surface is as follows.

$k=0.000$ $C4=1.702E-05$ $C6=8.936E-07$

Aspheric surface data of the 13th surface is as follows.

$k=-2.424$ $C4=1.035E-04$ $C6=1.196E-06$ $C8=1.421E-09$ $C10=-1.023E-10$ $C12=3.055E-13$

"Extension Amount"

Extension amounts of each of the first group and the second group in accordance with focusing: D1 and D2 are described in Table 24.

TABLE 24

| OBJECT DISTANCE | INFINITY | 200 mm |
|---|---|---|
| D1 | 2.72 | 2.34 |
| D2 | 11.60 | 13.29 |

"Parameter Value of Conditional Expression"

$d1_{2-3}/d1_{1-2}=0.64$ $f1_1/f1_2=-0.46$ $f1_e/f2_1=2.51$ $(Nd4 \cdot vd4 - Nd3 \cdot vd3)/(Nd5 \cdot vd5 - Nd6 \cdot vd6) = 0.79$ $|R1_1/R2_e|=0.90$ $|R1_e/R2_1|=2.40$ $\text{Log}|(D1_\infty - D1_t)/(D2_\infty - D2_t)| = -6.5E-1$

Example 13

A lens constitution of Example 13 is illustrated in FIG. 25. In Example 13, F=18.3 mm, and Fno=2.56.
Data of Example 13 is described in Table 25.

TABLE 25

| SURFACE NUMBER | R | D | Nd | vd |
|---|---|---|---|---|
| 1* | 23.77 | 1.1 | 1.5163 | 64.1 |
| 2* | 9.53 | 4.9 | | |
| 3 | 32.35 | 1.7 | 1.8830 | 40.8 |
| 4 | 133.80 | 1.7 | | |
| 5 | −17.05 | 0.9 | 1.6200 | 36.3 |
| 6 | 17.77 | 3.0 | 1.8830 | 40.8 |
| 7 | −29.70 | 2.2 | | |
| 8 | INF | D1 | | |
| 9 | 22.92 | 4.2 | 1.8830 | 40.8 |
| 10 | −11.87 | 0.8 | 1.6727 | 32.2 |
| 11 | 30.47 | 2.9 | | |
| 12 | −15.38 | 0.8 | 1.8467 | 23.9 |
| 13 | −129.05 | 0.1 | | |
| 14 | 72.46 | 3.8 | 1.8014 | 45.4 |
| 15* | −16.82 | D2 | | |
| 16 | INF | 2.5 | 1.5168 | 64.2 |
| 17 | INF | — | | |

"Aspheric Surface"
Aspheric surface data of the first surface is as follows.

$k=-5.163$ $C4=1.990E-04$ $C6=-3.715E-06$ $C8=5.008E-08$ $C10=-3.466E-10$ $C12=1.083E-12$

Aspheric surface data of the second surface is as follows.

$k=0.1880$ $C4=1.317E-04$ $C6=-5.317E-06$ $C8=6.213E-08$ $C10=-6.522E-10$ $C12=1.333E-12$ $C14=1.496E-13$ $C16=-3.280E-15$ $C18=1.898E-17$

Aspheric surface data of the 15th surface is as follows.

$k=0.4582$ $C4=1.119E-04$ $C6=2.677E-07$ $C8=6.947E-09$ $C10=-9.656E-11$ $C12=4.708E-13$

"Extension Amount"

Extension amounts of each of the first group and the second group in accordance with focusing: D1 and D2 are described in Table 26.

TABLE 26

| OBJECT DISTANCE | INFINITY | 200 mm |
|---|---|---|
| D1 | 5.58 | 5.06 |
| D2 | 14.26 | 15.92 |

"Parameter value of conditional expression"

$d1_{2-3}/d1_{1-2}=0.36$ $f1_1/f1_2=-0.66$ $f1_e/f2_1=3.48$ $(Nd4 \cdot vd4 - Nd3 \cdot vd3)/(Nd5 \cdot vd5 - Nd6 \cdot vd6)=0.78$ $|R1_1/R2_e|=1.41$ $|R1_e/R2_1|=1.30$ $\text{Log}|(D1_\infty - D1_t)/(D2_\infty - D2_t)|= -5.0E-1$ Example 14

A lens constitution of Example 14 is illustrated in FIG. 27. In Example 14, F=18.3 mm, and Fno=2.56.
Data of Example 14 is described in Table 27.

TABLE 27

| SURFACE NUMBER | R | D | Nd | vd |
|---|---|---|---|---|
| 1 | 23.74 | 1.0 | 1.4875 | 70.2 |
| 2* | 8.45 | 3.1 | | |
| 3 | 20.93 | 1.2 | 1.8503 | 32.3 |
| 4 | 39.97 | 2.0 | | |
| 5 | -25.35 | 1.3 | 1.4970 | 81.5 |
| 6 | -18.50 | 0.1 | | |
| 7 | -18.19 | 0.9 | 1.6398 | 34.5 |
| 8 | 14.61 | 2.6 | 1.8830 | 40.8 |
| 9 | -38.52 | 2.2 | | |
| 10 | INF | D1 | | |
| 11 | 22.62 | 4.0 | 1.8830 | 40.8 |
| 12 | -16.98 | 0.8 | 1.6129 | 37.0 |

TABLE 27-continued

| SURFACE NUMBER | R | D | Nd | vd |
|---|---|---|---|---|
| 13 | 31.37 | 2.6 | | |
| 14 | -22.16 | 0.8 | 1.8467 | 23.8 |
| 15 | 32.82 | 3.4 | 1.8348 | 42.7 |
| 16 | -28.49 | 0.1 | | |
| 17 | -91.68 | 2.0 | 1.8540 | 40.4 |
| 18* | -27.85 | D2 | | |
| 19 | INF | 2.5 | 1.5168 | 64.2 |
| 20 | INF | — | | |

"Aspheric Surface"

Aspheric surface data of the second surface is as follows.

$k=-0.1284$ $C4=2.211E-05$ $C6=-9.313E-07$ $C8=1.637E-08$ $C10=-2.689E-10$

Aspheric surface data of the 18th surface is as follows.

$k=-27.846$ $C4=-6.811E-05$ $C6=1.598E-06$ $C8=-1.011E-08$ $C10=3.747E-11$

"Extension Amount"

Extension amounts of each of the first group and the second group in accordance with focusing: D1 and D2 are described in Table 28.

TABLE 28

| OBJECT DISTANCE | INFINITY | 200 mm |
|---|---|---|
| D1 | 5.03 | 4.92 |
| D2 | 14.50 | 15.18 |

"Parameter Value of Conditional Expression"

$d1_{2-3}/d1_{1-2}=0.64$ $f1_1/f1_2=-0.55$ $f1_e/f2_1=6.32$ $(Nd4 \cdot vd4 - Nd3 \cdot vd3)/(Nd5 \cdot vd5 - Nd6 \cdot vd6)=1.19$ $|R1_1/R2_e|=0.85$ $|R1_e/R2_1|=1.70$ $\text{Log}|(D1_\infty - D1_t)/(D2_\infty - D2_t)|= -7.9E-1$ Example 15

A lens constitution of Example 15 is illustrated in FIG. 29. In Example 15, F=18.3 mm, and Fno=2.54.
Data of Example 15 is described in Table 29.

TABLE 29

| SURFACE NUMBER | R | D | Nd | vd |
|---|---|---|---|---|
| 1 | 32.81 | 1.0 | 1.4875 | 70.2 |
| 2* | 8.59 | 3.2 | | |
| 3 | 25.44 | 1.5 | 1.6259 | 35.7 |
| 4 | 36.81 | 0.1 | | |
| 5 | 21.62 | 1.5 | 1.5174 | 52.4 |
| 6 | 59.19 | 1.4 | | |
| 7 | −20.20 | 0.9 | 1.6398 | 34.5 |
| 8 | 16.33 | 2.6 | 1.8830 | 40.8 |
| 9 | −30.60 | 2.2 | | |
| 10 | INF | D1 | | |
| 11 | 23.00 | 4.0 | 1.8830 | 40.8 |
| 12 | −15.98 | 0.8 | 1.6129 | 37.0 |
| 13 | 32.12 | 2.6 | | |
| 14 | −20.80 | 0.8 | 1.8467 | 23.8 |
| 15 | 31.58 | 3.4 | 1.8348 | 42.7 |
| 16 | −28.00 | 0.1 | | |
| 17 | −75.33 | 2 | 1.8540 | 40.4 |
| 18* | −26.27 | D2 | | |
| 19 | INF | 2.5 | 1.5168 | 64.2 |
| 20 | INF | — | | |

"Aspheric Surface"
Aspheric surface data of the second surface is as follows.

$k=-0.2533$ $C4=-2.254E-05$ $C6=4.226E-07$ $C8=-1.066E-08$ $C10=6.961E-11$

Aspheric surface data of the 18th surface is as follows.

$k=-24.622$ $C4=-8.962E-05$ $C6=1.920E-06$ $C8=-1.294E-08$ $C10=4.865E-11$

"Extension Amount"
Extension amounts of each of the first group and the second group in accordance with focusing: D1 and D2 are described in Table 30.

TABLE 30

| OBJECT DISTANCE | INFINITY | 200 mm |
|---|---|---|
| D1 | 4.97 | 4.86 |
| D2 | 14.95 | 16.49 |

"Parameter Value of Conditional Expression"

$d1_{2-3}/d1_{1-2}=0.03$ $f1_1/f1_2=-0.19$ $f1_e/f2_1=2.73$ $(Nd4 \cdot vd4 - Nd3 \cdot vd3)/(Nd5 \cdot vd5 - Nd6 \cdot vd6)=1.19$ $|R1_1/R2_e|=1.25$ $|R1_e/R2_1|=1.33$ $\text{Log}|(D1_\infty - D1_t)/(D2_\infty - D2_t)| = -1.2E-1$ Example 16

A lens constitution of Example 16 is illustrated in FIG. 31. In Example 16, F=18.3 mm, and Fno=2.54.
Data of Example 16 is described in Table 31.

TABLE 31

| SURFACE NUMBER | R | D | Nd | vd |
|---|---|---|---|---|
| 1* | 24.17 | 1.1 | 1.5163 | 64.1 |
| 2* | 9.52 | 4.7 | | |
| 3 | 28.33 | 1.7 | 1.8830 | 40.8 |
| 4 | 86.37 | 1.8 | | |
| 5 | −18.31 | 0.9 | 1.6200 | 36.3 |
| 6 | 23.00 | 0.1 | | |
| 7 | 21.57 | 3.0 | 1.8830 | 40.8 |
| 8 | −33.72 | 2.2 | | |
| 9 | INF | D1 | | |
| 10 | 20.85 | 4.2 | 1.8830 | 40.8 |
| 11 | −11.73 | 0.8 | 1.6727 | 32.2 |
| 12 | 27.00 | 3.0 | | |
| 13 | −14.17 | 0.8 | 1.8467 | 23.9 |
| 14 | −88.00 | 0.1 | | |
| 15 | 70.40 | 3.8 | 1.8014 | 45.4 |
| 16* | −16.50 | D2 | | |
| 17 | INF | 2.5 | 1.5168 | 64.2 |
| 18 | INF | — | | |

"Aspheric Surface"
Aspheric surface data of the first surface is as follows.

$k=-4.6053$ $C4=1.969E-04$ $C6=-3.766E-06$ $C8=5.015E-08$ $C10=-3.432E-10$ $C12=1.049E-12$

Aspheric surface data of the second surface is as follows.

$k=0.1696$ $C4=1.384E-04$ $C6=-5.402E-06$ $C8=6.167E-08$ $C10=-6.439E-10$ $C12=1.450E-12$ $C14=1.468E-13$ $C16=-3.256E-15$ $C18=1.874E-17$

Aspheric surface data of the 16th surface is as follows.

$k=0.3774$ $C4=1.174E-04$ $C6=3.790E-07$ $C8=5.500E-09$ $C10=-8.152E-11$ $C12=4.137E-13$

"Extension Amount"

Extension amounts of each of the first group and the second group in accordance with focusing: D1 and D2 are described in Table 32.

TABLE 32

| OBJECT DISTANCE | INFINITY | 200 mm |
|---|---|---|
| D1 | 5.44 | 4.93 |
| D2 | 14.38 | 15.99 |

"Parameter Value of Conditional Expression"

$d1_{2\text{-}3}/d1_{1\text{-}2}=0.38$ $f1_1/f1_2=-0.66$ $|R1_1/R2_e|=1.46$ $|R1_e/R2_1|=1.62$ $\text{Log}|(D1_\infty-D1_t)/(D2_\infty-D2_t)|=-5.0E-1$ Example 17

A lens constitution of Example 17 is illustrated in FIG. 33.
In Example 17, F=18.3 mm, and Fno=2.54.
Data of Example 17 is described in Table 33.

TABLE 33

| SURFACE NUMBER | R | D | Nd | νd |
|---|---|---|---|---|
| 1* | 31.11 | 0.9 | 1.5891 | 61.2 |
| 2* | 9.52 | 3.7 | | |
| 3 | 32.00 | 1.8 | 1.8830 | 40.8 |
| 4 | 136.59 | 3.4 | | |
| 5 | -19.48 | 0.7 | 1.6989 | 30.1 |
| 6 | 165.05 | 0.1 | | |
| 7 | 35.25 | 2.7 | 1.8830 | 40.8 |
| 8 | -25.61 | 2.2 | | |
| 9 | INF | D1 | | |
| 10 | 19.71 | 3.9 | 1.8830 | 40.8 |
| 11 | -12.32 | 0.7 | 1.6727 | 32.2 |
| 12 | 20.23 | 3.5 | | |
| 13 | -12.16 | 0.8 | 1.8467 | 23.9 |
| 14 | -40.98 | 0.1 | | |
| 15 | 105.45 | 3.6 | 1.8014 | 45.4 |
| 16* | -16.04 | D2 | | |
| 17 | INF | 2.5 | 1.5168 | 64.2 |
| 18 | INF | — | | |

"Aspheric Surface"
Aspheric surface data of the first surface is as follows.

$k=0.000$ $C4=2.745E-05$ $C6=-1.449E-06$ $C8=1.891E-08$ $C10=-1.165E-10$ $C12=2.814E-13$

Aspheric surface data of the second surface is as follows.

$k=-0.4204$ $C4=7.192E-05$ $C6=-2.089E-06$ $C8=4.543E-08$ $C10=-9.522E-10$ $C12=1.209E-11$ $C14=3.593E-14$ $C16=-2.150E-15$ $C18=1.340E-17$

Aspheric surface data of the 16th surface is as follows.

$k=-0.1779$ $C4=1.026E-04$ $C6=1.606E-07$ $C8=7.347E-09$ $C10=-9.187E-11$ $C12=4.297E-13$

"Extension Amount"

Extension amounts of each of the first group and the second group in accordance with focusing: D1 and D2 are described in Table 34.

TABLE 34

| OBJECT DISTANCE | INFINITY | 200 nm |
|---|---|---|
| D1 | 5.92 | 5.37 |
| D2 | 14.94 | 15.61 |

"Parameter Value of Conditional Expression"

$d1_{2\text{-}3}/d1_{1\text{-}2}=0.91$ $f1_1/f1_2=-0.50$ $|R1_1/R2_e|=1.94$ $|R1_e/R2_1|=1.30$ $\text{Log}|(D1_\infty-D1_t)/(D2_\infty-D2_t)|=-1.2E-1$ FIGS. 22, 24, 26, 28, 30, 32, and 34 are aberration diagrams regarding Examples 11 to 17.

As described above, in the above diagrams, "d" denotes a d-line, and "g" denotes a g-line. In an astigmatism diagram, a solid line "Sag" denotes astigmatism in a sagittal plane, and a dashed line "Mer" denotes astigmatism in a meridional plane. In a spherical aberration diagram, a dashed line denotes "a sine condition".

As is clear from those aberration diagrams, in each example, the lens has excellent performance. In each example, aberration of the lens is corrected at high level. That is, spherical aberration, astigmatism, field curvature, and transverse chromatic aberration are sufficiently corrected, and an absolute value of distortion becomes less than or equal to 2.0%. In addition, it is possible to be a wide field angle in which a half-field angle is equal to or more than 38 degrees.

Moreover, the lens is bright, in which the f-number is about 2.5, and has a large diameter, and ensures suitable imaging performance.

The image-forming lens of each Example is a bright lens as described above, and preferably satisfies Conditional Expression N, and therefore it is possible to perform focusing in a short time. Accordingly, it is possible to perform high-speed shooting.

Each of the image-forming lenses of Examples 11 to 17 is an image-forming lens that has suitable performance, in which a reference closest imaging distance is set to 200 mm and enables to perform near-distance shooting with respect to a photographic subject.

By use of the image-forming lens system providing good performance according to the examples of the present invention, even in a case where an image sensor which has a large imaging plane and a large number of pixels is used, there is no need to increase the size of an imaging apparatus.

By using the image-forming lenses having excellent performance according to the examples of the present invention, in a case where an image sensor in which the size of an imaging plane is large and the number of pixels is large is used, there is no need to make an imaging apparatus larger.

As described above, according to the examples of the present invention, it is possible to provide an image-forming lens having two positive and positive groups that achieves good performance and miniaturization. In addition, according to the examples of the present invention, it is possible for the image-forming lens to be a wide field angle in which a half-field angle is 35.6 degrees to 41 degrees, and to be bright in which the f-number is 2.51 to 2.64, and to provide good performance.

Accordingly, by using the image-forming lens as a shooting lens, it is possible to achieve a camera device and a portable information terminal device providing excellent performance.

Additionally, in each example, with respect to a 10-million-pixel image sensor having a rectangular imaging plane a diagonal length of which is 28.6 mm, it is possible to obtain a small imaging apparatus where the entire optical length (a distance between a lens surface on a most object side of the image-forming lens and the imaging plane) is approximately 1.7 times (infinity focus state).

Note that the reference closest imaging distance is a closest imaging distance where imaging is possible, in terms of an aberration correction, in a state of maintaining an optical performance in design. Accordingly, the reference closest imaging distance is determined as a design condition. However, in fact, if imaging is performed in a distance closer than the reference closest imaging distance, a practically sufficient imaging is possible.

In the examples, the reference closest imaging distance is set to 200 mm.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An image-forming lens comprising: from an object side to an image side in the following order,
  a first group with a positive refractive power having a total of either four or five lens elements, which includes two negative lenses and at least two positive lenses and, in which a first lens element on a most object side is a negative meniscus lens a convex surface of which faces the object side;
  an aperture; and
  a second group with a positive refractive power having a total of five lens elements or less, which includes at least one cemented lens in which two lens elements of a positive lens and a negative lens are cemented to each other;
  wherein each of the first group and the second group shifts independently to perform focusing to a limited object distance, an interval between the first lens element and a second lens element adjacent to a surface on the image side of the first lens element: $d1_{1\text{-}2}$ and an interval between the second lens element and a third lens element adjacent to a surface on the image side of the second lens element: $d1_{2\text{-}3}$ satisfy Conditional Expression A: $0.0 < d1_{2\text{-}3}/d1_{1\text{-}2} < 1.0$, and
  a shape of a lens surface on the most image side of the first group and a shape of a lens surface on the most object side of the second lens group are convex shapes.

2. An image-forming lens comprising: from an object side to an image side in the following order,
  a first group with a positive refractive power having a total of either three or four lens elements, which includes at least two negative lenses and one positive lens and, in which a first lens element on a most object side is a negative meniscus lens a convex surface of which faces the object side and a second lens element adjacent to a surface on the image side of the first lens element is a negative lens;
  an aperture; and
  a second group with a positive refractive power which includes five lens elements including at least one cemented lens in which two lens elements of a positive lens and a negative lens are cemented to each other;
  wherein each of the first group and the second group shifts independently to perform focusing to a limited object distance, and an interval between the first lens element and the second lens element: $d1_{1\text{-}2}$ and an interval between the second lens element and a third lens element adjacent to a surface on the image side of the second lens element: $d1_{2\text{-}3}$ satisfy Conditional Expression B: $0.0 < d1_{2\text{-}3}/d1_{1\text{-}2} < 0.4$.

3. The image-forming lens according to claim 2, wherein a focal length of an entire lens system in infinity: F, a focal length of the first lens element: $f1_1$, a radius of curvature of the surface on the image side of the first lens element: $R1_2$, and a radius of curvature of a surface on the object side of the second lens element: $R1_3$ satisfy Conditional Expression C: $1.2 < |f1_1|/F| < 1.8$ and Conditional Expression D: $-0.7 < R1_2/R1_3 \leq 0.0$.

4. The image-forming lens according to claim 2, wherein a focal length of the first lens element: $f1_{n1}$, and a combined focal length of the first lens element and the second lens element: $f1_{n12}$ satisfy Conditional Expression E: $0.7 < f1_{n1}/f1_{n12} < 2.3$.

5. The image-forming lens according to claim 2, wherein a lens element on a most image side of the first group is a cemented lens of a positive lens and a negative lens, and a refractive index of a d-line of the positive lens: Nd3, an Abbe's number of the d-line of the positive lens: vd3, a refractive index of a d-line of the negative lens: Nd4, and an Abbe's number of the d-line of the positive lens: vd4 satisfy Conditional Expression F: $30 < Nd3 \cdot vd3 - Nd4 \cdot vd4 < 50$.

6. The image-forming lens according to claim 2, wherein the positive lens of the first group is a biconvex lens, a lens element on a most object side of the second group is a biconvex lens, a focal length of the biconvex lens of the first group: $f1_{ep}$, and a focal length of the biconvex lens on the most object side of the second group: $f2_{11}$ satisfy Conditional Expression G: $0.9 < f1_{ep}/f2_{11} < 2.2$.

7. The image-forming lens according to claim 2, wherein a radius of curvature of a surface on an object side of the first lens element: $R1_1$, and a radius of curvature of a surface on an image side of a lens element on a most image side of the second group: $R2_e$ satisfy Conditional Expression H: $0.5 < |R1_1/R2_e| < 1.5$.

8. The image-forming lens according to claim 2, wherein a radius of curvature of a surface on an image side of the first lens element: $R1_e$, and a radius of curvature of a surface on an image side of a lens element on a most object side of the second group: $R2_1$ satisfy a Conditional Expression I: $1.4 < |R1_e/R2_1| < 34.0$.

9. The image-forming lens according to claim 2, wherein an interval between the first group and the second group in a case where an object position is infinity: $D1_\infty$, an interval between the first group and the second group in a case of focusing to a reference closest imaging distance: $D1_t$, an interval between the second group and an image plane in a case where the object position is infinity: $D2_\infty$, and an interval between the second group and the image plane in a case of focusing to the reference closest imaging distance: $D2_t$ satisfy Conditional Expression J: $-1.0 < \text{Log}|(D1_\infty - D1_t)/(D2_\infty - D2_t)| < -0.4$, where Log is taken as a common logarithm.

10. A camera device comprising:
the image-forming lens according to claim 2 as a shooting optical system.

11. A portable information terminal device comprising:
the camera device according to claim 10 as a camera function part.

12. An image-forming lens comprising: from an object side to an image side in the following order,
a first group with a positive refractive power having a total of either four or five lens elements, which includes two negative lenses and at least two positive lenses and, in which a first lens element on a most object side is a negative meniscus lens a convex surface of which faces the object side;
an aperture; and
a second group with a positive refractive power having a total of five lens elements or less, which includes at least one cemented lens in which two lens elements of a positive lens and a negative lens are cemented to each other, a negative lens and a positive lens;
wherein each of the first group and the second group shifts independently to perform focusing to a limited object distance, an interval between the first lens element and a second lens element adjacent to a surface on the image side of the first lens element: $d1_{1-2}$ and an interval between the second lens element and a third lens element adjacent to a surface on the image side of the second lens element: $d1_{2-3}$ satisfy Conditional Expression A: $0.0 < d1_{2-3}/d1_{1-2} < 1.0$, and
a shape of a lens surface on the most image side of the first group and a shape of a lens surface on the most object side of the second lens group are convex shapes.

13. The image forming lens according to claim 12, wherein a focal length of the first lens element: $f1_1$, and a focal length of the second lens element: $f1_2$ satisfy Conditional Expression K: $-0.1 < f1_1/f1_2 < -1.0$.

14. The image-forming lens according to claim 12, wherein a radius of curvature of a surface on the object side of the first lens element: $R1_1$, and a radius of curvature of a surface on the image side of a lens element on a most image side of the second group: $R2_e$ satisfy Conditional Expression L: $0.4 < |R1_1/R2_e| < 2.1$.

15. The image-forming lens according to claim 14, wherein a radius of curvature of a surface on the object side of the first lens element: $R1_e$, and a radius of curvature of a surface on the image side of a lens element on a most object side of the second group: $R2_1$ satisfy Conditional Expression M: $1.2 < |R1_e/R2_1| < 2.6$.

16. The image-forming lens according to claim 12, wherein an interval between the first group and the second group in a case where an object position is infinity: $D1_\infty$, an interval between the first group and the second group in a case of focusing to a reference closest imaging distance: $D1_t$, an interval between the second group and an image plane in a case where the object position is infinity: $D2_\infty$, and an interval between the second group and the image plane in a case of focusing to the reference closest imaging distance: $D2_t$ satisfy Conditional Expression N: $-1.5E+1 < \text{Log}|(D1_\infty - D1_t)/(D2_\infty - D2_t)| < -5.0E-2$, where Log is taken as a common logarithm.

17. The image-forming lens according to claim 12, wherein a lens element on a most image side of the first group is a first cemented lens where a positive lens and a negative lens are cemented, and a lens element on a most object side of the second group is a second cemented lens where a positive lens and a negative lens are cemented, and a focal length of the first cemented lens: $f1_e$, and a focal length of the second cemented lens: $f2_1$ satisfy Conditional Expression O: $2.0 < f1_e/f2_1 < 7.9$.

18. The image-forming lens according to claim 17, wherein a refractive index of a d-line of the negative lens of the first cemented lens: Nd3, an Abbe's number of the d-line of the negative lens of the first cemented lens: vd3, a refractive index of a d-line of the positive lens of the first cemented lens: Nd4, an Abbe's number of the d-line of the positive lens of the first cemented lens: vd4, a refractive index of a d-line of the positive lens of the second cemented lens: Nd5, an Abbe's number of the d-line of the positive lens of the second cemented lens: vd5, a refractive index of a d-line of the negative lens of the second cemented lens: Nd6, and an Abbe's number of the d-line of the negative lens of the second cemented lens: vd6 satisfy Conditional Expression P: $0.7 < (Nd4 \cdot vd4 - Nd3 \cdot vd3)/(Nd5 \cdot vd5 - Nd6 \cdot vd6) < 1.6$.

19. A camera device comprising:
the image-forming lens according to claim 12 as a shooting optical system.

20. A portable information terminal device comprising:
the camera device according to claim 19 as a camera function part.

* * * * *